US011211664B2

(12) United States Patent
Barton et al.

(10) Patent No.: US 11,211,664 B2
(45) Date of Patent: Dec. 28, 2021

(54) CORDLESS POWER TOOL SYSTEM

(71) Applicant: BLACK & DECKER INC., New Britain, CT (US)

(72) Inventors: Luke R. Barton, Owings Mills, MD (US); Nathan J. Cruise, Phoenix, MD (US); Abhisheka Moturu, Pikesville, MD (US); Dustin Jefferies, Baltimore, MD (US); Christine H. Potter, Phoenix, MD (US); Michael W. Roberts, Red Lion, PA (US); Michael Varipatis, Fallston, MD (US); Fugen Qin, Timonium, MD (US); Daniel J. Albrecht, Baltimore, MD (US); Michael J. Aronoff, Baltimore, MD (US)

(73) Assignee: Black & Decker Inc., New Britain, CT (US)

( * ) Notice: Subject to any disclaimer, the term of this patent is extended or adjusted under 35 U.S.C. 154(b) by 31 days.

(21) Appl. No.: 16/450,511

(22) Filed: Jun. 24, 2019

(65) Prior Publication Data
US 2019/0312242 A1 Oct. 10, 2019

Related U.S. Application Data

(63) Continuation of application No. PCT/US2017/067935, filed on Dec. 21, 2017.
(Continued)

(51) Int. Cl.
*H01M 50/213* (2021.01)
*B25F 5/02* (2006.01)
(Continued)

(52) U.S. Cl.
CPC ............. *H01M 50/213* (2021.01); *B25F 5/02* (2013.01); *H01M 10/425* (2013.01);
(Continued)

(58) Field of Classification Search
CPC ............. H01M 2/1055; H01M 10/482; H01M 10/425; H01M 4/488; H01M 50/213
See application file for complete search history.

(56) References Cited

U.S. PATENT DOCUMENTS 2,559,521 A 7/1951 Smith et al.
2,590,805 A 3/1952 Vitale
(Continued)

FOREIGN PATENT DOCUMENTS

CA 1304464 6/1992
CA 1315335 3/1993
(Continued)

OTHER PUBLICATIONS

ThunderVolt System Catalog 1990.
(Continued)

*Primary Examiner* — Olatunji A Godo
(74) *Attorney, Agent, or Firm* — Michael Aronoff

(57) ABSTRACT

This application relates to a power tool system including a plurality of power tools, a plurality of battery packs and at least one battery pack charger and method for operating the power tools with the battery packs. This application also relates to a method for charging the battery packs and a method for monitoring a state of charge of the battery pack. In one implementation, the system includes an existing battery pack designed to provide (output) a relatively low voltage, an existing power tool designed to operate at the relatively low voltage, a new battery pack designed to
(Continued)

provide (output) the relatively low voltage and a relatively high voltage, and a new power tool designed to operate at the relatively high voltage.

7 Claims, 52 Drawing Sheets

Related U.S. Application Data

(60) Provisional application No. 62/438,627, filed on Dec. 23, 2016, provisional application No. 62/456,791, filed on Feb. 9, 2017.

(51) Int. Cl.
*H01M 10/48* (2006.01)
*H02J 7/00* (2006.01)
*H01M 10/42* (2006.01)
*H01M 50/543* (2021.01)

(52) U.S. Cl.
CPC ....... *H01M 10/482* (2013.01); *H01M 10/488* (2013.01); *H02J 7/0021* (2013.01); *H02J 7/0045* (2013.01); *H02J 7/0063* (2013.01); *H01M 50/543* (2021.01); *H01M 2220/30* (2013.01); *H02J 7/00045* (2020.01)

(56) References Cited

U.S. PATENT DOCUMENTS

| | | |
|---|---|---|
| 3,453,518 A | 7/1961 | Rose et al. |
| 3,214,670 A | 10/1965 | Schaf et al. |
| 3,344,899 A | 10/1967 | Wang et al. |
| 3,456,119 A | 7/1969 | Franklin et al. |
| 3,525,912 A | 8/1970 | Gus et al. |
| 3,757,194 A | 9/1973 | Weber et al. |
| 3,936,710 A | 2/1976 | Tanikoshi et al. |
| 3,970,912 A | 7/1976 | Hoffman |
| 4,147,969 A * | 4/1979 | Miller ............... H02J 7/027 320/113 |
| 4,175,249 A | 11/1979 | Gruber et al. |
| 4,240,015 A | 12/1980 | White et al. |
| 4,267,914 A | 5/1981 | Saar et al. |
| 4,285,112 A | 8/1981 | Eshghy et al. |
| 4,292,571 A | 9/1981 | Cuneo et al. |
| 4,315,162 A | 2/1982 | Ferguson et al. |
| 4,581,570 A | 4/1986 | Mejia |
| 4,737,661 A | 4/1988 | Lessign, III et al. |
| 4,834,192 A | 5/1989 | Hansson et al. |
| 4,835,409 A | 5/1989 | Bhagwat et al. |
| 4,835,410 A | 5/1989 | Bhagwat et al. |
| 4,835,448 A | 5/1989 | Dishner et al. |
| 4,847,513 A | 7/1989 | Katz et al. |
| 4,879,503 A | 11/1989 | Aoki et al. |
| 5,028,858 A | 7/1991 | Schnizler et al. |
| 5,095,259 A | 3/1992 | Bailey et al. |
| 5,121,046 A | 6/1992 | McCullough et al. |
| 5,180,641 A | 1/1993 | Burns et al. |
| 5,217,395 A | 6/1993 | Bailey et al. |
| 5,229,693 A | 7/1993 | Futami et al. |
| 5,235,232 A | 8/1993 | Conley et al. |
| 5,285,112 A | 2/1994 | Mann |
| 5,298,821 A | 3/1994 | Michel et al. |
| 5,298,839 A | 3/1994 | Takeda |
| 5,354,215 A | 10/1994 | Viracola et al. |
| 5,418,433 A | 5/1995 | Nilssen |
| 5,461,264 A | 10/1995 | Yang et al. |
| 5,506,456 A | 3/1996 | Yang et al. |
| 5,573,074 A | 11/1996 | Thames et al. |
| 5,628,054 A | 5/1997 | Osaka |
| 5,687,129 A | 11/1997 | Kim et al. |
| 5,715,156 A | 2/1998 | Yilmaz et al. |
| 5,734,025 A | 2/1998 | Komai et al. |
| 5,739,651 A | 3/1998 | Miyazawa et al. |
| 5,804,939 A | 9/1998 | Yamai et al. |
| 5,821,722 A | 10/1998 | Forbes et al. |
| 5,897,454 A | 4/1999 | Cannaliato et al. |
| 6,034,494 A | 3/2000 | Kitamine et al. |
| 6,057,608 A | 5/2000 | Bailey, Jr. et al. |
| 6,081,087 A | 6/2000 | Iijima et al. |
| 6,104,162 A | 8/2000 | Sainsbury et al. |
| 6,172,437 B1 | 1/2001 | Du et al. |
| 6,172,860 B1 | 1/2001 | Yoshimizu et al. |
| 6,243,276 B1 | 6/2001 | Neumann et al. |
| 6,268,711 B1 | 7/2001 | Bearfield et al. |
| 6,296,065 B1 | 10/2001 | Carrier et al. |
| 6,308,059 B1 | 10/2001 | Domes |
| 6,346,793 B1 | 2/2002 | Shibata et al. |
| 6,400,107 B1 | 6/2002 | Nakatani et al. |
| 6,430,692 B1 | 8/2002 | Kimble et al. |
| 6,431,289 B1 | 8/2002 | Potter et al. |
| 6,448,732 B1 | 9/2002 | Block et al. |
| 6,460,626 B2 | 10/2002 | Carrier et al. |
| 6,495,932 B1 | 12/2002 | Nakagawa et al. |
| 6,522,902 B2 | 2/2003 | Nishihara et al. |
| 6,536,536 B1 | 3/2003 | Gass et al. |
| 6,566,843 B2 | 5/2003 | Takano et al. |
| 6,573,621 B2 | 6/2003 | Neumann et al. |
| 6,577,097 B2 | 6/2003 | Krefta et al. |
| 6,580,235 B2 | 6/2003 | Laurent et al. |
| 6,581,696 B2 | 6/2003 | Giardino et al. |
| 6,624,535 B2 | 9/2003 | Morrow et al. |
| 6,674,180 B2 | 1/2004 | Gale et al. |
| 6,675,912 B2 | 1/2004 | Carrier et al. |
| 6,683,396 B2 | 1/2004 | Ishida et al. |
| 6,713,988 B2 | 3/2004 | Dubac et al. |
| 6,727,679 B2 | 4/2004 | Kovarik et al. |
| 6,731,022 B2 | 5/2004 | Silverman et al. |
| 6,753,673 B2 | 6/2004 | Shiue et al. |
| 6,761,229 B2 | 7/2004 | Cripe et al. |
| 6,765,317 B2 | 7/2004 | Chu |
| 6,860,341 B2 | 3/2005 | Spielmann et al. |
| 6,971,951 B2 | 12/2005 | Boyer et al. |
| 6,978,846 B2 | 12/2005 | Kawai et al. |
| 6,982,541 B2 | 1/2006 | Zick et al. |
| 6,983,810 B2 | 1/2006 | Hara et al. |
| 7,007,762 B2 | 3/2006 | Yamamoto et al. |
| 7,064,519 B2 | 6/2006 | Ito et al. |
| 7,085,123 B2 | 8/2006 | Shiue et al. |
| 7,090,030 B2 | 8/2006 | Miller et al. |
| 7,102,306 B2 | 9/2006 | Hamaoka et al. |
| 7,121,361 B2 | 10/2006 | Hara et al. |
| 7,157,870 B2 | 1/2007 | Nakawa et al. |
| 7,157,882 B2 | 1/2007 | Johnson et al. |
| 7,176,654 B2 | 2/2007 | Meyer et al. |
| 7,176,656 B2 | 2/2007 | Feldmann et al. |
| 7,193,385 B2 | 3/2007 | Emadi et al. |
| 7,196,911 B2 | 3/2007 | Takano et al. |
| 7,202,622 B2 | 4/2007 | Eskritt et al. |
| 7,210,541 B2 | 5/2007 | Miller et al. |
| 7,292,009 B2 | 11/2007 | Kawakami et al. |
| 7,327,120 B2 | 2/2008 | Lin et al. |
| 7,332,889 B2 | 2/2008 | Glasgow et al. |
| 7,385,366 B2 | 7/2008 | Yukitake et al. |
| 7,397,219 B2 | 7/2008 | Phillips et al. |
| 7,443,134 B2 | 10/2008 | Phillips et al. |
| 7,463,007 B2 | 12/2008 | Phillips et al. |
| 7,486,047 B2 | 2/2009 | Phillips et al. |
| 7,494,035 B2 | 2/2009 | Weaver et al. |
| 7,516,726 B2 | 4/2009 | Esaka et al. |
| 7,551,411 B2 | 6/2009 | Woods et al. |
| 7,621,652 B2 | 11/2009 | Zick et al. |
| 7,653,963 B2 | 2/2010 | Cochran et al. |
| 7,659,696 B2 | 2/2010 | Zeller et al. |
| 7,696,721 B2 | 4/2010 | Young et al. |
| 7,723,954 B2 | 5/2010 | Frucht |
| 7,750,594 B2 | 7/2010 | Clothier et al. |
| 7,752,760 B2 | 7/2010 | Baskar et al. |
| 7,755,308 B2 | 7/2010 | Kayikci et al. |
| 7,821,217 B2 | 10/2010 | Abolhassani et al. |
| 8,025,418 B2 | 9/2011 | Zick et al. |
| 8,040,090 B2 | 10/2011 | Kitagawa et al. |
| 8,076,873 B1 | 12/2011 | Lucas et al. |

(56) References Cited

U.S. PATENT DOCUMENTS

| | | |
|---|---|---|
| 8,136,254 B2 | 3/2012 | Riddell et al. |
| 8,159,194 B2 | 4/2012 | Mori et al. |
| 8,198,835 B2 | 6/2012 | Yokoyama et al. |
| 8,212,504 B2 | 7/2012 | Ogahara et al. |
| 8,222,863 B2 | 7/2012 | Sakakibara |
| 8,241,235 B2 | 8/2012 | Kahler et al. |
| 8,310,177 B2 | 11/2012 | Naumann et al. |
| 8,376,667 B2 | 2/2013 | Wilbert et al. |
| 8,378,632 B2 | 2/2013 | Bourilkov et al. |
| 8,381,829 B2 | 2/2013 | Hanawa et al. |
| 8,395,337 B2 | 3/2013 | Onishi et al. |
| 8,410,756 B2 | 4/2013 | Matsunaga |
| 8,424,213 B2 | 4/2013 | Fukinuki et al. |
| 8,490,732 B2 | 7/2013 | Sugimoto et al. |
| 8,564,236 B2 | 10/2013 | Hirabayashi et al. |
| 8,587,230 B2 | 11/2013 | Pant et al. |
| 8,601,640 B2 | 12/2013 | Bertram et al. |
| 8,643,319 B2 | 2/2014 | Celik et al. |
| 8,723,480 B2 | 5/2014 | Lim et al. |
| 8,732,896 B2 | 5/2014 | Lucas et al. |
| 8,733,470 B2 | 5/2014 | Matthias et al. |
| 8,797,004 B2 | 8/2014 | Skinner et al. |
| 8,813,866 B2 | 8/2014 | Suzuki et al. |
| 8,847,532 B2 | 9/2014 | Kawai et al. |
| 8,876,540 B2 | 11/2014 | Lavender |
| 8,994,331 B2 | 3/2015 | Kerfoot, Jr. et al. |
| 8,994,336 B2 | 3/2015 | Brotto et al. |
| 9,041,322 B2 | 5/2015 | Shimizu et al. |
| 9,112,360 B2 | 8/2015 | Goto et al. |
| RE45,897 E | 2/2016 | Naumann et al. |
| 2001/0017531 A1 | 8/2001 | Sakakibara et al. |
| 2003/0090227 A1 | 5/2003 | Ito et al. |
| 2003/0235060 A1 | 12/2003 | Matsubara et al. |
| 2004/0140781 A1 | 7/2004 | Craven et al. |
| 2004/0257038 A1 | 12/2004 | Johnson et al. |
| 2005/0017686 A1 | 1/2005 | Sakakibara et al. |
| 2005/0110458 A1 | 5/2005 | Seman et al. |
| 2005/0156566 A1 | 7/2005 | Thorsoe et al. |
| 2005/0193538 A1 | 9/2005 | Quinn et al. |
| 2005/0200339 A1 | 9/2005 | Phillips et al. |
| 2005/0247459 A1 | 11/2005 | Voigt et al. |
| 2005/0263305 A1 | 12/2005 | Shimizu et al. |
| 2005/0280393 A1 | 12/2005 | Feldmann et al. |
| 2006/0157262 A1 | 7/2006 | Chen et al. |
| 2006/0164032 A1 | 7/2006 | Johnson et al. |
| 2006/0218768 A1 | 10/2006 | Makimae et al. |
| 2006/0222930 A1 | 10/2006 | Aradachi et al. |
| 2006/0225904 A1 | 10/2006 | Chen et al. |
| 2006/0268504 A1 | 11/2006 | Shimizu et al. |
| 2007/0034394 A1 | 2/2007 | Gass et al. |
| 2007/0090796 A1 | 4/2007 | Norris et al. |
| 2007/0152624 A1 | 7/2007 | Hamaoka et al. |
| 2007/0159007 A1 | 7/2007 | King et al. |
| 2008/0079319 A1 | 4/2008 | Okada et al. |
| 2008/0182143 A1 | 7/2008 | Dong et al. |
| 2008/0193832 A1 | 8/2008 | Doffin et al. |
| 2008/0218917 A1 | 9/2008 | Archer et al. |
| 2008/0266913 A1 | 10/2008 | Brotto et al. |
| 2008/0284363 A1 | 11/2008 | Lucas et al. |
| 2009/0108806 A1 | 4/2009 | Takano et al. |
| 2009/0121550 A1 | 5/2009 | Riviera et al. |
| 2010/0032468 A1 | 2/2010 | Gross et al. |
| 2010/0181966 A1 | 7/2010 | Sakakibara et al. |
| 2010/0244769 A1 | 9/2010 | Sakakibara |
| 2010/0320969 A1 | 12/2010 | Sakakibara et al. |
| 2011/0001456 A1 | 1/2011 | Wang et al. |
| 2011/0012560 A1 | 1/2011 | Sakakibara |
| 2011/0037423 A1 | 2/2011 | Koda et al. |
| 2011/0043143 A1 | 2/2011 | Alter et al. |
| 2011/0090726 A1 | 4/2011 | Brotto et al. |
| 2011/0121782 A1 | 5/2011 | Marsh et al. |
| 2011/0147031 A1 | 7/2011 | Matthias et al. |
| 2011/0162219 A1 | 7/2011 | Okouchi et al. |
| 2011/0250484 A1 | 10/2011 | Meng et al. |
| 2011/0279070 A1 | 11/2011 | Tanaka et al. |
| 2011/0279090 A1 | 11/2011 | Bauer |
| 2011/0285352 A1 | 11/2011 | Lim et al. |
| 2011/0291617 A1 | 12/2011 | Rosenbecker et al. |
| 2012/0037385 A1 | 2/2012 | Suzuki et al. |
| 2012/0048588 A1 | 3/2012 | Iyoda et al. |
| 2012/0205984 A1 | 8/2012 | Goto et al. |
| 2012/0239957 A1 | 9/2012 | Hsiao et al. |
| 2012/0287691 A1 | 11/2012 | Breuner et al. |
| 2012/0293128 A1 | 11/2012 | Kim et al. |
| 2012/0321912 A1 | 12/2012 | Hachisuka et al. |
| 2013/0002175 A1 | 1/2013 | Shimizu et al. |
| 2013/0025893 A1 | 1/2013 | Ota et al. |
| 2013/0038253 A1* | 2/2013 | Ikeda ............... G01R 19/16542 |
| | | 318/139 |
| 2013/0044002 A1 | 2/2013 | Schneider et al. |
| 2013/0082627 A1 | 4/2013 | Ichikawa et al. |
| 2013/0106355 A1 | 5/2013 | Kim et al. |
| 2013/0134787 A1 | 5/2013 | Sakakibara |
| 2013/0154584 A1 | 6/2013 | Sakaue et al. |
| 2013/0162045 A1 | 6/2013 | Weissenborn et al. |
| 2013/0164589 A1 | 6/2013 | Ota et al. |
| 2013/0187461 A1 | 7/2013 | Goto et al. |
| 2013/0293197 A1 | 11/2013 | Sakakibara et al. |
| 2013/0314007 A1 | 11/2013 | Yanagihara et al. |
| 2013/0320926 A1 | 12/2013 | Kerfoot, Jr. et al. |
| 2013/0334898 A1 | 12/2013 | Kao et al. |
| 2013/0335012 A1 | 12/2013 | Meyer et al. |
| 2013/0341923 A1* | 12/2013 | Ju ........................ H01M 4/587 |
| | | 290/48 |
| 2014/0077605 A1 | 3/2014 | Bulur et al. |
| 2014/0132093 A1 | 5/2014 | Purohit et al. |
| 2014/0158389 A1 | 6/2014 | Ito et al. |
| 2014/0190017 A1 | 7/2014 | Máynez et al. |
| 2014/0210379 A1 | 7/2014 | Kato et al. |
| 2014/0265604 A1* | 9/2014 | Mergener ............. H02J 7/0063 |
| | | 307/80 |
| 2014/0284936 A1* | 9/2014 | Grant .................... F02B 63/047 |
| | | 290/1 A |
| 2014/0332243 A1 | 11/2014 | Baskar et al. |
| 2014/0361740 A1 | 12/2014 | Suzuki et al. |
| 2015/0015205 A1 | 1/2015 | Suzuki et al. |
| 2015/0137717 A1 | 5/2015 | Ishikawa et al. |
| 2016/0204475 A1* | 7/2016 | White ..................... H01M 2/30 |
| | | 429/97 |
| 2017/0072553 A1 | 3/2017 | Bakker |

FOREIGN PATENT DOCUMENTS

| | | |
|---|---|---|
| DE | 1175352 | 8/1964 |
| DE | 2412143 | 9/1975 |
| DE | 2838996 | 3/1980 |
| DE | 3844093 | 7/1990 |
| DE | 19747139 | 11/1998 |
| DE | 19907369 | 8/2000 |
| DE | 19963450 | 11/2000 |
| DE | 102006003454 | 8/2007 |
| DE | 102009046565 | 5/2011 |
| DE | 202012001853 | 5/2012 |
| DE | 202013102567 | 9/2013 |
| DE | 102012210662 | 12/2013 |
| DE | 202011110568 | 10/2014 |
| EP | 0024268 | 2/1981 |
| EP | 0170833 | 2/1986 |
| EP | 0310717 | 4/1989 |
| EP | 0310718 | 4/1989 |
| EP | 0372823 | 7/1990 |
| EP | 0609101 | 8/1994 |
| EP | 1266725 | 12/2002 |
| EP | 1381131 | 1/2004 |
| EP | 1469583 | 10/2004 |
| EP | 1898508 | 3/2008 |
| EP | 1903657 | 3/2008 |
| EP | 2200145 | 6/2010 |
| EP | 2246157 | 11/2010 |
| EP | 2397277 | 12/2011 |
| EP | 2132000 | 4/2012 |
| EP | 2495843 | 5/2012 |
| EP | 2554334 | 2/2013 |

(56) References Cited

FOREIGN PATENT DOCUMENTS

| | | |
|---|---|---|
| EP | 2554335 | 2/2013 |
| EP | 2559521 | 2/2013 |
| EP | 2704287 | 3/2014 |
| EP | 2747235 | 6/2014 |
| EP | 2913158 | 2/2015 |
| GB | 2399148 | 9/2004 |
| GB | 1403971.3 | 9/2015 |
| JP | H04183253 | 6/1992 |
| JP | H05137265 | 6/1993 |
| JP | 05236608 | 9/1993 |
| JP | H07337067 | 12/1995 |
| JP | 2000308268 | 11/2000 |
| JP | 2002315381 | 10/2002 |
| JP | 2011015538 | 1/2011 |
| JP | 2011205872 | 10/2011 |
| JP | 2012231655 | 11/2012 |
| WO | 9748922 | 12/1997 |
| WO | 9828831 | 7/1998 |
| WO | 9967869 | 12/1999 |
| WO | 2005099043 | 10/2005 |
| WO | 2007116239 | 10/2007 |
| WO | 2008155209 | 12/2008 |
| WO | 2009055360 | 4/2009 |
| WO | 2011099348 | 8/2011 |
| WO | 2011105794 | 9/2011 |
| WO | 2012039418 | 3/2012 |
| WO | 2013027772 | 2/2013 |
| WO | 2013187837 | 12/2013 |
| WO | 2014075285 | 5/2014 |
| WO | 2014119126 | 8/2014 |
| WO | 2014119128 | 8/2014 |
| WO | 2014119135 | 8/2014 |
| WO | 2014119188 | 8/2014 |
| WO | 2014119203 | 8/2014 |
| WO | 2014192372 | 12/2014 |
| WO | 2014199128 | 12/2014 |
| WO | 2015132606 | 9/2015 |
| WO | PCT/GB2015/050651 | 9/2015 |

OTHER PUBLICATIONS

ThunderVolt System Instruction Manual 1988.
PCT International Search Report, dated Aug. 7, 2015.
Thundervolt 12 & 24 Volt System Instruction Manual.
ThunderVolt Circular Saw Instruction Manual 1988.
Thunder Volt System VSR Dual Range Drill, VSR Dual Range Hammer Drill, VSR Scrudrill Instruction Manual 1989.
Notice of Allowance of U.S. Appl. No. 14/715,258 dated Jun. 9, 2016.
Notice of Allowance of U.S. Appl. No. 14/992,484 dated Oct. 19, 2016.
Notice of Allowance of U.S. Appl. No. 15/180,748 dated Oct. 24, 2016.
Non Final Office Action of U.S. Appl. No. 15/414,720 dated Apr. 11, 2017.
Notice of Allowance of U.S. Appl. No. 15/414,720 dated Nov. 2, 2017.
Extended EP Search Report dated Dec. 7, 2017 issued in corresponding EP Application No. 17189460.3.
ThunderVolt 24 Volt System Instruction Manual (Published no later than 1990).
PCT/US2015/031432 International Search Report and Written Opinion dated Aug. 17, 2015.
ThunderVolt 24 Volt Cordless System Instruction Manual.

* cited by examiner

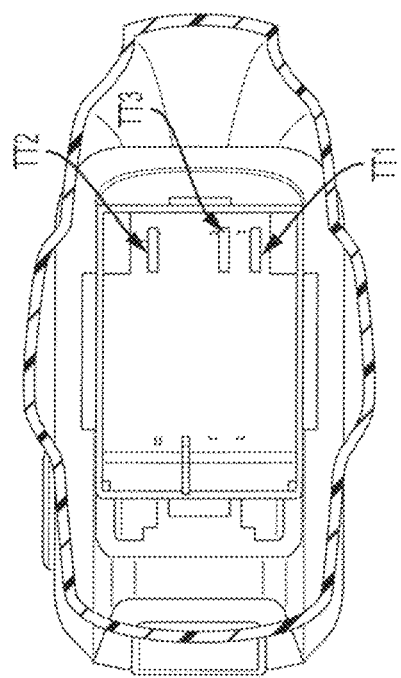
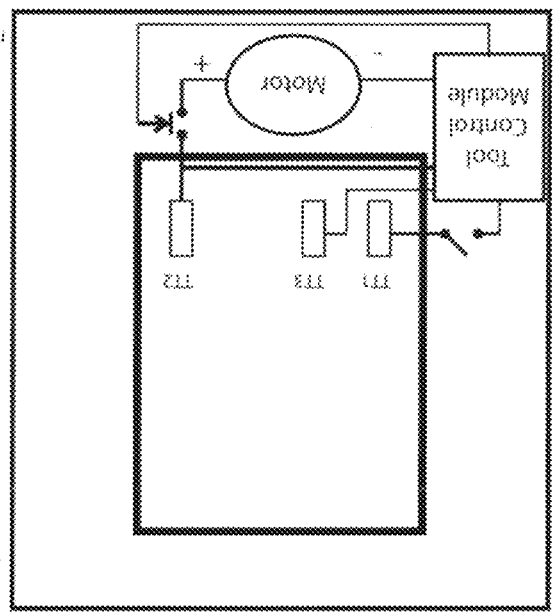
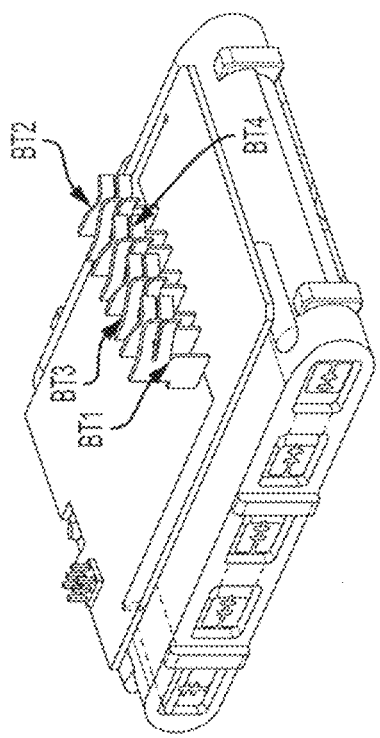
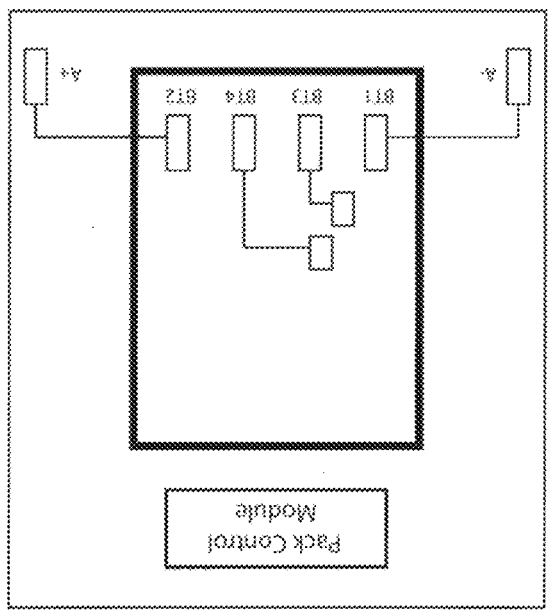
Figure 3A
Figure 3B
Figure 3C

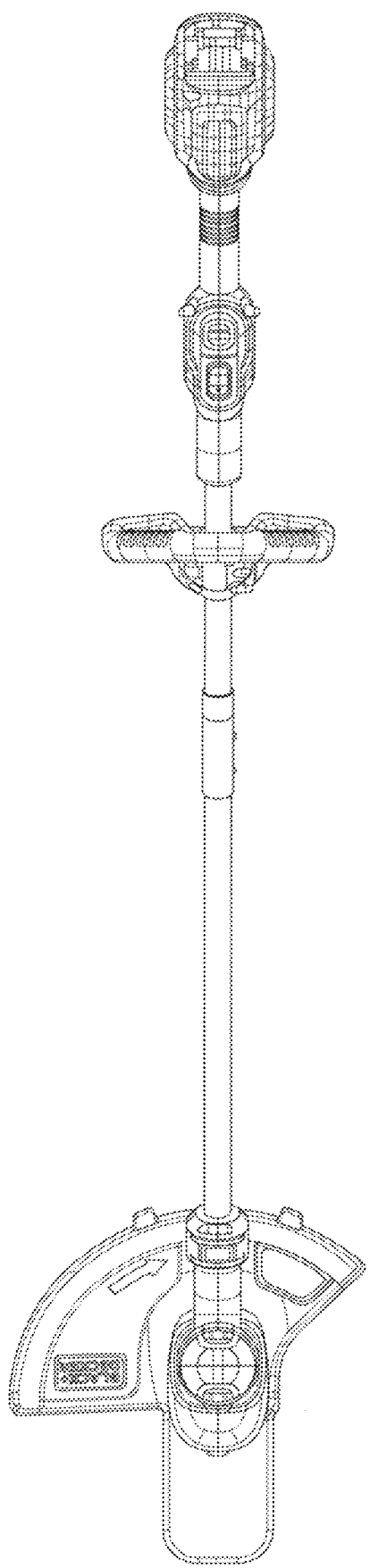

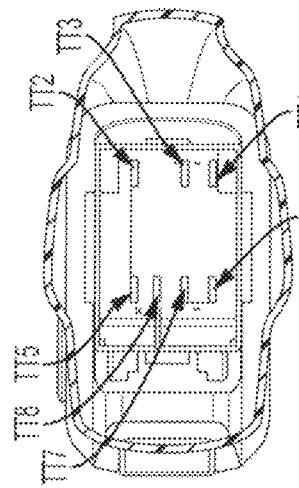
Figure 9B
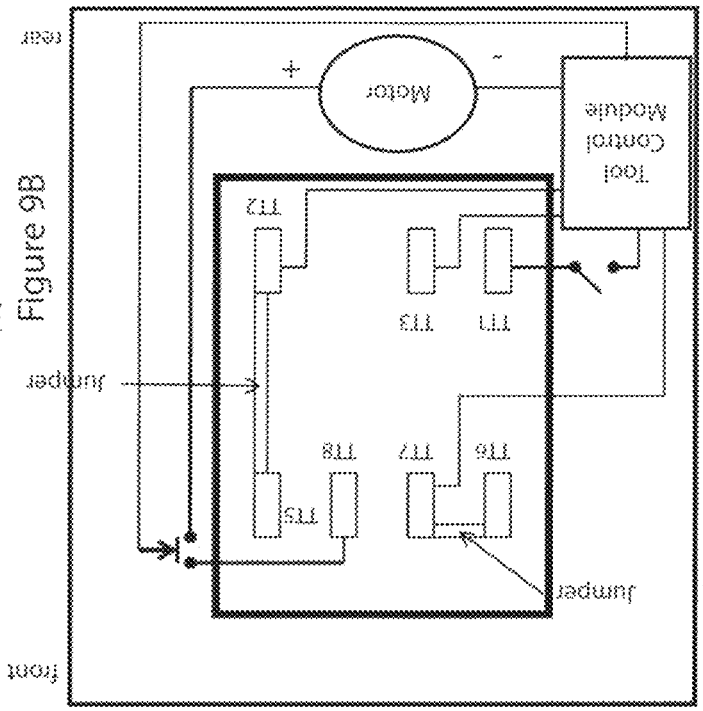
Figure 9C
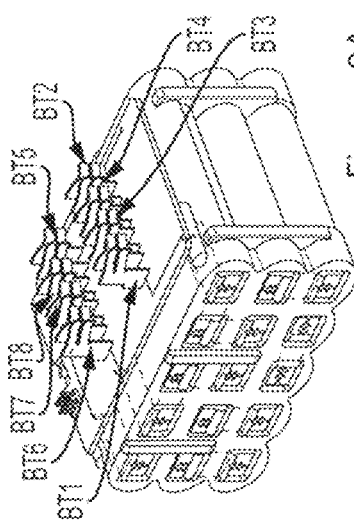
Figure 9A
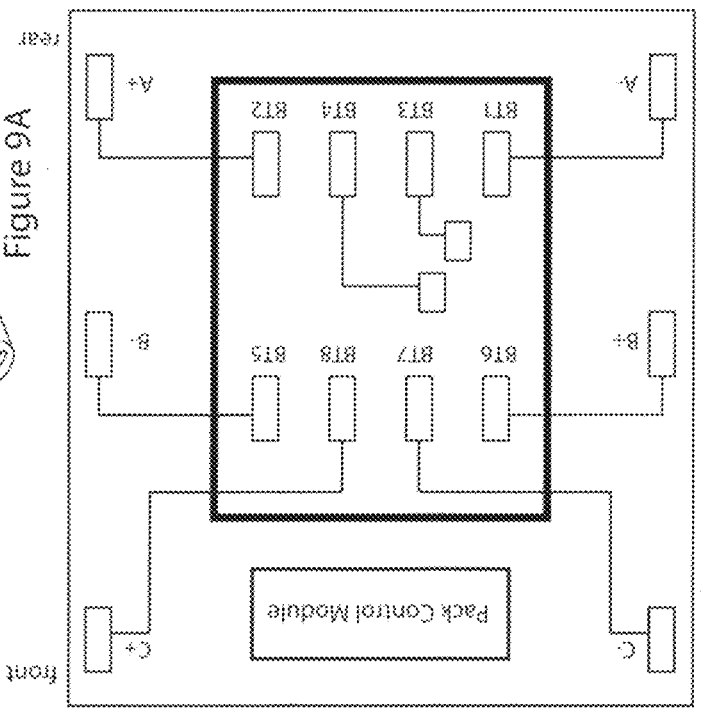

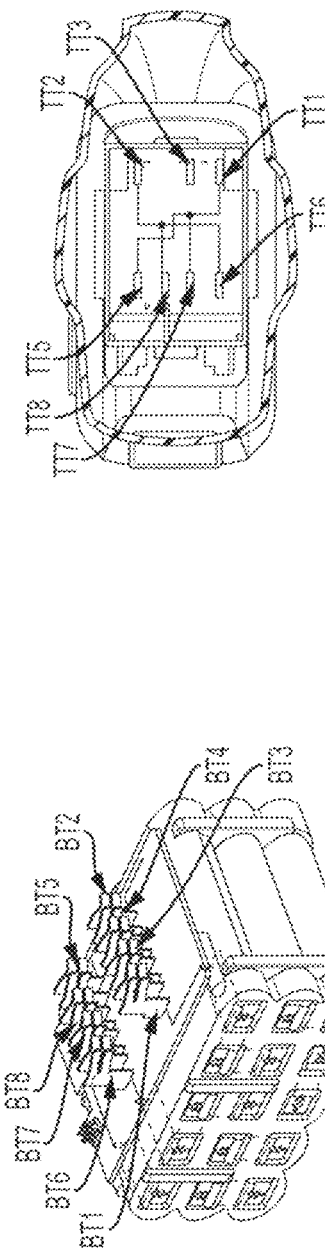
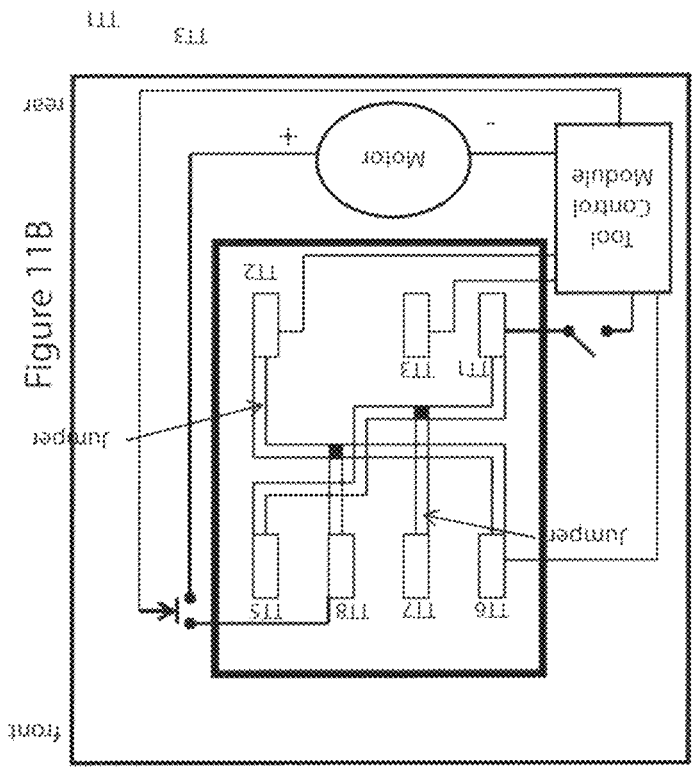
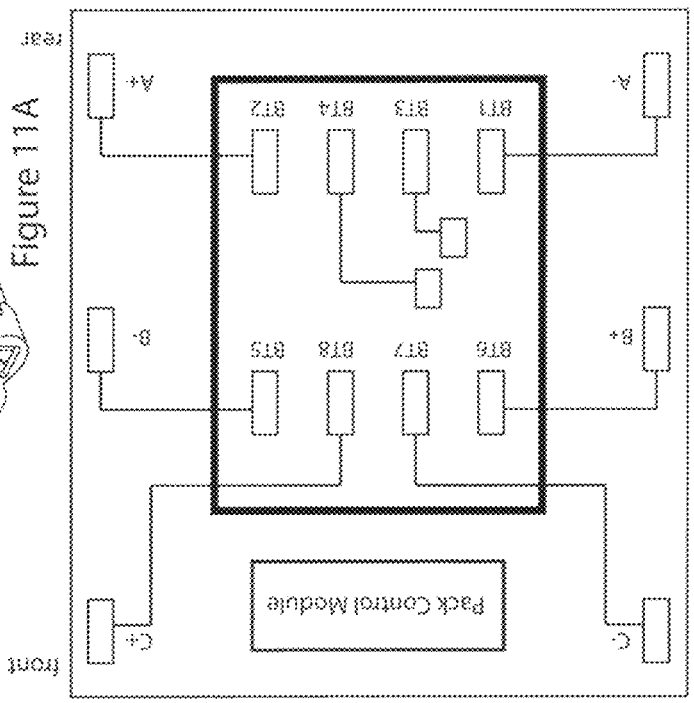
Figure 11A
Figure 11B
Figure 11C

CORDLESS POWER TOOL SYSTEM

RELATED APPLICATIONS

This application is a continuation of PCT/US2017/067935, filed Dec. 21, 2017, titled "Cordless Power Tool System", which claims priority under 35 U.S.C. § 119(e) to U.S. Provisional Patent Application No. 62/438,627, filed Dec. 23, 2016, titled "Cordless Power Tool System" and U.S. Provisional Patent Application No. 62/456,791, filed Feb. 9, 2017, titled "Cordless Power Tool System."

TECHNICAL FIELD

This application relates to a power tool system including a plurality of power tools, a plurality of battery packs and at least one battery pack charger and method for operating the power tools with the battery packs. This application also relates to a method for charging the battery packs and a method for monitoring a state of charge of the battery pack. In one implementation, the system includes an existing battery pack designed to provide (output) a relatively low voltage, an existing power tool designed to operate at the relatively low voltage, a new battery pack designed to provide (output) the relatively low voltage and a relatively high voltage, and a new power tool designed to operate at the relatively high voltage.

BACKGROUND

Cordless power tool systems typically include three primary components: a power tool, a battery pack and a battery charger. The system may include other components.

The power tools of a conventional power tool system are designed to operate at a first voltage, for example, 20 volts (noted herein as a low voltage, used as a relative term) and battery packs designed to operate at the first voltage and configured to couple/mate with the first voltage power tools. Some power tool systems include a power tool designed to include two battery pack interfaces to couple/mate two of the low voltage battery packs and operate at a second voltage, for example, 40 volts (noted herein as a medium voltage, also used as a relative term compared to the low voltage). These tools accept two 20 volt battery packs and couple the battery packs in series such that the battery packs provide the 40 volt operating voltage for the power tool. As noted, while these medium voltage power tools do operate with low voltage battery packs, they require two of the low voltage battery packs to operate.

SUMMARY

An aspect of the present invention includes a first power tool system, comprising a first battery pack (existing) comprising a first plurality of battery cells providing a first operating voltage; a second battery pack (new) comprising a second plurality of battery cells capable of providing the first operating voltage and a second operating voltage; a first power tool (existing) comprising a set of power terminals configured to mechanically and electrically couple with the first battery pack and operate at the first operating voltage and to mechanically couple with the second battery pack such that the second battery pack provides the first operating voltage to the first power tool; and a second power tool (new) comprising a set of power terminals configured to mechanically and electrically couple with the second battery pack such that the second battery pack provides the second operating voltage to the second power tool.

Another aspect of the present invention includes the first power tool system, wherein the first battery pack comprises a set of power terminals aligned in a row and the second battery pack comprises a set of power terminals comprising a first subset of power terminals aligned in a first row and a second subset of power terminals aligned in a second row, wherein the first row is parallel to the second row.

Another aspect of the present invention includes the first power tool system, wherein first power tool comprises a set of power terminals aligned in a row and the second power tool comprises a set of power terminals comprising a first subset of power terminals aligned in a first row and a second subset of power terminals aligned in a second row, wherein upon mating the first power tool with the first battery pack the row of power terminals of the first power tool mates with corresponding power terminals of the row of power terminals of the first battery pack, and wherein upon mating the first power tool with the second battery pack the row of power terminals of the first power tool mates with corresponding power terminals of the first of power terminals of the second battery pack and wherein upon mating the second power tool with the second battery pack the first row of power terminals of the second power tool mates with corresponding power terminals of the first row of power terminals of the second battery pack and the second row of power terminals of the second power tool mates with corresponding power terminals of the second row of power terminals of second battery pack.

Another aspect of the present invention includes a first battery pack, comprising a plurality of sets of battery cells, a first set (pair) of power terminals coupled to a first one of the plurality of sets of battery cells, a second set (pair) of power terminals coupled to a second one of the plurality of sets of battery cells, wherein the first set of power terminals are aligned in a first row and the second set of power terminals are aligned in a second row parallel to the first row.

Another aspect of the present invention includes the first battery pack, wherein the power terminals of the first set of power terminals are aligned with the second set of power terminals to such that each of the power terminals of the first set of power terminals is aligned with one of the power terminals of the second set of power terminals to form a column.

Another aspect of the present invention includes the first battery pack, wherein the first row and the second row are offset in a first direction.

Another aspect of the present invention includes a second power tool system, comprising a battery pack comprising a plurality of sets of battery cells; a first power tool configured to couple to only one of the plurality of sets of battery cells; and a second power tool configured to couple to all of the plurality of sets of battery cells.

Another aspect of the present invention includes the second power tool system, wherein the first power tool comprises a set of power terminals having a first configuration and the second power tool comprises a set of power terminals having a second configuration, the second configuration being different than the first configuration.

Another aspect of the present invention includes the second power tool system, wherein the battery pack comprises a set of power terminals, wherein the first power tool comprises a set of power terminals and the second power tool comprises a set of power terminals and wherein upon mating the first power tool to the battery pack the first power tool set of power terminals couples with a subset of the battery pack power terminals and upon mating the second tool to the battery pack the second power tool set of power terminals couples with the set of battery pack power terminals.

Another aspect of the present invention includes the second power tool system, further comprising a second battery pack comprising a set of battery cells wherein the second battery pack is configured to couple with the first power tool and configured not to couple with the second power tool.

Another aspect of the present invention includes the second power tool system, wherein the set of battery pack power terminals comprises a plurality of subsets of power terminals wherein each subset of power terminals is coupled to one of the sets of battery cells.

Another aspect of the present invention includes a second battery pack comprising a state of charge indicator having a first set of indicators representing a first operating voltage and a second set of indicators representing a second operating voltage.

Another aspect of the present invention includes the second battery pack, further comprising a plurality of battery cells wherein coupling a subset of the plurality of battery cells generates the first operating voltage and coupling all of the plurality of battery cells generates the second operating voltage.

Another aspect of the present invention includes the second battery pack, further comprising a plurality of battery cells wherein coupling the plurality of battery cells in a first configuration generates the first operating voltage and coupling the plurality of battery cells in a second configuration generates the second operating voltage.

Another aspect of the present invention includes a cordless power tool system comprising at least one multi-voltage battery pack wherein the at least one battery pack includes a first connection circuit for providing a first operating voltage and a second connection circuit for providing a second operating voltage.

These and other advantages and features will be apparent from the description and the drawings.

BRIEF DESCRIPTION OF THE DRAWINGS

FIG. 3A is a top, rear perspective view of an exemplary core pack of the battery pack of FIG. 1, FIG. 3B is a section view of the power tool along section line A-A of FIG. 2B and FIG. 3C is a simplified electromechanical schematic of the core pack of FIG. 3A and the power tool of FIG. 3B prior to coupling.

FIG. 8B is a top view of the power tool of FIG. 8A.

FIG. 9A is a top, rear perspective view of an exemplary core pack of the battery pack of FIG. 5, FIG. 9B is a section view of an exemplary set of terminals of a first exemplary power tool of FIG. 8 and FIG. 9C is a simplified electromechanical schematic of the battery pack of FIG. 5 and the first exemplary power tool of FIG. 8 prior to coupling.

FIG. 11A is a top, rear perspective view of an exemplary core pack of the battery pack of FIG. 5, FIG. 11B is a section view of an exemplary set of terminals of a second exemplary power tool of FIG. 8 and FIG. 11C is a simplified electromechanical schematic of the battery pack of FIG. 5 and the second exemplary power tool of FIG. 8 prior to coupling.

DETAILED DESCRIPTION

Electromechanical Interface Between Power Tool and Battery Pack

Figure 2B:
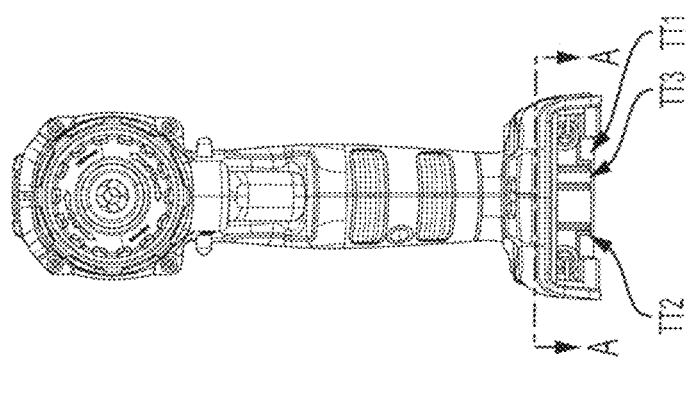
FIG. 2B is a front elevation view of the power tool of FIG. 2A.
Figure 2C:
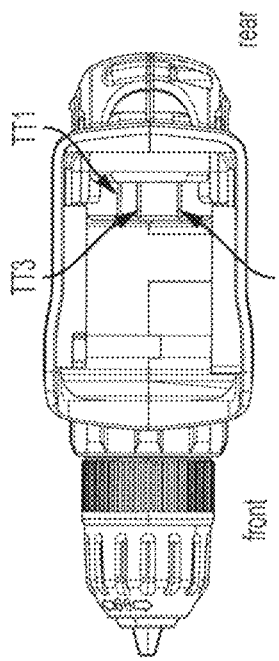
FIG. 2C is a bottom, plan view of the power tool of FIG. 2A.
Figure 2A:
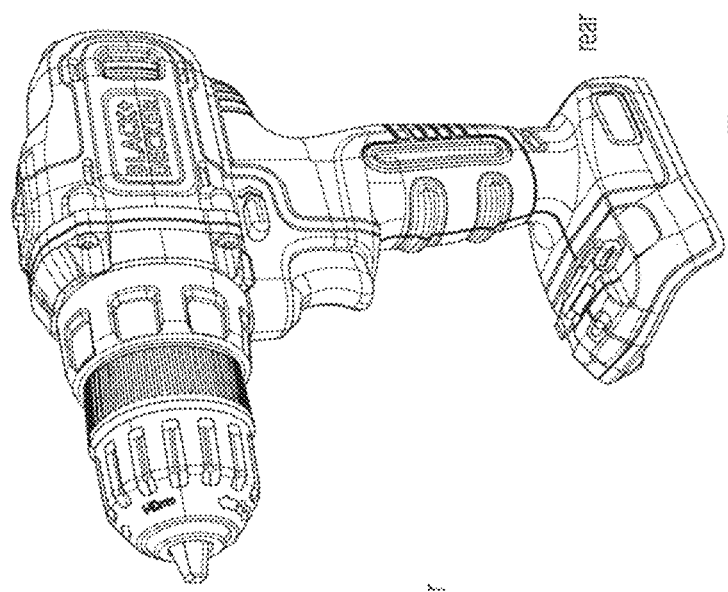
FIG. 2A is top, front perspective view of a conventional cordless power tool.
Figure 1A:
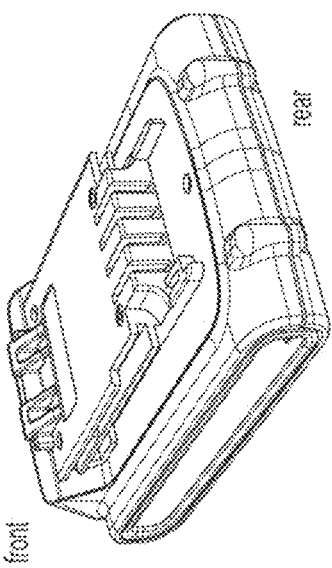
FIG. 1A is a top, rear perspective view of an exemplary conventional single voltage capable battery pack.
Figure 1B:
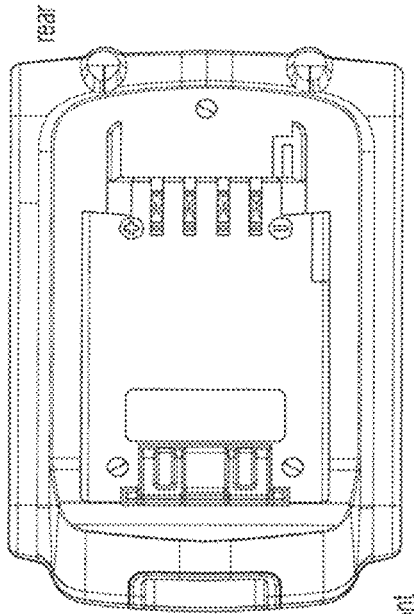
FIG. 1B is a top, plan view of the batter pack of FIG. 1A
Figure 1C:
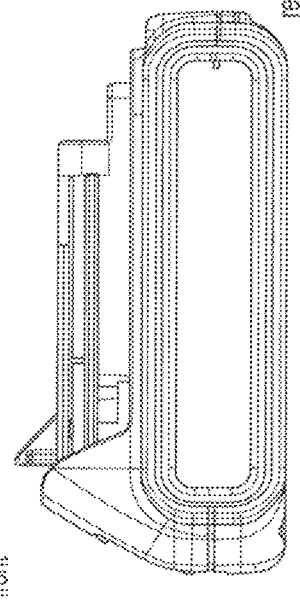
FIG. 1C is a right side elevation of the battery pack of FIG. 1A.

FIGS. 1A, 1B and 1C illustrate a conventional battery pack and FIGS. 2A, 2B and 2C illustrate a conventional power tool wherein the battery pack and the power tool are designed and configured to electromechanically couple to each other such that the battery pack can provide electrical power to the power tool to enable the power tool to operate. In the power tool industry, a particular company typically designs the battery pack and power tool interface such that the battery pack and power tool will couple with each other but not with battery packs and power tools of other brands. For example, Black and Decker battery packs are designed to couple with Black and Decker power tools (of the same line) but not with DeWalt power tools or Milwaukee power tools and Black and Decker power tools are designed to couple with Black and Decker battery packs but not with DeWalt battery packs or Milwaukee battery packs. Furthermore, power tools are typically designed to operate at a particular operating or nominal voltage and battery packs are designed to provide a particular operating or nominal voltage, for example 20 volts or 40 volts. As such, a 20 volt power tool is designed and configured to operate with a 20 volt battery pack and a 40 volt power tool is designed and configured to operate with a 40 volt battery pack. And the power tool company will design the interfaces such that the 20 volt power tool will not couple or operate with the 40 battery pack and the 40 volt power tool will not couple or operate with the 20 volt battery pack. This is to prevent device failure from mismatched operating voltages.

As such, the battery pack of FIG. 1 is designed and configured to mechanically and electrically couple with the power tool of FIG. 2. This battery pack and power tool utilize what is commonly referred to as a slide coupling arrangement. To this end, the battery pack includes a housing. The housing includes a mechanical interface for mating with the power tool of FIG. 2. This battery pack mechanical interface includes a rail and groove system and that corresponds to a rail and groove system on a foot of the power tool. The battery pack housing also includes a plurality (or set) of slots in a top portion towards the rear end of the housing. The slots provide an opening from the outside of the battery pack to the inside of the battery pack. The battery pack includes a plurality (or set) of battery pack terminals BT. The set of battery pack terminals includes a subset of battery pack terminals referred to as power terminals BT1, BT2. The power terminals are coupled to the battery pack cells (or battery cells) and provide electrical power from the battery pack to the power tool. The plurality of battery pack terminals may also include a subset of battery pack terminals referred to as signal, data, control or information terminals BT3, BT4. The battery pack signal terminals are typically coupled to some type sensor component such as a thermistor or resistor or some type of control component such as a microcontroller or a microprocessor. Each of the slots corresponds to one of the battery pack terminals.

The tool interface also includes a plurality (or set) of tool terminals TT. The set of tool terminals includes a subset of tool terminals referred to as power tool terminals TT1, TT2. The power terminals are coupled to the tool motor and receive electrical power from the battery pack. The plurality of tool terminals may also include a subset of tool terminals referred to as signal, data, control or information terminals TT3. The signal terminals are typically coupled to some type of control component in the power tool such as a microcontroller or microprocessor.

The slots allow the tool terminals to enter the battery pack housing and electrically and mechanically mate with corresponding battery pack terminals. Specifically, the tool power terminals TT1, TT2 couple with the battery pack power terminals BT1, BT2, respectively and the tool signal terminal TT3 couples with the battery pack power terminal BT3. As is illustrated in FIGS. 1A and 1B, the battery slots are arranged in a row. This row is toward the rear end of the battery pack. The row of slots are generally only as long as necessary to allow the tool terminals to fully mate with the battery pack terminals.

Figure 4:
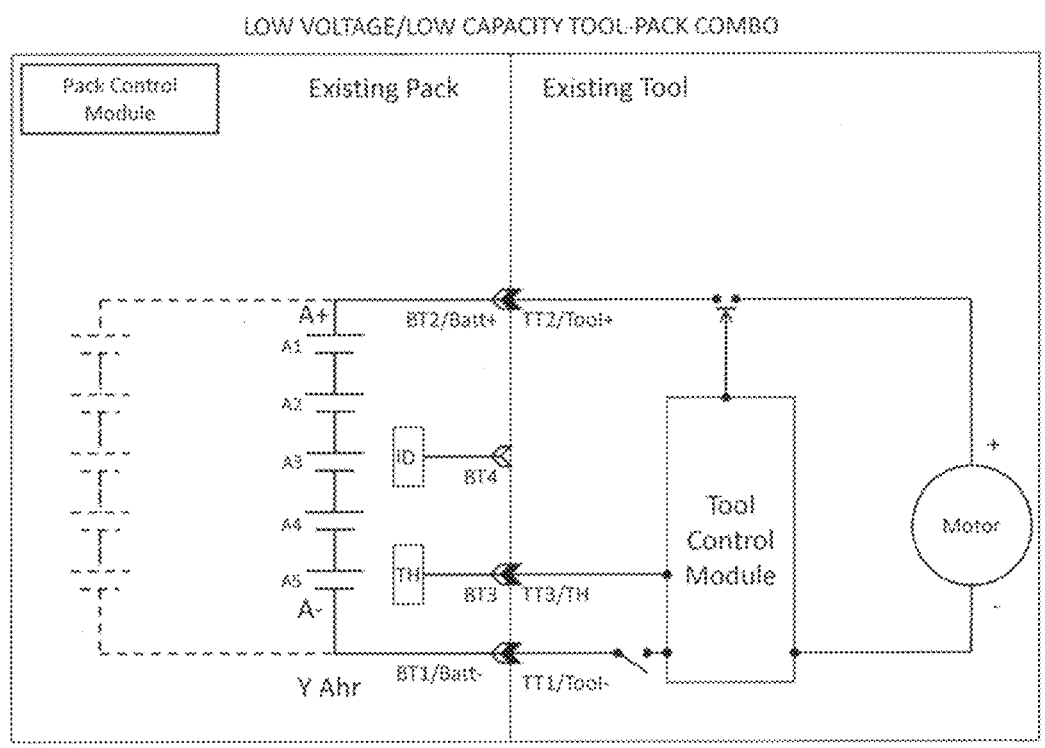
FIG. 4 is a simplified electrical schematic of the battery pack of FIG. 1 and the power tool of FIG. 2 when coupled.

FIG. 3A illustrates an exemplary core pack of the battery pack of FIG. 1. The core pack includes a plurality of battery cell, a cell holder that fixedly positions the battery cells relative to each other, a plurality of battery straps that electrically couple the battery cells to each other or to a printed circuit board (PCB) and the plurality of battery pack terminals BT which are coupled to the PCB. As illustrated in FIG. 4, the battery pack may include a string A of battery cells. The string A of battery cells may include five battery cells A1, A2, A3, A4, A5 coupled in series. Each of the cells may have a voltage X volts and a capacity of Y Amp-hours (Ahr). In an exemplary embodiment, each battery cell may be a 4 volt, 3 Ahr cell. As such, the A string of battery cells (and the battery pack) will be a 20 volt, 3 Ahr string of battery cells (battery pack). The A string of cells is coupled to the battery pack power terminals BT1, BT2 (also referred to as BATT+ and BATT− as these are the battery pack power terminals providing electrical power to the power tool).

In alternate battery packs, the pack may include additional strings of cells wherein the additional strings of cells are coupled in parallel to the A string of battery cells. For example, if there are two strings of five battery cells coupled in parallel, the two strings of battery cells (and the battery pack) will be 20 volt, 6 Ahr string of battery cells (battery pack). It should be noted that the positive node of both strings is electrically coupled to the BT2/BATT+ battery pack power terminal and the negative node of both strings is electrically coupled to the BT1, BATT− battery pack power terminal.

FIG. 3B is taken along section line A-A of FIG. 2B and illustrates the configuration of the tool terminals TT. FIG. 3C illustrates an electromechanical schematic of the battery pack and the power tool prior to mating. If the battery pack is moved to toward the power tool in the direction of arrow M and/or the power tool is moved toward the battery pack in the direction of arrow N, the battery pack terminals BT and the power tool terminals TT will electrically and mechanically mate/couple to enable the battery cells to provide power to the power tool motor. As illustrated in FIG. 3C, the battery pack power terminal BT1 is electrically coupled to a negative node A− of the A string and the battery pack power terminal BT2 is electrically coupled to a positive node A+ of the A string and the power tool power terminal TT1 is electrically coupled to a negative node of the power tool motor and the power tool power terminal TT2 is electrically coupled to a tool switch which is electrically coupled to a positive node of the power tool motor.

As illustrated in FIG. 4, when the battery pack is fully coupled/mated to the power tool, the A string of battery cells will be coupled to the motor. Specifically, the negative node of the motor will be coupled to the power tool negative power terminal TT1/Tool− (through a tool control module and switch), the power tool negative power terminal TT1/Tool− will be coupled to the battery pack negative power terminal BT1/BATT− which is coupled to the negative node A− of the A string of battery cells, the A string of battery cells are coupled in series presenting a positive node A+ of the A string of battery cells which is coupled to the battery pack positive power terminal BT2/BATT+ which is coupled to the power tool positive power terminal TT2/Tool+ which is coupled to the positive node of the motor (through a power tool switch).

Mechanically, the battery pack power terminals are positioned in a row near a rear side of the battery pack and the power tool power terminals are positioned in a row near a rear side of the power tool (rear and front being relative terms and being used solely to establish a context—other context and terms may be used to establish a functional same context). When the battery pack and the power tool are fully coupled/mated together the row of battery pack power terminals align with the row of power tool power terminals such that they mate to couple the battery cells to the motor.

FIGS. 5A, 5B, 5C, and 5D illustrate an exemplary embodiment of a new multi-voltage capable battery pack of the present invention. The new battery pack includes a housing which includes a mechanical interface. The mechanical interface of the new battery pack is very similar to the mechanical interface of the existing battery pack. The new battery pack mechanical interface includes a rail and groove configuration and latch configuration that enables the new battery pack to fully electrically and mechanically couple/mate with the existing tool. This will allow the new battery pack to power the existing power tool, as explained in more detail below. The packs are different in that while the new pack includes slots in the housing to allow the tool terminals to enter the battery pack housing and couple/mate with the battery pack terminals, the housing slots are elongated (longer) than the housing slots of the existing battery pack—for reasons that will be described below.

In addition, the new battery pack includes a multi-voltage state of charge indicator capable of displaying a first voltage state of charge, e.g. 20 volts and a second voltage state of charge, e.g. 60 volts.

Figure 6B:
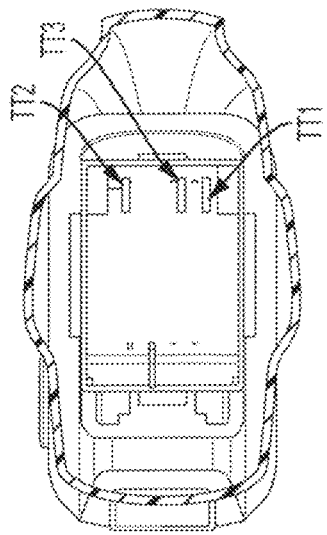
FIG. 6B is a section view an exemplary set of terminals of the power tool of FIG. 2
Figure 6A:
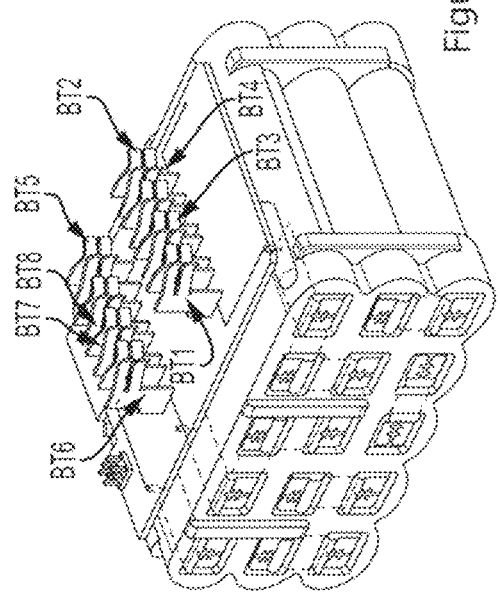
FIG. 6A is a top, rear perspective view of an exemplary core pack of the battery pack of FIG. 5.
Figure 6C:
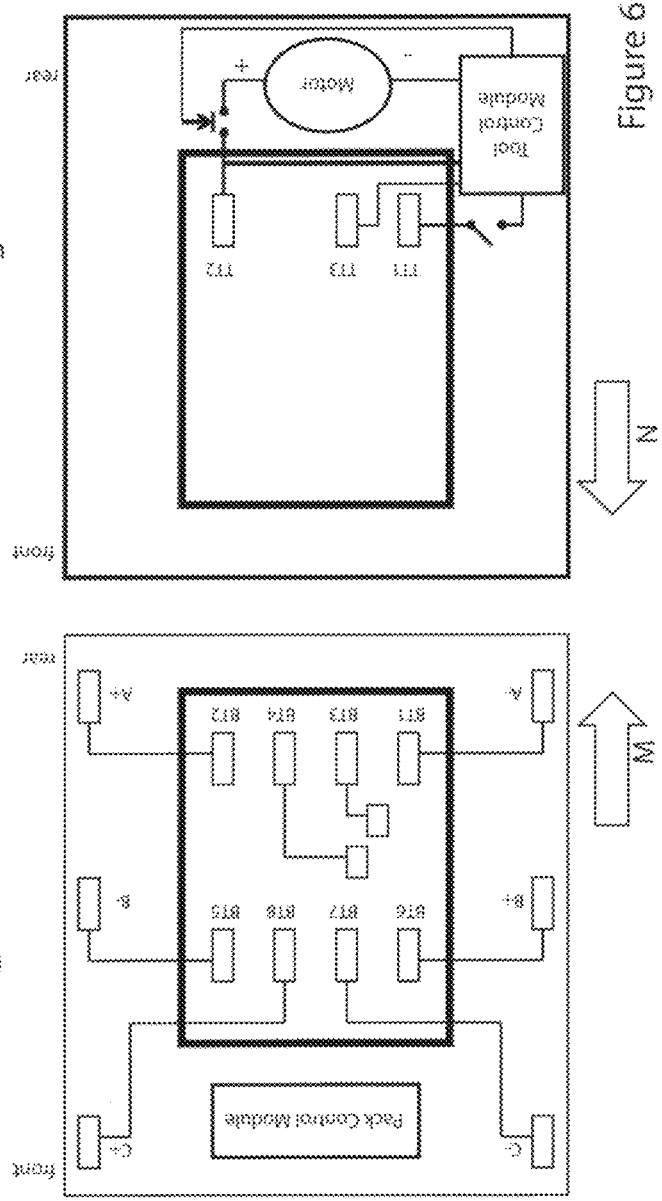
FIG. 6C is a simplified electromechanical schematic of the battery pack of FIG. 5 and the power tool of FIG. 2 prior to coupling.
Figure 7:
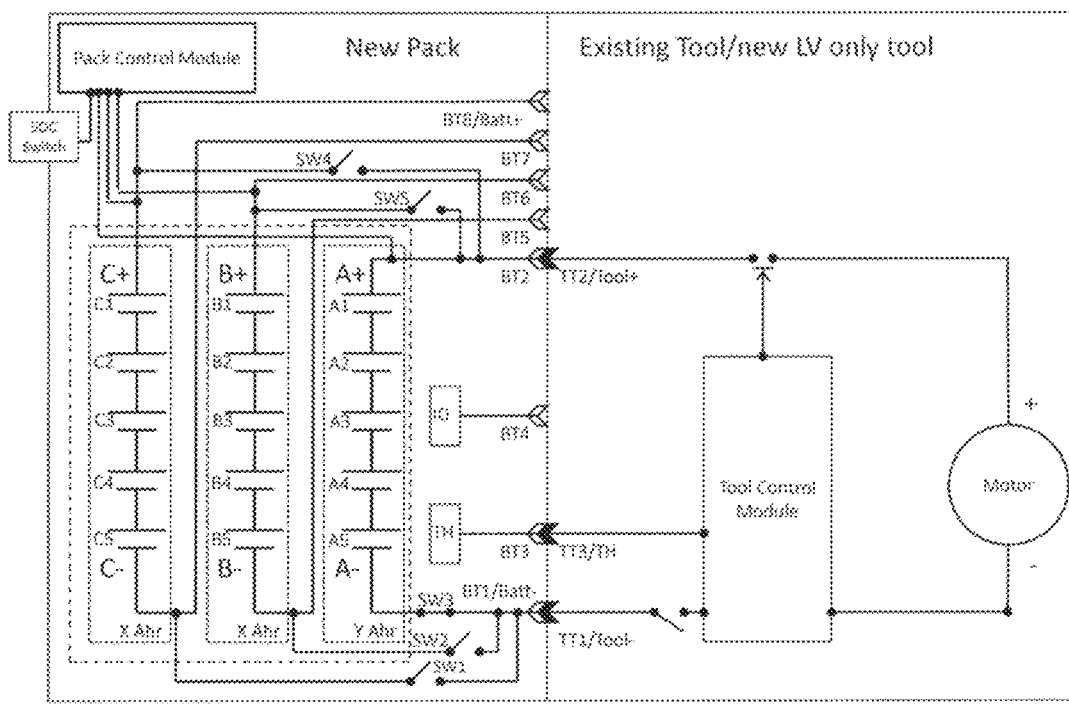
FIG. 7 is a simplified electrical schematic of the battery pack of FIG. 5 and the power tool of FIG. 2 when coupled.

FIGS. 6A, 6B, 6C and 7 illustrate the manner in which the existing tool couples/mates and operates with the new battery pack. As illustrated in FIG. 7, the new battery pack includes three sets of battery cells A, B, C. In this exemplary embodiment, each set includes a string of five battery cells coupled in series and each set is coupled to a discrete pair of battery pack power terminals. Specifically, the A set is coupled to battery pack power terminals BT1 and BT2, the B set is coupled to battery pack power terminals BT5 and BT6 and the C set is coupled to battery pack power terminals BT7 and BT8. As such, each of the sets are electrically isolated from each other.

In alternate embodiments, there could be two sets of battery cells or there could be more than three sets of battery cells while still providing electrically isolated sets of battery cells. In alternate embodiments, each set of cells could include multiple strings of battery cells coupled in parallel.

FIG. 6A illustrates an exemplary core pack of the new battery pack. As illustrated, the core pack includes fifteen battery cells (three strings of five cells) and a cell holder holding the cells in a fix position relative to each other. The core pack includes a PCB and a plurality (set) of battery pack terminals BT. The set of battery pack terminals BT include a subset of power terminals BT1, BT2, BT5, BT6, BT7, BT8. A first subset of power terminals BT1, BT2 are positioned in a first row toward the rear end of the battery pack and a second subset of power terminals BT5, BT6, BT7, BT8 are positioned in a second row, parallel to the first row, toward the front end of the battery pack. In this manner, the rearward power terminal BT2 is aligned with the forward power terminal BT5 and the rearward power terminal BT1 is aligned with the forward power terminal BT6. In this configuration, the power terminals BT2 and BT5 are aligned with a first elongated housing slot (the rearward power terminal BT2 positioned near the rearward end of the first housing slot and the forward power terminal BT5 positioned near the forward end of the first housing slot) and the power terminals BT1 and BT6 are aligned with a second elongated housing slot (the rearward power terminal BT1 positioned near the rearward end of the second housing slot and the forward power terminal BT6 positioned near the forward end of the second housing slot). In this embodiment, the forward power terminal BT7 is aligned with signal terminal BT3 and is positioned near a forward end of a third elongated housing slot and the forward power terminal BT8 is aligned with signal terminal BT4 and is positioned near a forward end of a fourth elongated housing slot.

Similar to the coupling the existing tool with the existing battery pack, the existing tool may couple/mate with the new battery pack. Specifically, when the battery pack moves in the direction of arrow M and/or the power tool moves in the direction of arrow N the power tool terminals will couple/mate with the battery pack terminals thereby coupling the battery pack battery cells to the power tool motor. As illustrated in FIG. 7, when the existing power tool couples/mates with the new battery pack, the power tool power terminals TT1/Tool–, TT2/Tool+ will couple with the battery pack power terminals BT1/Batt–, BT2/Batt+ respectively. In this manner, the existing power tool, e.g., a low voltage (20 volt) power tool, will couple to a low voltage (20 volt) set/string of battery cells. In this configuration, the existing tool will operate with one of the sets of battery cells in the new battery pack. In other words, the existing power tool will use a subset of the full set of battery cells in the new battery pack.

This configuration allows the new battery pack to be backwards compatible with existing power tools that previously only operated with existing battery packs in that system of power tools. This enables the existing system of power tools to expand by adding a new battery pack.

Figure 8A:
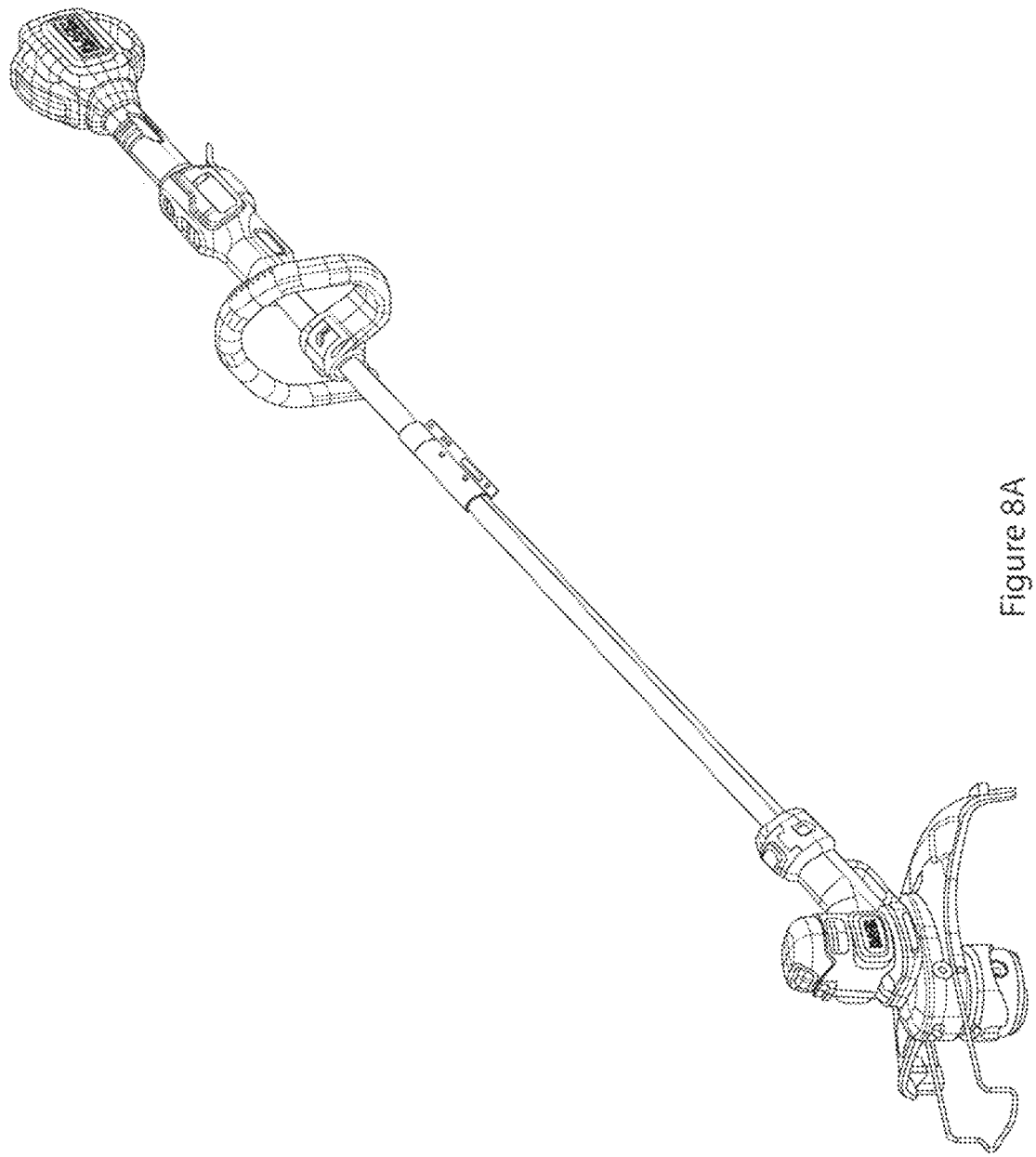
FIG. 8A is a right side perspective view of an exemplary embodiment of a high voltage power tool of the present disclosure.
Figure 8C:
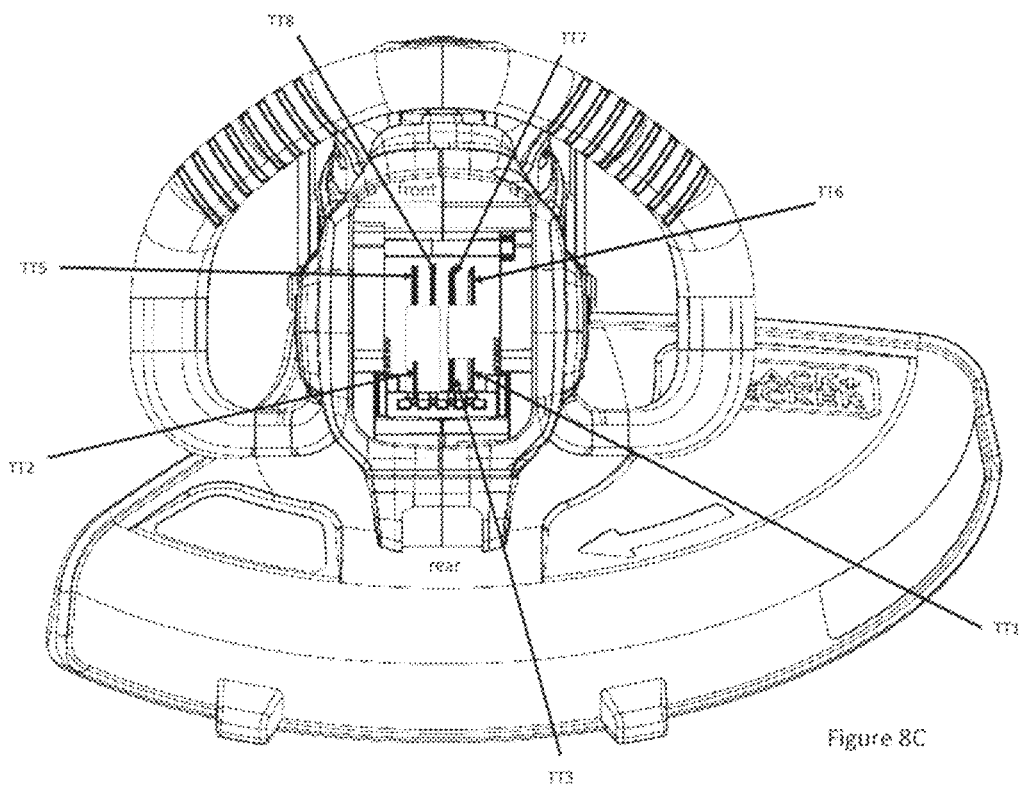
FIG. 8C is a rear view of the power tool of FIG. 8A

FIGS. 8A, 8B and 8C illustrate an exemplary new power tool of the present power tool system.

The new power tool is designed and configured to operate at a high voltage, for example 60 volts and to couple/mate and operate with a single battery pack, namely the new battery pack described above. The new power tool includes a novel set of power terminals that couple/mate and cooperate with the battery pack housing and power terminal configuration of the new battery pack described above.

The new power tool power terminals are configured in two rows that correspond to the two rows of the battery pack power terminals. Furthermore, the power tool power terminals are configured such that specific terminals are coupled together by jumpers such that the electrically isolated strings of battery cells of the battery pack are configured to match the voltage requirement of the power tool.

FIGS. 9A, 9B, 9C, and 10 illustrated and describe a first new power tool. This power tool is designed and configured to operate at a high voltage, e.g., 60 volts. The first new power tool includes a set of power tool terminals TT. The power tool terminals include a subset of power terminals TT1, TT2, TT5, TT6, TT7, TT8. A first subset of the power tool power terminals TT1, TT2 are positioned in a first, rearward row in the power tool. These terminals are positioned in a same relative position as the power tool power terminals of the existing power tool. A second subset of the power tool power terminals TT5, TT6, TT7, TT8 are positioned in a second, forward row of the power tool. In this configuration, the power tool power terminal TT5 is aligned with the power tool power terminal TT2 in a column and the power tool power terminal TT6 is aligned with the power tool power terminal TT1 in a column. Furthermore, in this embodiment, a jumper (which is simply a conductive material) couples the TT2 power terminal and the TT5 power terminal and a jumper couples the TT6 power terminal and the TT7 power terminal.

While the power terminals TT2 and TT5 are referred to as separate power terminals, functionally the two terminals TT2 and TT5 and the jumper may be formed with of a single conduction material formed into a flat or blade-like part. The blade may include a first or forward mating portion that mates with the corresponding battery power terminal and a second or rearward portion that mates with the corresponding battery power terminal. While the forward mating portion and the rearward mating portion are not discrete from the jumper portion of the blade, they serve the same purpose as a discrete terminal and will be referred to interchangeably herein. In alternate embodiments, if a terminal in the forward row of terminals is to be jumped with a terminal in a rearward row of terminals and these two terminals are in the same column they, along with the jumper, may be formed in a similar blade-like manner.

In this configuration, when the first new power tool couples/mates with the new battery pack, the forward row of power tool power terminals enter corresponding battery pack housing slots and move past or through the rearward row of battery pack power terminals and travel along the battery pack housing slots as the power tool moves into full engagement with the battery pack and move towards the forward end of the battery pack housing slots until the forward row of power tool power terminals couples/mates with the corresponding terminals of the forward row of battery pack power terminals. In addition, at the same time, the rearward row of power tool power terminals mates with the corresponding terminals of the rearward row of battery pack power terminals. In other words, the TT5 terminal moves through the first slot past the BT2 terminal and finally engages/mates with the BT5 terminal; the TT6 terminal moves through the second slot past the BT1 terminal and finally engages/mates with the BT6 terminal; the TT7 terminal moves through the third slot past the BT3 terminal and finally engages/mates with the BT7 terminal; and the TT8 terminal moves through the fourth slot past the BT4 terminal and finally engages/mates with the BT8 terminal.

Figure 10:
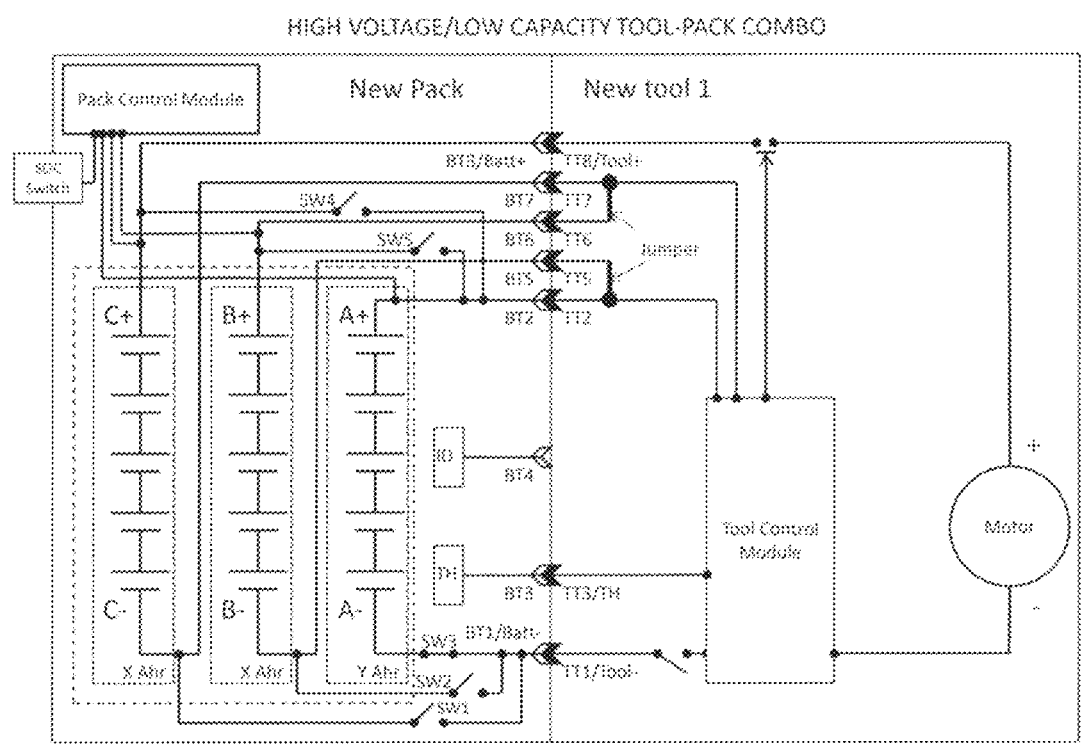
FIG. 10 is a simplified electrical schematic of the battery pack of FIG. 5 and the first exemplary power tool of FIG. 8 when coupled.

As illustrated in FIG. 10, when the first new power tool couples/mates with the new battery pack, the three sets of battery cells A, B, C are coupled in series. In this exemplary combination (each cell being a 4 volt cell, each string being a 20 volt string and the three strings being connected in series) the battery pack provides a 60 volt output for the 60 volt motor of the first new power tool. Specifically, the negative node of the motor is coupled to the TT1/Tool– terminal (through the tool control module and a first tool switch) which is coupled to the BT1/Batt– terminal which is coupled to the negative node of the A string of battery cells which is coupled, through the battery cells, to the positive node of the A string of battery cells which is coupled to the BT2 terminal which is coupled to the TT2 which is coupled, through a first jumper, to the TT5 terminal which is coupled to the BT5 terminal which is coupled to the negative node of the B string of battery cells which is coupled, through the battery cells, to the positive node of the B string of battery cells which is coupled to the BT6 terminal which is coupled to the TT6 terminal which is coupled, through a second jumper, to the TT7 terminal which is coupled to the BT7 terminal which is coupled to the negative node of the C string of battery cells which is coupled, through the battery cells to the positive node of the C string of battery cells which is coupled to the BT8/Batt+ terminal which is coupled to the TT8/Tool+ terminal which is coupled to the positive node of the motor, though a second tool switch.

It is the arrangement (positioning) of the power tool power terminals of the new power tool, the arrangement (positioning) of the battery pack power terminals and the shape and arrangement (positioning) of the battery pack housing slots of the new batter pack that enable the new power tool and the existing power tool to operate with the new battery pack.

FIGS. 11A, 11B, 11C and 12 illustrate a second new power tool and the new battery pack. This second new power tool includes a mechanical interface similar to the first new power tool including a rail and groove system that allows and enables the second new power tool to mechanically couple/mate with the new battery pack. The second new power tool also includes a terminal block and a plurality (set) of power tool terminals configured and positioned the same as the first new power tool. However, the power terminals of the second new power tool are jumped to each other differently than the first new power tool. The power tool power terminals of the second power tool are jumped (connected) together to couple the sets of battery cells in the new battery pack in parallel such that the new battery pack provides (outputs) the relatively low voltage but utilizes the full capacity of the new battery pack.

Figure 8D:
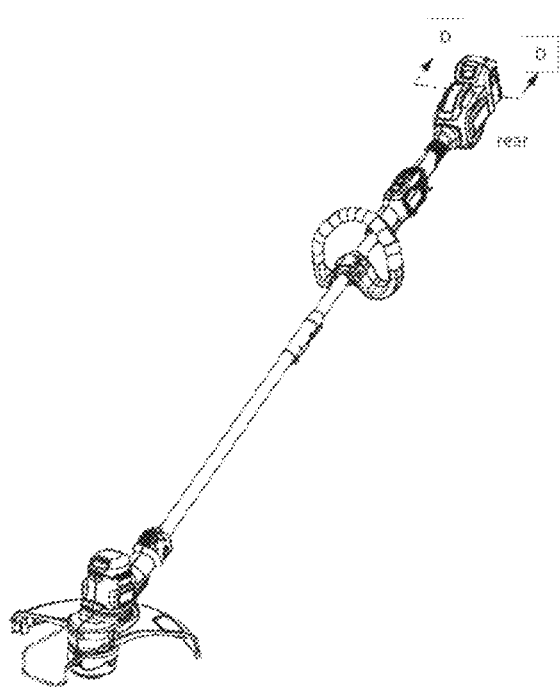
FIG. 8D is a right side perspective view of an exemplary embodiment of a high voltage power tool of the present disclosure coupled to the battery pack of FIG. 5.

Referring to FIG. 11B, which is a section view of the second new power tool taken along section line D-D of FIG. 8D and illustrates the terminal block of the second new power tool and the jumps/connections between the various power tool power terminals, it is shown that the TT1 power terminal, the TT5 power terminal and the TT7 power terminal are all electrically connected to each other and the TT2 power terminal, the TT6 power terminal and the TT8 power terminal are all electrically connected to each other. In addition, the TT1, TT5, TT7 power terminals are electrically isolated from the TT2, TT6 and TT8 power terminals.

With the foregoing connections between the power tool power terminals, when the power tool couples/mates with the new battery pack, the A, B, C sets of battery cells will be connected in parallel thereby providing a relatively low voltage and high capacity combination of a battery pack and power tool. Specifically, as the BT1 power terminal is aligned with the BT6 power terminal, the BT2 power terminal is aligned with the BT5 power terminal, BT3 power terminal is aligned with the BT7 power terminal and the BT4 power terminal is aligned with the BT8 power terminal, when the second new power tool mates with new battery pack (1) the TT6 power terminal will move into the second housing slot, past the BT1 power terminal, along the second housing slot until it mates with the BT6 power terminal and the TT1 power terminal mates with the BT1 power terminal, (2) the TT5 power terminal will move into first housing slot, past the BT2 power terminal, along the first housing slot until it mates with the BT5 power terminal and the TT2 power terminal mates with the BT2 power terminal, (3) the TT7 power terminal will move into the third housing slot, past the BT3 owner terminal, along the third housing slot until it mates with the BT7 power terminal and the TT3 power terminal mates with the BT3 power terminal, and (4) the TT8 power terminal will move into the fourth housing slot, past the BT4 power terminal, along the fourth housing slot until it mates with the BT8 power terminal.

Figure 12:
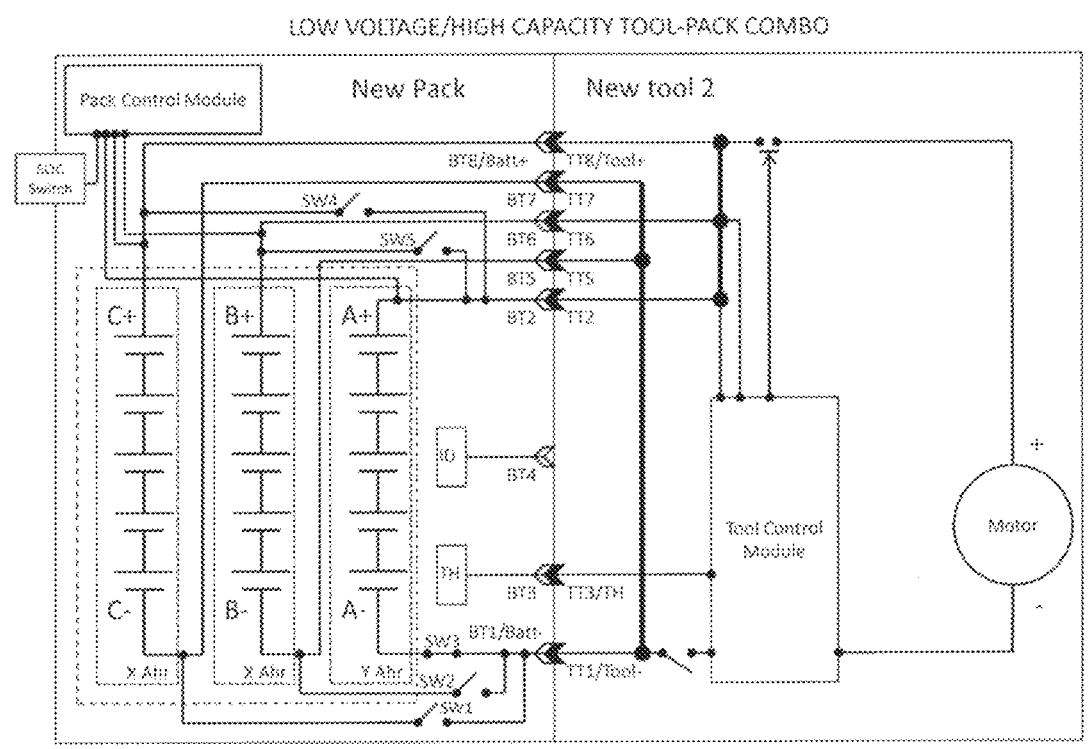
FIG. 12 is a simplified electrical schematic of the battery pack of FIG. 5 and the second exemplary power tool of FIG. 8 when coupled.

Referring to FIG. 12, once the second new tool is fully coupled/mated to the new battery pack the A, B, C sets (strings) of battery cells will be electrically coupled together in parallel through the power tool terminal block—power tool power terminals and jumpers—and to the power tool motor, providing the relatively low voltage, e.g., 20 volts and a relatively high capacity (X Ahr+X Ahr+Y Ahr). Specifically, a negative node of the power tool motor is coupled to the TT1/Tool− power terminal, through the tool control module and a first power tool switch, which is coupled to the BT1/Batt− power terminal which is coupled to the negative node of the A string, the TT5 power terminal is coupled to the TT1 power terminal through a jumper and to the BT5 power terminal which is coupled to the negative node of the B string, the TT7 power terminal is coupled to the TT1 power terminal (and the TT5 power terminal) through a jumper and to the BT7 power terminal which is coupled to the negative node of the C string. Furthermore, a positive node of the power tool motor is coupled to the TT8/Tool+ power terminal, through a second npower tool switch, which is coupled to the BT8/Batt+ power terminal which is coupled to the positive node of the C string, the TT6 power terminal is coupled to the TT8 power terminal through a jumper and to the BT6 power terminal which is coupled to the positive node of the B string and the TT2 power terminal is coupled to the TT8 power terminal through a jumper and to the BT2 power terminal which is coupled to the positive node of the A string.

In an alternate embodiment, the A string of battery cells may comprise cells of a first capacity (Ahr), for example, 3 Ahrs and the B string of battery cells and/or the C string of battery cells may comprise cells of a second capacity, for example 1.5 Ahrs.

In an alternate embodiment, the TT2 terminal, TT5 terminal and the connecting jumper may be a single conductive part having a forward contact portion configured to electrically and mechanically mate with the battery pack power terminal BT5 and a rearward contact portion configured to electrically and mechanically mate with the battery pack power terminal BT2. The same may be true for the TT6 terminal, the TT7 terminal and the connection jumper in that they may be a single conductive part having a first contact portion configured to electrically and mechanically mate with the battery pack power terminal BT6 and a second contact portion configured to electrically and mechanically mate with the battery pack power terminal BT7.

Process for Charging Battery Pack

As the new pack may couple to an existing power tool that only uses the A string of battery cells or to a new power tool that uses the A, B, and C strings of battery cells, the strings of battery cells may discharge unevenly. As such, it is important that the new battery pack take this uneven discharge into account when recharging. The new battery pack taking this issue into consideration, allows the new battery pack to be charged by existing battery pack chargers that were used to charge the existing battery packs.

Figure 13:
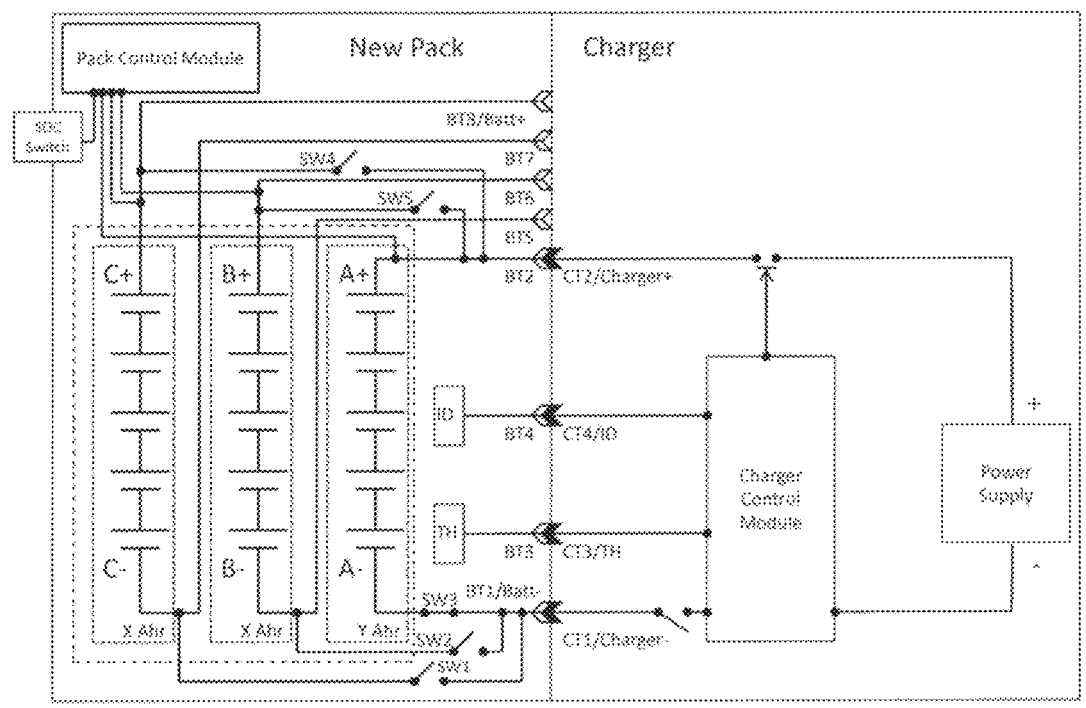
FIG. 13 is a simplified electrical schematic of the battery pack of FIG. 5 and an exemplary battery pack charger of the present disclosure.

Referring to FIG. 13, there is illustrated a new battery pack coupled/mated to an existing battery pack charger. The battery pack includes a pack control module. The pack control module may include a microprocessor and/or a microcontroller and/or application specific integrated circuit and/or other control components that are coupled to the strings of battery cells and switches as detailed below.

In this exemplary embodiment of the charging process, the new battery pack determines the voltage of each string of battery cells and couples only the string of battery cells having the lowest voltage to the charger to charge that string of cells first while ensuring the other strings of battery cells are not coupled to the charger thereby not charging the higher voltage strings of battery cells. When the string being charged reaches the voltage level of the previously determined next highest voltage string of battery cells the battery pack couples this next highest voltage string of battery cells to the charger to charge these strings of cells while insuring the remaining strings of battery cells are not coupled to the charger thereby not charging the higher voltage strings of battery cells. When the strings being charged reach the voltage level of the previously determined next highest voltage string of cells the battery pack couples this next highest voltage string of battery cells to the charger to charge these strings of cells. If the battery pack has more than three strings of battery cells, this process will continue until all of the strings of battery cells are being charged and then until the all the strings of battery cells are fully charged.

The battery pack also includes a set of switches SW1, SW2, SW3, SW4, SW5. These switches may be transistor switches, solenoid switches, contactor switches or other types of controllable switches. While not illustrated in FIG. 13 for purposes of simplicity, the control component in the pack control module is coupled to each of the switches SW to control the opening and closing of the switches SW. The control component in the pack control module is coupled to the positive node of each string A, B, C. While not illustrated, the control component may also be coupled to the negative node of each string A, B, C or to a common ground voltage with the strings A, B, C. As such, the control component is able to monitor and determine the voltage of each string A, B, C of battery cells. Again, while not specifically illustrated, the control component is also coupled to the battery pack thermistor circuit TH and the identification circuit ID.

Figure 14:
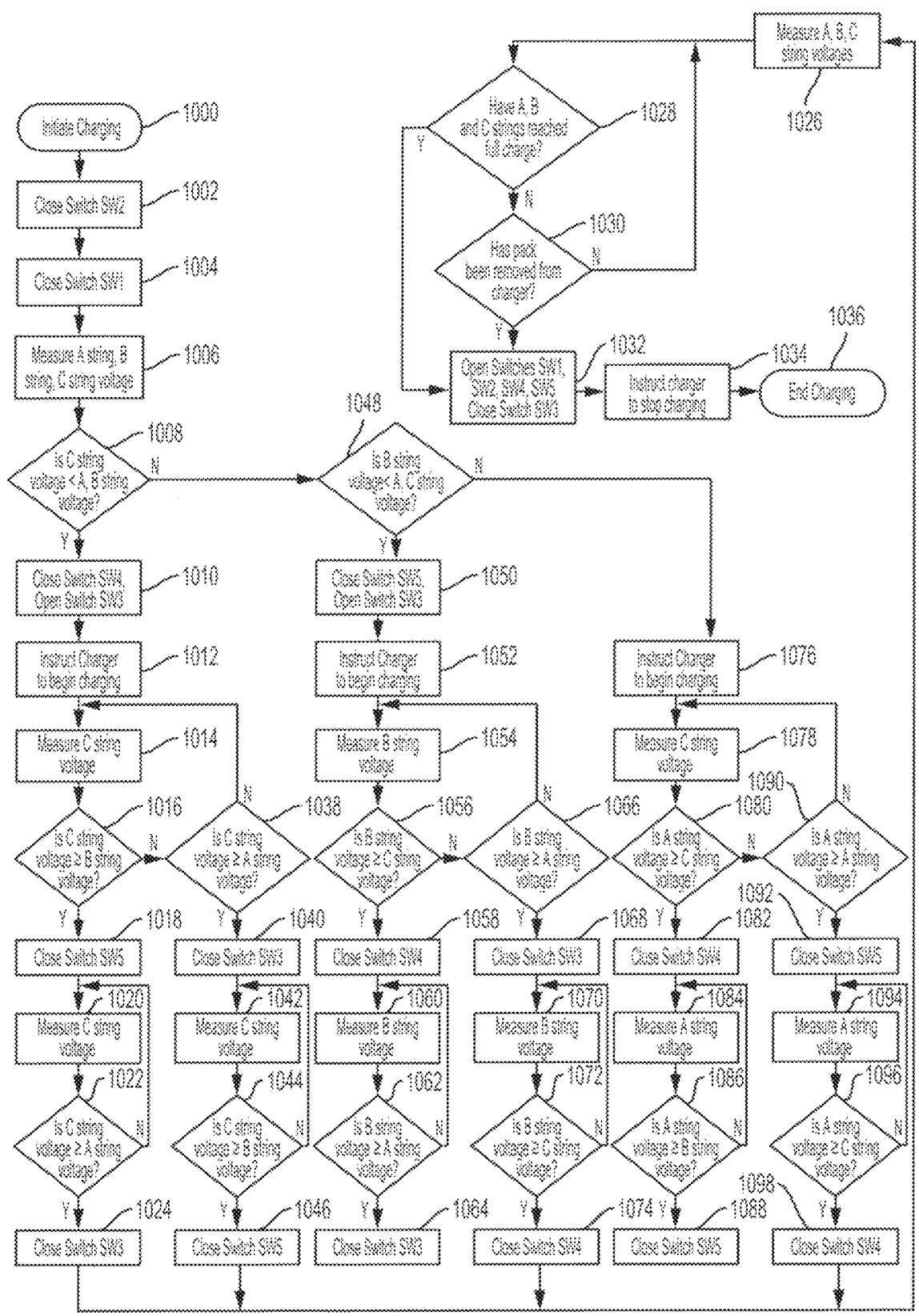
FIG. 14 is a flow chart describing an exemplary method of charging the battery pack of FIG. 5.

FIG. 14 illustrates a flow chart for an exemplary process for charging the new battery pack. At step 1000, the battery pack is placed in the charger and a subset of the battery pack terminals (BT1, BT2, BT3, BT4) couple/mate with a set of the charger terminals (CT1, CT2, CT3, CT4). This initiates the charging process. As part of this process, the charger control module, which may include a microprocessor and/or a microcontroller and/or application specific integrated circuit and/or other control components, receives a signal level voltage (signal) from the battery pack ID circuit via the BT4 battery terminal and the CT4 charger terminal and a signal level voltage (signal) from the battery pack TH circuit via the BT3 battery terminal and the CT3 charger terminal.

As noted in FIG. 13, the SW3 switch coupling the negative node of the A string to the BT1 battery terminal is closed in a default position and the SW1, SW2, SW4, SW5 switches are opened in a default position. Once the battery pack determines that is it coupled to the charge, the control component closes the SW2 and SW1 switches (steps 1002, 1004) and measures the voltage of the A string, B string and C string of battery cells (step 1006). These voltage measurements are stored in the pack control module for later comparison. Thereafter, the control component determines if the C string voltage is less than the A string voltage and the B string voltage (step 1008). If the answer to this query is yes, this would mean that the C string has the lowest voltage of the three strings of battery cells and will be charged first.

As such, the control component closes the SW4 switch and opens the SW3 switch (step 1010). In this configuration, only the C string of battery cells is coupled to the effective battery pack charging terminals BT1, BT2 and the charger charging terminals CT1, CT2. Thereafter, the control component sends a signal to the charger, through the ID circuit or the TH circuit, to begin charging the battery pack (step 1012).

As charging proceeds, the control component continues to monitor the voltage level of the C string of battery cells (step 1014) and determine if the voltage level of the C string is greater than or equal to the voltage level of the B string (step 1016). If the answer to this query is no (as it most likely will be after initiating the charging of the battery pack on this branch of the process), the control component will determine if the C string voltage is greater than or equal to the A string voltage (step 1038). If the answer to this query is no (as it most likely will be after initiating the charging of the battery pack on this branch of the process), the control component will continue to monitor the voltage of the C string (step 1014) and determine if the C string voltage has reached the level of the B string (step 1016) or the level of the A string (step 1038). At some point, the C string voltage will reach the level of the A string or the B string. If the C string voltage reaches the level of the B string first, the answer to the query related to step 1016 will be yes and this would mean that the B string had the second lowest voltage of the three strings and the A string had the third lowest (highest) voltage of the three strings. As such, the control component will close the SW5 switch (step 1018). This will couple the B string to the BT1, BT2 battery pack terminals and the CT1, CT2 charger terminals. As such, the charger will charge the C string and the B string of battery cells. Thereafter, the control component will measure the voltage of the C string (step 1020). As the C string and the B string were at the same voltage level when the B string was joined to the charger there is no need to measure the B string voltage also. However, the battery pack could be configured to measure the B string voltage also.

The control component then determines if the C string voltage has reached the voltage of the A string (step 1022). If the answer to this query is no, the control component will continue to monitor the voltage of the C string (step 1020) and determine if the C string voltage has reached the level of the A string (step 1022). At some point, the C string voltage will reach the level of the A string and the answer to the query of step 1022 will be yes. When this occurs, the control component will close the SW3 switch (step 1024). This will couple the A string to the BT1, BT2 battery pack terminals and the CT1, CT2 charger terminals. As such, the charger will charge the C string, the B string and the A string of battery cells.

The control component will continue to monitor the voltage of the A, B, C strings of cells (step 1026). The control component will determine if the strings of battery cells have reached their full charge (a predefined voltage level stored in the pack control module) (step 1028). If the answer to the query is no, the control component will determine if the battery pack has been removed from the charger (step 1030). If the battery pack has not been removed from the charger and the strings of battery cells have not reached their full charge, the charger will continue to charge the strings of battery cells until the strings have reached their full charge or the battery pack is removed from the charger. In either instance, the battery pack will open the SW1, SW2, SW4 and SW5 switches and insure that the SW3 switch is closed (step 1032). If the pack has not been removed from the charger, the battery pack will instruct the charger to stop providing a charging current to the battery pack (step 1034) and the charging process will end (step 1036).

If the C string voltage reaches the level of the A string first, the answer to the query related to step 1038 will be yes and this would mean that the A string had the second lowest voltage of the three strings and the B string had the third lowest voltage (highest voltage). As such, the control component will close the SW3 switch (step 1040). This will couple the A string to the BT1, BT2 battery pack terminals and the CT1, CT2 charger terminals. As such, the charger will charge the C string and the A string of battery cells. Thereafter, the control component will measure the voltage of the C string (step 1042). As the C string and the A string were at the same voltage level when the A string was joined to the charger there is no need to measure the A string voltage also. However, the battery pack could be configured to measure the A string voltage also.

The control component then determines if the C string voltage has reached has reached the voltage of the B string (step 1044). If the answer to this query is no, the control component will continue to monitor the voltage of the C string (step 1042) and determine if the C string voltage has reached the level of the B string (step 1044). At some point, the C string voltage will reach the level of the B string and the answer to the query of step 1044 will be yes. When this occurs, the control component will close the SW5 switch (step 1046). This will couple the B string to the BT1, BT2 battery pack terminals and the CT1, CT2 charger terminals. As such, the charger will charge the C string, the B string and the A string of battery cells. The process will continue as described above.

If the answer to the query at step 1008 is no, this would mean that the C string does not have the lowest voltage of the three strings of battery cells. The control component will then determine if the B string voltage is less than the A string voltage and the C string voltage (step 1048). If the answer to this query is yes, this would mean that the B string has the lowest voltage of the three strings of battery cells and will be charged first. As such, the control component closes the SW5 switch and opens the SW3 switch (step 1050). In this configuration, only the B string of battery cells is coupled to the effective battery pack charging terminals BT1, BT2 and the charger charging terminals CT1, CT2. Thereafter, the control component sends a signal to the charger, through the ID circuit or the TH circuit, to begin charging the battery pack (step 1052).

As charging proceeds, the control component continues to monitor the voltage level of the B string of battery cells (step 1054) and determine if the voltage level of the C string is greater than or equal to the voltage level of the B string (step 1056). If the answer to this query is no (as it most likely will be after initiating the charging of the battery pack on this branch of the process), the control component will determine if the B string voltage is greater than or equal to the A string voltage (step 1066). If the answer to this query is no (as it most likely will be after initiating the charging of the battery pack on this branch of the process), the control component will continue to monitor the voltage of the B string (step 1054) and determine if the B string voltage has reached the level of the C string (step 1056) or the level of the A string (step 1066). At some point, the B string voltage will reach the level of the C string or the A string. If the B string voltage reaches the level of the C string first, the answer to the query related to step 1056 will be yes and this would mean that the C string had the second lowest voltage of the three strings and the A string had the third lowest (highest) voltage of the three strings. As such, the control component will close the SW4 switch (step 1058). This will couple the C string to the BT1, BT2 battery pack terminals and the CT1, CT2 charger terminals.

As such, the charger will charge the C string and the B string of battery cells. Thereafter, the control component will measure the voltage of the B string (step 1060). As the C string and the B string were at the same voltage level when the C string was joined to the charger there is no need to measure the C string voltage also. However, the battery pack could be configured to measure the C string voltage also.

The control component then determines if the B string voltage has reached the voltage of the A string (step 1062). If the answer to this query is no, the control component will continue to monitor the voltage of the B string (step 1060) and determine if the B string voltage has reached the level of the A string (step 1062). At some point, the B string voltage will reach the level of the A string and the answer to the query of step 1062 will be yes. When this occurs, the control component will close the SW3 switch (step 1064). This will couple the A string to the BT1, BT2 battery pack terminals and the CT1, CT2 charger terminals. As such, the charger will charge the C string, the B string and the A string of battery cells and the process will continue as described above.

If the B string voltage reaches the level of the A string first, the answer to the query related to step 1066 will be yes and this would mean that the A string had the second lowest voltage of the three strings and the C string had the third lowest (and the highest) voltage. As such, the control component will close the SW3 switch (step 1068). This will couple the A string to the BT1, BT2 battery pack terminals and the CT1, CT2 charger terminals. As such, the charger will charge the B string and the A string of battery cells. Thereafter, the control component will measure the voltage of the B string (step 1070). As the B string and the A string were at the same voltage level when the A string was joined to the charger there is no need to measure the A string voltage also. However, the battery pack could be configured to measure the A string voltage also.

The control component then determines if the B string voltage has reached has reached the voltage of the C string (step 1072). If the answer to this query is no, the control component will continue to monitor the voltage of the B string (step 1070) and determine if the B string voltage has reached the level of the C string (step 1072). At some point, the B string voltage will reach the level of the C string and the answer to the query of step 1072 will be yes. When this occurs, the control component will close the SW4 switch (step 1074). This will couple the C string to the BT1, BT2 battery pack terminals and the CT1, CT2 charger terminals. As such, the charger will charge the C string, the B string and the A string of battery cells and the process will continue as described above.

If the answer to the query at step 1048 is no, this would mean that neither the C string nor the B string has the lowest voltage of the three strings of battery cells and therefore the A string has the lowest voltage of the three strings and will be charged first. As the A string is already coupled to the effective battery pack charging terminals BT1, BT2 (because the SW3 switch has a default closed position) and the charger charging terminals CT1, CT2 the control component can immediately send a signal to the charger, through the ID circuit or the TH circuit, to begin charging the battery pack (step 1076).

As charging proceeds, the control component continues to monitor the voltage level of the C string of battery cells (step 1078) and determine if the voltage level of the A string is greater than or equal to the voltage level of the C string (step 1080). If the answer to this query is no (as it most likely will be after initiating the charging of the battery pack on this branch of the process), the control component will determine if the A string voltage is greater than or equal to the B string voltage (step 1090). If the answer to this query is no (as it most likely will be after initiating the charging of the battery pack on this branch of the process), the control component will continue to monitor the voltage of the C string (step 1078) and determine if the A string voltage has reached the level of the C string (step 1080) or the level of the B string (step 1090). At some point, the A string voltage will reach the level of the C string or the B string. If the A string voltage reaches the level of the C string first, the answer to the query related to step 1080 will be yes and this would mean that the C string had the second lowest voltage of the three strings and the B string had the third lowest (or highest) voltage of the three strings. As such, the control component will close the SW4 switch (step 1082). This will couple the C string to the BT1, BT2 battery pack terminals and the CT1, CT2 charger terminals. As such, the charger will charge the C string and the A string of battery cells. Thereafter, the control component will measure the voltage of the A string (step 1084). As the C string and the A string were at the same voltage level when the C string was joined to the charger there is no need to measure the C string voltage also. However, the battery pack could be configured to measure the C string voltage also.

The control component then determines if the A string voltage has reached the voltage of the B string (step 1086). If the answer to this query is no, the control component will continue to monitor the voltage of the A string (step 1084) and determine if the A string voltage has reached the level of the B string (step 1086). At some point, the A string voltage will reach the level of the B string and the answer to the query of step 1086 will be yes. When this occurs, the control component will close the SW5 switch (step 1088). This will couple the B string to the BT1, BT2 battery pack terminals and the CT1, CT2 charger terminals. As such, the charger will charge the C string, the B string and the A string of battery cells and the process will continue as described above.

If the A string voltage reaches the level of the B string first, the answer to the query related to step 1090 will be yes and this would mean that the B string had the second lowest voltage of the three strings and the C string had the third lowest (and the highest) voltage. As such, the control component will close the SW5 switch (step 1092). This will couple the B string to the BT1, BT2 battery pack terminals and the CT1, CT2 charger terminals. As such, the charger will charge the B string and the A string of battery cells. Thereafter, the control component will measure the voltage of the A string (step 1094). As the A string and the B string were at the same voltage level when the B string was joined to the charger there is no need to measure the B string voltage also. However, the battery pack could be configured to measure the B string voltage also.

The control component then determines if the A string voltage has reached has reached the voltage of the C string (step 1096). If the answer to this query is no, the control component will continue to monitor the voltage of the A string (step 1094) and determine if the A string voltage has reached the level of the C string (step 1096). At some point, the A string voltage will reach the level of the C string and the answer to the query of step 1096 will be yes. When this occurs, the control component will close the SW4 switch (step 1098). This will couple the C string to the BT1, BT2 battery pack terminals and the CT1, CT2 charger terminals. As such, the charger will charge the C string, the B string and the A string of battery cells and the process will continue as described above.

Process for Determining State of Charge of Battery Pack

As the new battery pack is capable of providing multiple voltage outputs, for example, a low voltage (e.g., 20 volts) output for the existing power tool (at a low capacity) and the second new power tool (at a high capacity) and a high voltage (e.g., 60 volts) output for the first new power tool, and the strings battery cells may discharge (drain) at different rates. This is due to the fact that the new battery pack can be coupled to power tools that use the battery pack capacity in different manners. Specifically, while both the existing power tool and the second new power tool operate at 20 volts, the existing power tool only discharges the A string of battery cells while the second new power tool discharges all three strings of battery cells and the first new power tool operates at 60 volts and discharges all three strings of battery cells.

Figure 5A:
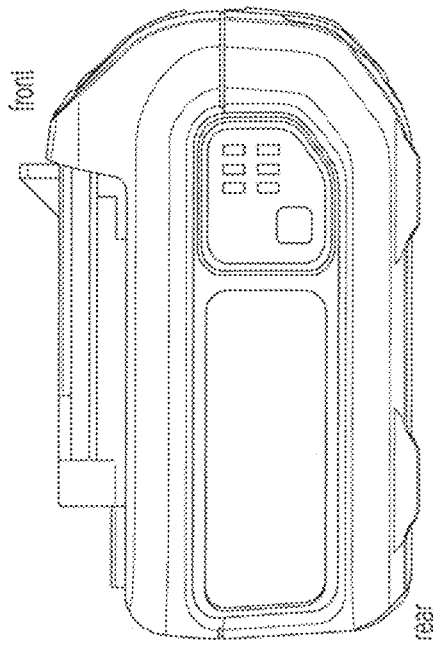
FIG. 5A is a right side elevation view of an exemplary multi-voltage capable battery pack of the present disclosure.
Figure 5B:
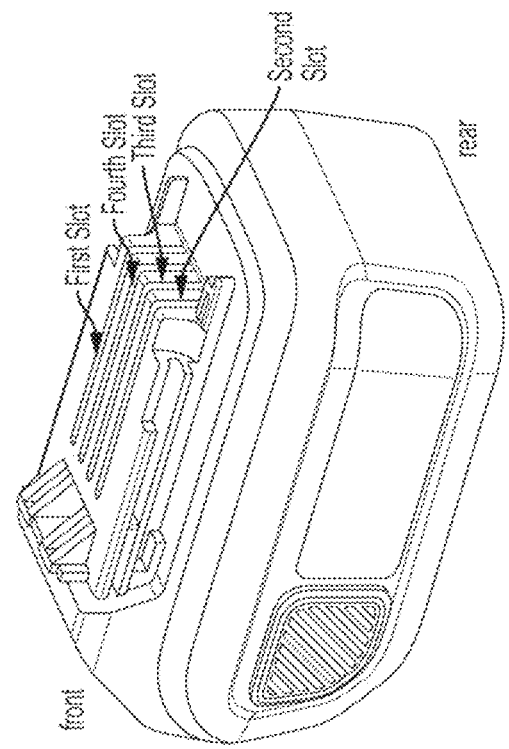
FIG. 5B is a left side elevation view of the battery pack of FIG. 5A.
Figure 5C:
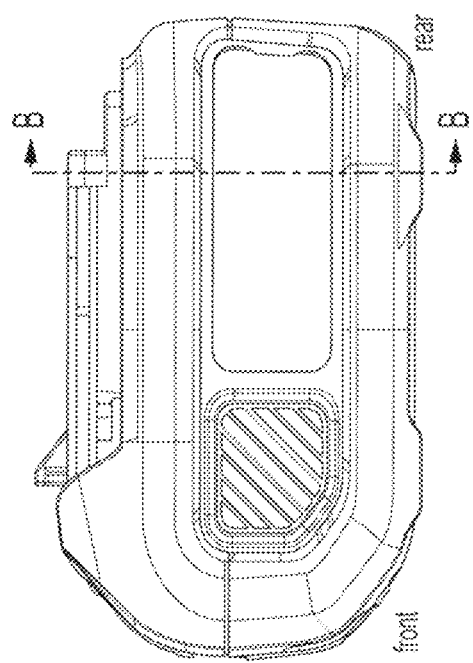
FIG. 5C is a top plan view of the battery pack of FIG. 5A
Figure 5D:
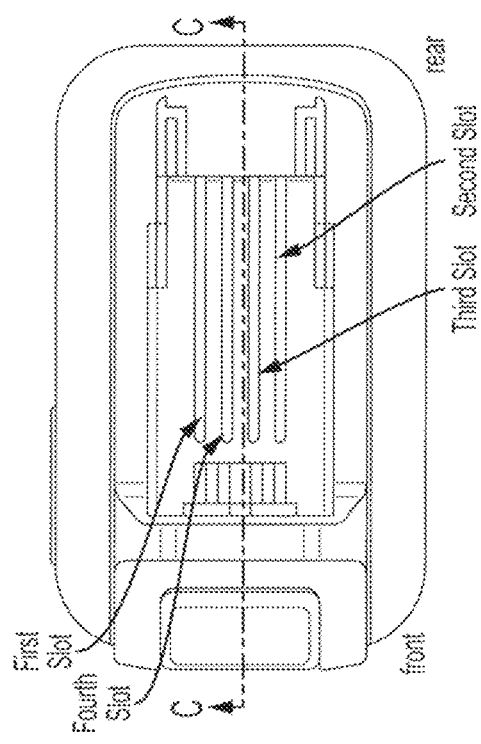
FIG. 5D is a top, rear perspective view of the battery pack of FIG. 5A.

As such, it is desirable to indicate to a user the state of charge of the battery cells in both the low voltage (20 volts) and the high voltage (60 volts). To this end, the new battery pack may include a state of charge indicator that displays a state of charge for multiple voltage levels. In this exemplary embodiment, the new battery pack includes a state of charge indicator that indicates the state of charge for a low voltage level (20 volts) and a high voltage level (60 volts). FIG. 5B illustrates an exemplary multi-voltage SOC of for the new battery pack. The SOC includes an SOC activation switch or button and two sets of display indicators. In this exemplary embodiment, each set of display indicators includes three LEDs. In this embodiment, there is a first row of three LEDs for the low voltage level (20 volts) and a second row of three LEDs for the high voltage level (60 volts).

Figure 15:
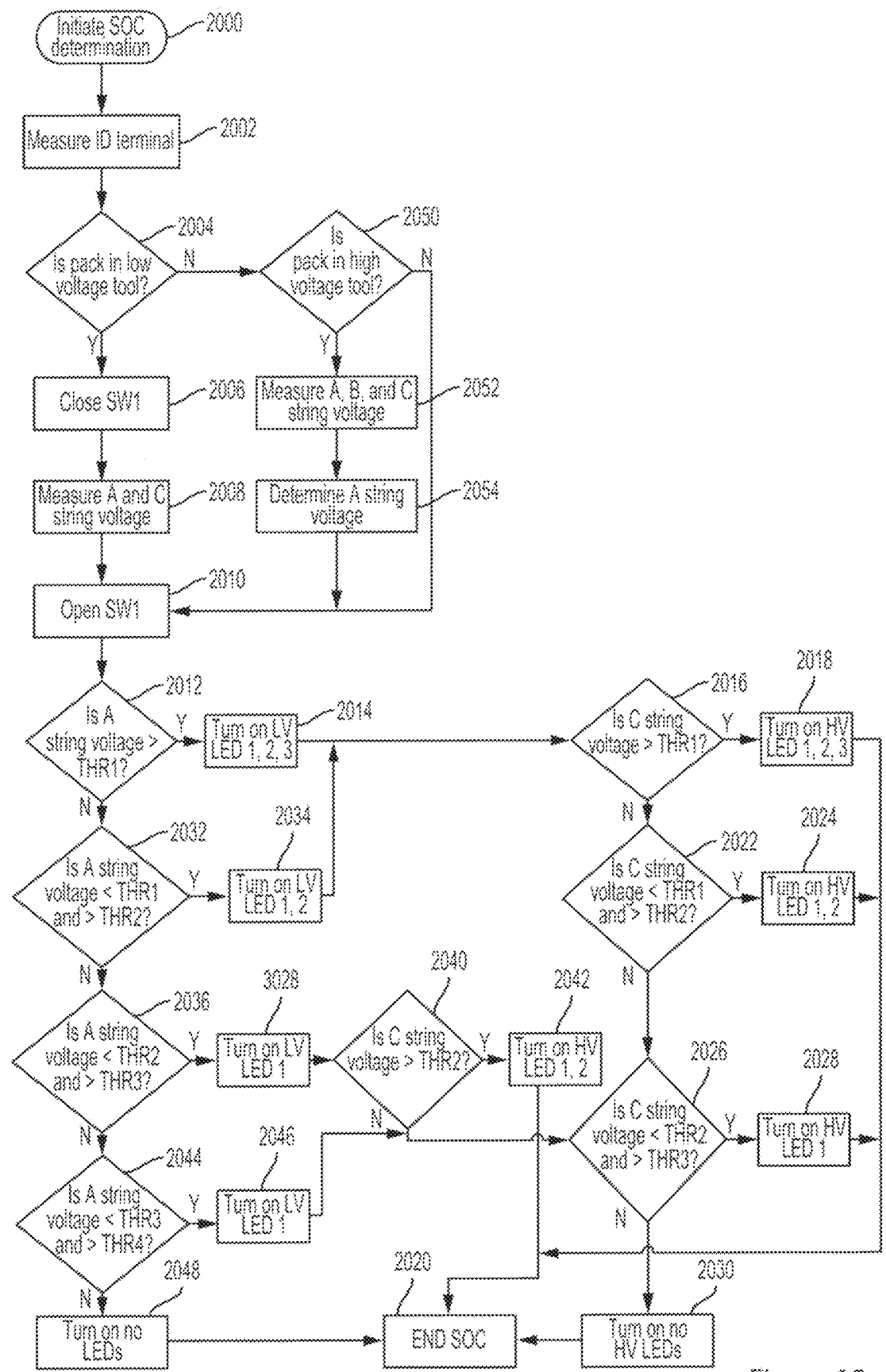
FIG. 15 is a flow chart describing an exemplary method of determining a state of charge of the battery pack of FIG. 5.
Figure 16A:
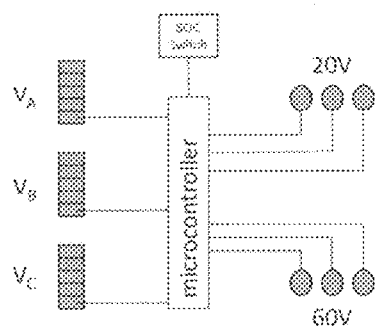
FIGS. 16A-16W illustrate an exemplary methodology for displaying various states of charge of the battery pack of FIG. 5.
Figure 16B:
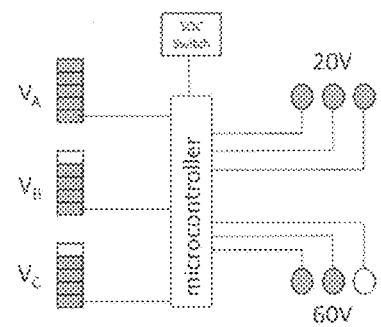
Figure 16C:
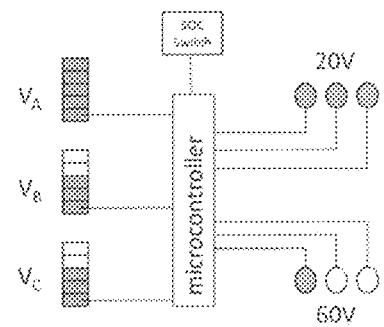
Figure 16D:
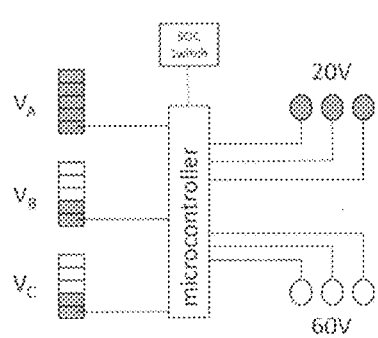
Figure 16E:
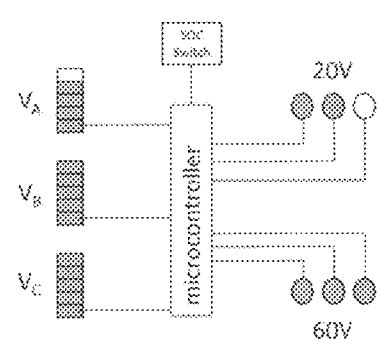
Figure 16F:
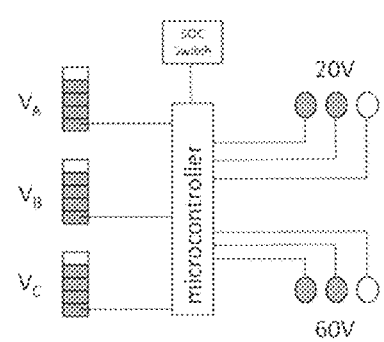
Figure 16G:
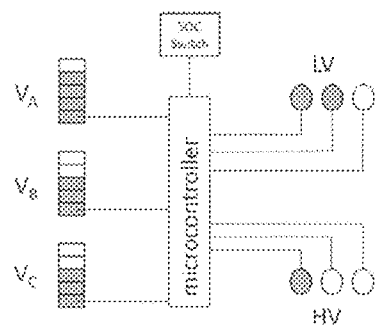
Figure 16H:
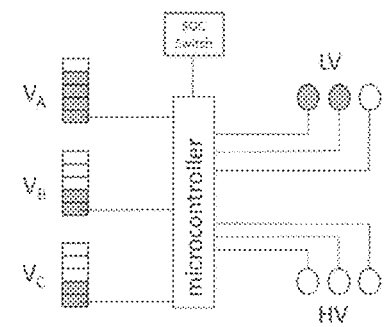
Figure 16I:
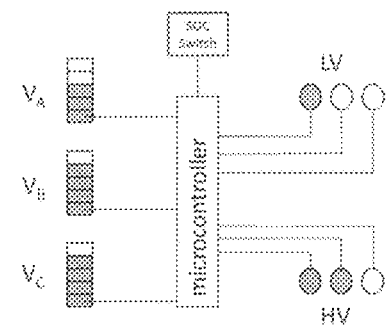
Figure 16J:
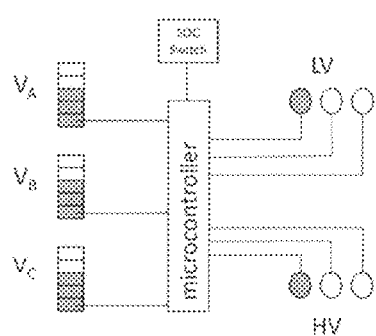
Figure 16K:
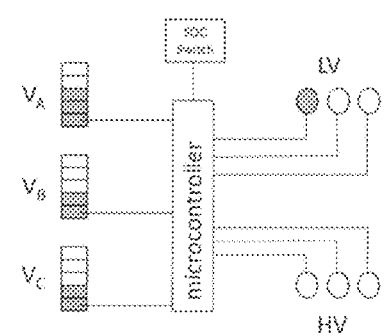
Figure 16L:
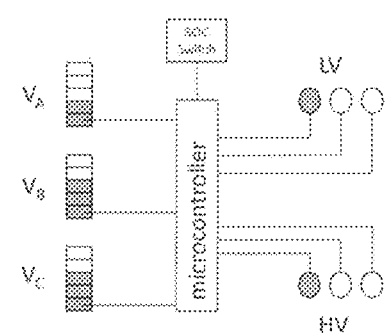
Figure 16M:
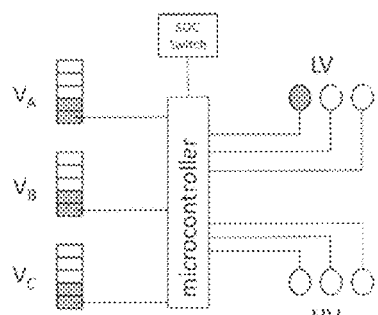
Figure 16N:
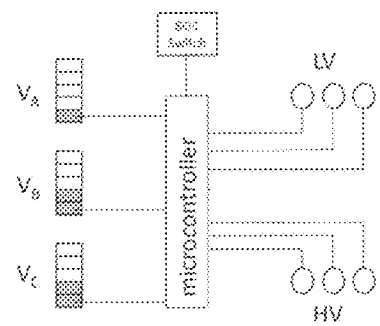
Figure 16O:
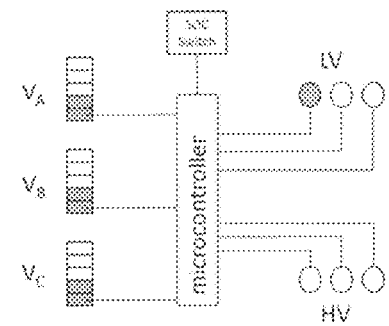
Figure 16P:
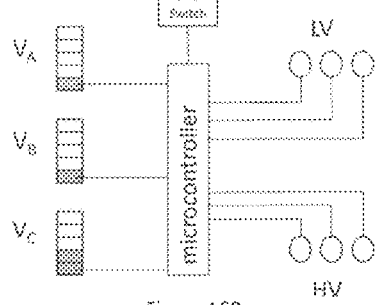
Figure 16Q:
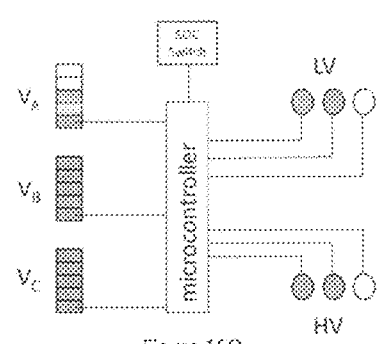
Figure 16R:
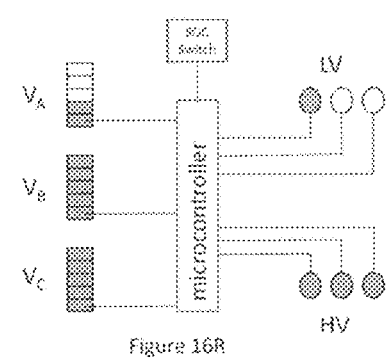
Figure 16S:
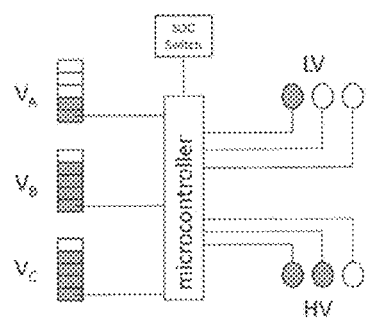
Figure 16T:
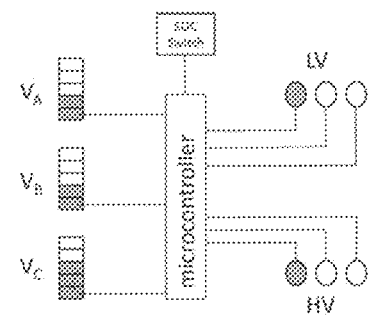
Figure 16U:
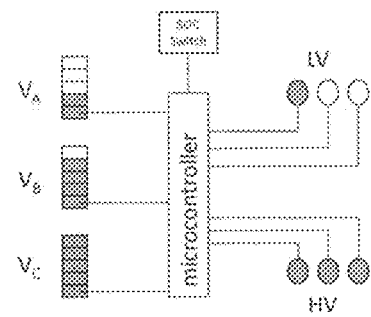

FIG. 15 illustrates a flow chart of an exemplary method of determining and displaying a multi-voltage state of charge indicator. FIGS. 16A through 16R illustrate a vertical bar graph representing the strings of battery cells and a voltage level (V) of the three strings of battery cells. Specifically, $V_A$ represents the voltage level of the A string of battery cells, $V_B$ represents the voltage level of the B string of battery cells and $V_C$ represents the voltage level of the C string of battery cells. Each bar graph includes five segments. If all five segments are filled the particular string has a state of charge greater than a first threshold (THR1) up to a full state of charge. If four of the segments are filled the particular string has a state of charge greater than a second threshold (THR2) but less than or equal to the first threshold THR1. If three of the segments are filled the particular string has a state of charge greater than a third threshold (THR3) but less than or equal to the second threshold THR2. If two of the segments are filled the particular string has a state of charge greater than a fourth threshold (THR4) but less than or equal to the third threshold THR3. If one of the segments is filled the particular string has a state of charge less than or equal to the fourth threshold THR4. Generally speaking, a discharge control circuit in the pack control module will prevent the battery cells from completely discharging.

FIGS. 16A through 16R also illustrate microcontroller coupled to each of the bar graphs. The microcontroller is part of the pack control module and is coupled to each of the strings of battery cells to enable the microcontroller to monitor, measure and determine the voltage of each string of battery cells. FIGS. 16A through 16R also illustrate a state of charge switch coupled to the microcontroller. The SOC switch is located on the battery pack housing. When the switch is activated a signal is sent to the microcontroller. The microcontroller, in turn, uses the information regarding the voltage levels of the strings of battery cells to activate the appropriate LEDs.

Referring now to FIG. 15 and FIGS. 16A through 16R, a process for determining the state of charge for each voltage level of the new battery pack will be described. When the SOC switch is activated the SOC determination is initiated (step 2000). The control component, for example the microcontroller, measures the voltage at the ID terminal BT4 of the battery pack (step 2002). In an exemplary embodiment, a particular tool may have a particular voltage at the TH terminal. Specifically, a low voltage tool will have a first voltage and a high voltage tool will have a second, different voltage. Based on the TH terminal voltage, the battery pack control component determines if the battery pack is coupled to a low voltage power tool (step 2004). If the answer to this query is yes, the control component closes the SW1 switch (step 2006). This places both the A string and the C string at the same ground voltage. Recall that the SW3 switch is in a closed state as a default condition. The control component then measures the A string voltage and the C string voltage and stores those voltage measurements in memory (step 2008). The control component then opens the SW1 switch (step 2010). In this exemplary process, it is presumed that the B string and the C string have charged/discharged at the same rate and only takes the C string into account when determining the state of charge of the C string and the B string for SOC indication purposes. In alternate exemplary processes, the battery pack can measure both the C string voltage and the B string voltage and use these measurements for the SOC indication process. Such a process will be similar to the discussed process.

The control component, for example the microcontroller, determines if the A string voltage $V_A$ is greater than THR1 (step 2012). If the answer to this query is yes the control component will illuminate all three low voltage LV (e.g. 20 volts) indicator LEDs (step 2014). The control component will then determine if the C string voltage $V_C$ is greater than THR1 (step 2016). If the answer to this query is yes the control component will illuminate all three high voltage HV (e.g. 60 volts) indicator LEDs (step 2018). This will look like FIG. 16A. If the answer to the query of step 1016 is no, the control component will determine if the C string voltage $V_C$ is less than or equal to THR1 but greater than THR2 (step 2022). If the answer to this query is yes, the control component will illuminate two of the three HV indicator LEDs (step 2024). This will look like FIG. 16B. If the answer to the query of step 2022 is no, the control component will determine if the C string voltage $V_C$ is less than or equal to THR2 but greater than THR3 (2026). If the answer to this query is yes, the control component will illuminate one of the three HV indicator LEDs (step 2028). This will look like FIG. 16C. If the answer to the query of step 2026 is no, the control component will leave all of the three HV indicator LEDs off (step 2030). This will look like FIG. 16D. The SOC determination process will then end (step 2020).

If the answer to the query of step 2012 is no, the control component will determine if the A string voltage $V_A$ is less than or equal to THR1 but greater than THR2 (step 2032). If the answer to this query is yes, the control component will illuminate two of the three LV indicator LEDs (step 2034). The control component will then determine if the C string voltage $V_C$ is greater than THR1 (step 2016). If the answer to this query is yes the control component will illuminate all three high voltage HV indicator LEDs (step 2018). This will look like FIG. 16E. If the answer to the query of step 1016 is no, the control component will determine if the C string voltage $V_C$ is less than or equal to THR1 but greater than THR2 (step 2022). If the answer to this query is yes, the control component will illuminate two of the three HV indicator LEDs (step 2024). This will look like FIG. 16F. If the answer to the query of step 2022 is no, the control component will determine if the C string voltage $V_C$ is less than or equal to THR2 but greater than THR3 (2026). If the answer to this query is yes, the control component will illuminate one of the three HV indicator LEDs (step 2028). This will look like FIG. 16G. If the answer to the query of step 2026 is no, the control component will leave all of the three HV indicator LEDs off (step 2030). This will look like FIG. 16H. The SOC determination process will then end (step 2020).

If the answer to the query of step 2032 is no, the control component will determine if the A string voltage $V_A$ is less than or equal to THR2 but greater than THR3 (step 2036). If the answer to this query is yes, the control component will illuminate one of the three LV indicator LEDs (step 3028). The control component will then determine if the C string voltage $V_C$ is greater than THR2 (step 2040). If the answer to this query is yes, the control component will illuminate two of the three HV indicator LEDs (step 2042). This will look like FIG. 16I. The SOC determination process will then end (step 2020).

If the answer to the query of step 2040 is no, the control component will determine if the C string voltage $V_C$ is less than or equal to THR2 but greater than THR3 (step 2026). If the answer to this query is yes, the control component will illuminate one of the three HV indicator LEDs (step 2028). This will look like FIG. 16J. The SOC determination process will then end (step 2020).

If the answer to the query of step 2026 is no, the control component will leave all three of the HV indicator LEDs off (step 2030). This will look like FIG. 16K. The SOC determination process will then end (step 2020).

If the answer to the query of step 2036 is no, the control component will determine if the A string voltage $V_A$ is less than or equal to THR3 but greater than THR4 (step 2044). If the answer to this query is yes, the control component will illuminate one of the three LV indicator LEDs (step 2046). The control component will then determine if the C string voltage $V_C$ is less than or equal to THR2 but greater than THR3 (step 2026). If the answer to this query is yes, the control component will illuminate one of the three HV indicator LEDs (step 2028). This will look like FIG. 16L. The SOC determination process will then end (step 2020).

If the answer to the query of step 2026 is no, the control component will leave all three of the HV indicator LEDs off (step 2030). This will look like FIG. 16M. The SOC determination process will then end (step 2020).

If the answer to the query of step 2044 is no, the control component will leave all of the indicator LEDs off (step 2048). This will look like FIG. 16N. The SOC determination process will then end (step 2020).

Figure 16V:
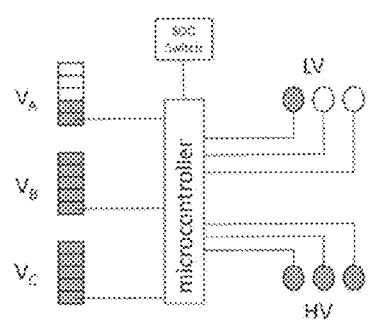
Figure 16W:
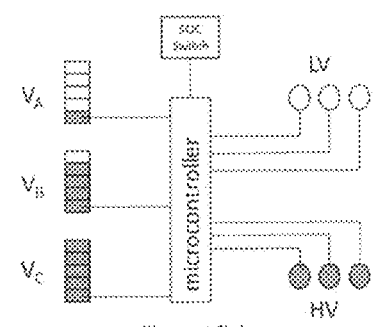
Figure 17:
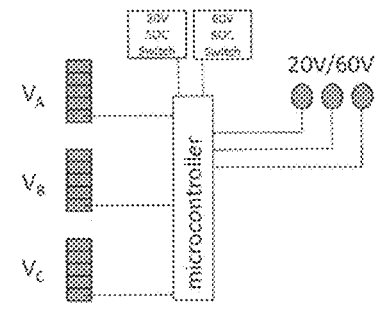
FIG. 17 illustrates another exemplary methodology for displaying various states of charge of an alternate embodiment of the battery pack of FIG. 5.

FIGS. 16O through 16U represent a state of charge of alternate battery packs, for example a battery pack in which the three strings of cells may each have different capacities or where the power tool system includes additional power tools that connect to only two of the three strings and thereby discharge the A string and the B string while not discharging the C string. FIGS. 16V and 16W represent a scenario in which the new battery pack is coupled only to a low voltage power tool (e.g., 20 volt tool) and discharges only the A string.

In an alternate embodiment, the new battery pack may include two SOC activation switches—a low voltage LV switch and a high voltage HV switch—but only one set of indicator LEDs. In this embodiment, when the LV switch is activated, the battery pack will simply measure the A string and determine which indicator LEDs to illuminate in the same manner as described above with respect to the LV indicator LEDs and when the HV switch is activated, the battery pack will go through the same process described above but only illuminate the indicator LEDs in accordance with the HV indicator LEDs.

Fluid Management System

Figure 18:
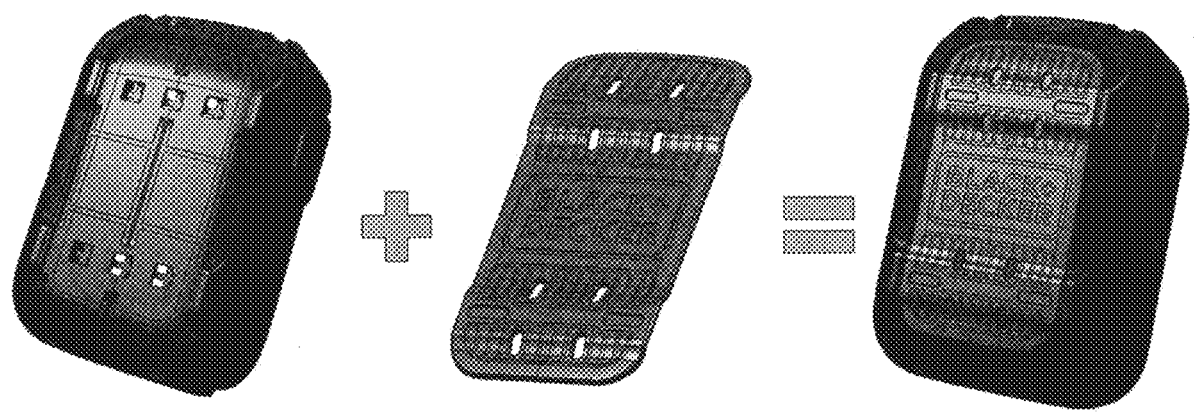
FIG. 18 illustrates an assembly process of the exemplary battery pack of FIG. 5 for coupling an exemplary fluid management system of the present disclosure.
Figure 19A:
FIG. 19A illustrates a perspective section view of the exemplary battery pack of FIG. 5 along section line Q-Q without a fluid management system cover and FIG. 19B illustrates a perspective section view of the exemplary battery pack of FIG. 5 along section line Q-Q with a fluid management system cover.
Figure 19B:
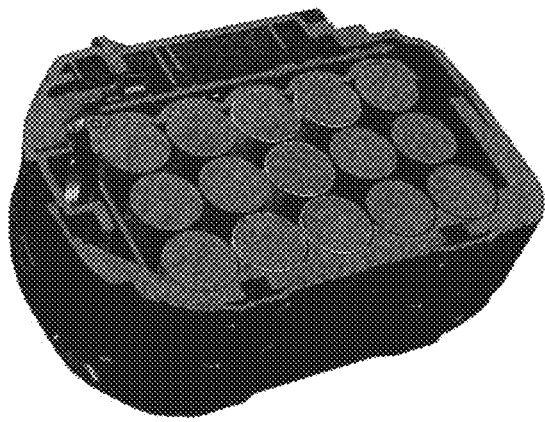
Figure 20:
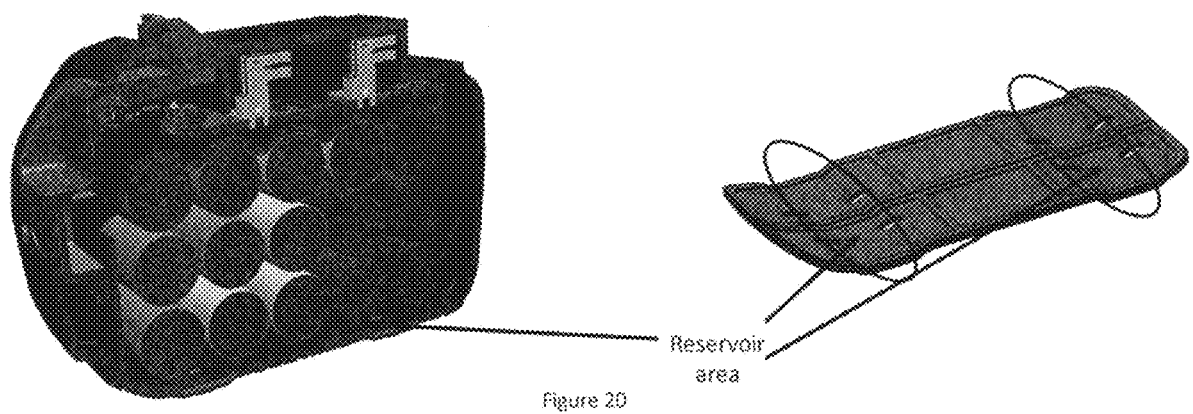
FIG. 20 illustrates another perspective section view of the exemplary battery pack of FIG. 5 along section line Q-Q with the fluid management system cover and a detail view of the fluid management system cover.
Figure 21:
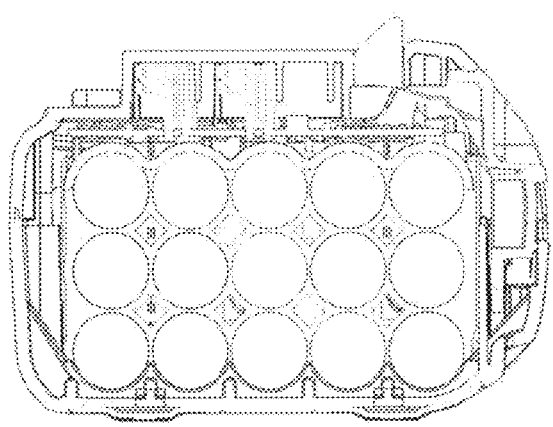
FIG. 21 illustrates another section view of the exemplary battery pack of FIG. 5 along section line Q-Q with the fluid management system cover.
Figure 22:
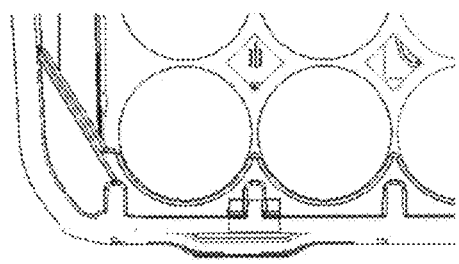
FIG. 22 illustrates a detail view of FIG. 21.
Figure 23:
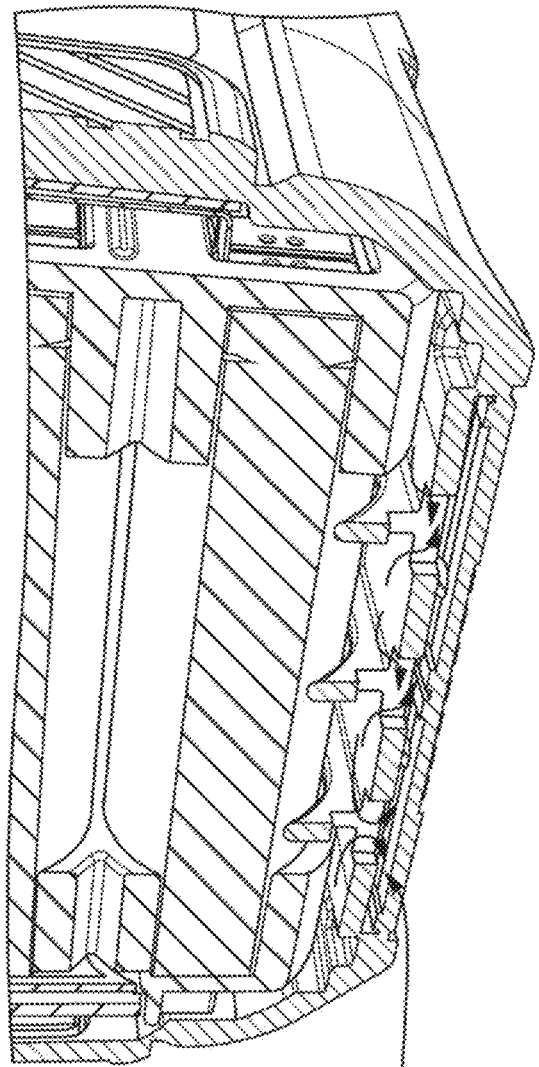
FIG. 23 illustrates a perspective section view of the exemplary battery pack of FIG. 5 along section line R-R with the fluid management system cover and a detail view of the fluid management system cover.
Figure 24:
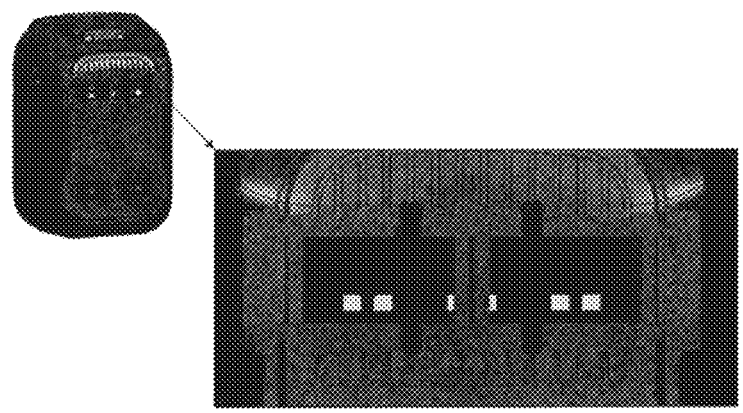
FIG. 24 illustrates a bottom perspective view of the battery pack of FIG. 5 and a detail view of the fluid management system cover with a portion of the cover removed to illustrate a portion of the bottom housing of the battery pack.

FIG. 18 illustrates an exemplary battery pack having a novel fluid management system. The battery pack includes a housing having a bottom portion. The bottom portion includes a bottom wall. The bottom wall includes a plurality of holes. The holes extend from an interior cavity defined by the housing to a space outside the housing. In this embodiment, there are six holes positioned in two parallel rows—a forward row and a rearward row. Each hole of the forward row also aligns with a corresponding hole of the rearward row thereby also forming a plurality of columns of rows. Alternate embodiments may have additional holes arranged in additional rows and columns or in the same number of rows and columns.

The battery pack also comprises a cover plate having an interior surface and an exterior surface. Portions of the interior surface of the cover plate are affixed to the bottom portion of the battery pack. The illustrated exemplary embodiment of the cover plate includes two offset portion. In this exemplary embodiment, the offset portion is formed by bends in the cover plate to form a volume such that when the cover plate is attached to the battery housing a space is formed between a portion of the bottom wall and a portion of the cover plate. As one of the offset portions is positioned about each of the rows of housing holes the space between the bottom wall and the cover plate is about the holes in the bottom wall. As such, water that drains from the interior cavity of the battery pack through the holes in the bottom wall of the housing may move into the space between the bottom wall and the cover plate. This space is also referred to as a reservoir area.

The cover plate may also include a plurality of holes extending from the interior surface of the cover plate to the exterior surface of the cover plate. These cover plate holes may be formed in the bends of the cover plate. The cover plate holes allow water that has drained into the reservoir area to drain outside the battery pack.

In this exemplary embodiment, the cover plate holes are positioned offset from housing holes. Specifically, the cover holes are positioned between and/or offset from adjacent housing holes. Having the holes offset increases the distance exterior contamination must travel to reach the interior cavity. In addition, exterior contamination must travel through the reservoir area to reach the interior cavity.

The present disclosure is directed to a cordless power tool system. The present disclosure is more particularly directed to a cordless power tool system including at least one battery pack that is capable of supplying multiple voltages for powering an attached cordless power tool. More particularly, the at least one battery pack is capable of providing a first voltage to a first cordless power tool and a second voltage to a second cordless power tool. The at least one battery pack includes two internal connection circuits—a first connection circuit for coupling to the first cordless power tool to provide the first voltage and a second connection circuit for coupling to the second cordless power tool to provide the second voltage.

Figure 25:
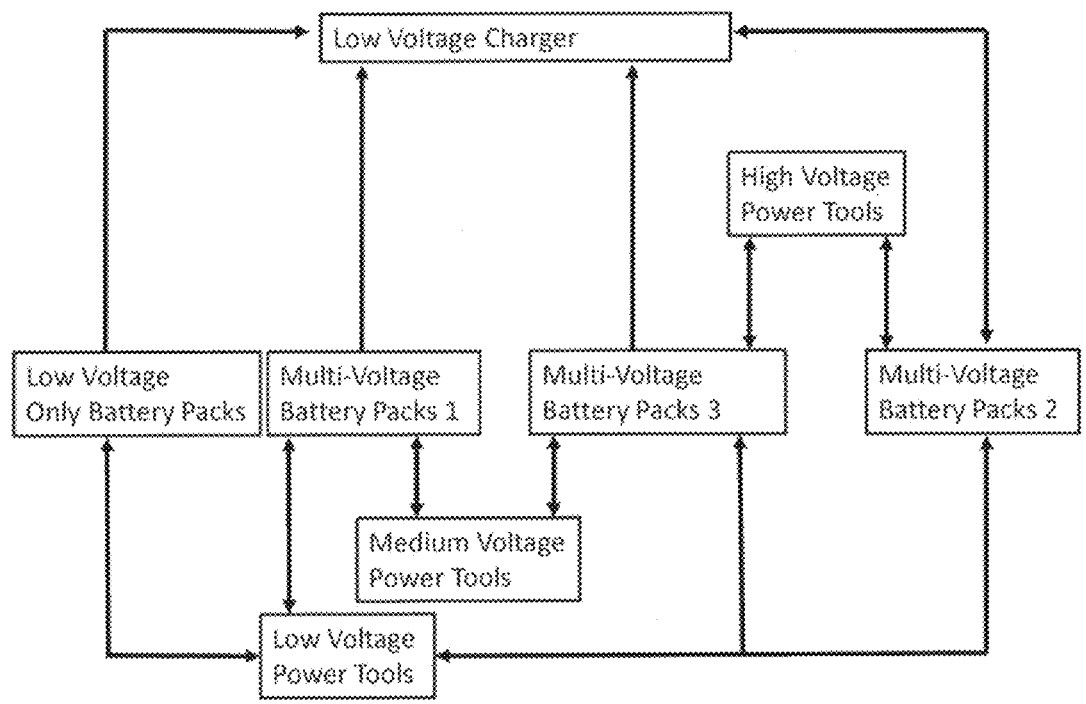
FIG. 25 is a block diagram of an exemplary embodiment of a cordless power tool system of the present disclosure.

FIG. 25 illustrates a block diagram of an exemplary cordless power tool system. This exemplary cordless power tool system may include low (rated) voltage power tools, for example tools designed and configured to operate at a relative low (rated) voltage, for example 20 volts; medium (rated) voltage power tools, for example tools designed and configured to operate at a relative medium voltage (rated voltage), for example 40 volts; and high voltage power tools, for example tools designed and configured to operate at a relative high (rated) voltage, for example 60 volts. This exemplary cordless power tool system may also include a low (rated) voltage only battery pack, for example a battery pack designed and configured to provide only a relative low (rated) voltage, for example 20 volts.

By "provide a voltage" it is intended that the battery pack is capable of providing a nominal or maximum voltage across its power terminals, for example 20 volts nominal or maximum. This is sometimes referred to as a rated voltage or an operating voltage in the power tool industry. The battery pack power terminals are those terminals that are electrically and mechanically coupled to corresponding power tool power terminals to provide the operating voltage to a power tool motor. The power terminals provide currents ranging from 15 Amps to 50 Amps or more. In addition, the battery pack is designed and configured to provide a rated or operating voltage to match the rated or operating voltage of a corresponding power tool. Typically, it is the power tool motor that is designed and configured to have the rated or operating voltage. For example, a battery pack having a 20 volt rated or operating voltage is one that is designed and configured to electrically and mechanically mate and operate with a power tool having a 20 volt rated or operating voltage. This is a method for manufacturers to communicate to users which battery packs are designed and configured to operate with which power tools. Manufactures may use other terminology to indicate this to the user. For example, an XYZ battery pack is designed and configured to operate with an XYZ power tool, while an ABC battery pack is not designed and configured to operate with an XYZ power tool.

The battery pack may also include signal (data) terminals (not shown in figures) that may couple to corresponding signal terminals on the power tool (not shown in figures). The signal terminals provide much lower levels of current than the power terminals. For example, the signal terminals provide currents of approximately one-half Amp.

The exemplary cordless power tool system may also include a first multi-voltage battery pack. The first multi-voltage battery pack is designed and configured to provide both the relative low (rated) voltage and a relative medium (rated) voltage, for example 40 volts.

The exemplary cordless power tool system may also include a second multi-voltage battery pack. The second multi-voltage battery pack is designed and configured to provide both the relative medium (rated) voltage and a relative high (rated) voltage, for example 60 volts.

The exemplary cordless power tool system may also include a third multi-voltage battery pack. The third multi-voltage battery pack is designed and configured to provide, the relative low (rated) voltage, the relative medium (rated) voltage and the relative high (rated) voltage.

The exemplary cordless power tool system may also include a battery pack charger designed and configured to charge all of the battery packs in the system.

These voltages are merely exemplary. Alternate systems could include battery packs and power tools having different rated/operating voltages. For example, an alternate system could include an 18 volt only pack, an 18 volt/36 volt multi-voltage pack, an 18/56 volt multi-voltage pack, and an 18 volt/36 volt/54 volt multi-voltage pack, and an 18 volt power tool, a 36 volt power tool and a 54 volt power tool.

As illustrated in FIG. 25, the low voltage only packs, the first multi-voltage packs, the second multi-voltage packs, and the third multi-voltage packs may all couple and operate with the low voltage charger. In other words, the low voltage charger may provide a charging current to fully charge all of the battery packs in the system.

Also as illustrated in FIG. 25, the low voltage power tools may couple and operate with the low voltage only battery packs, the first multi-voltage battery packs, the second multi-voltage battery packs, and the third multi-voltage packs. In other words, the low voltage only battery packs, the first multi-voltage battery packs, the second multi-voltage battery packs, and the third multi-voltage battery packs may provide a low operating voltage to drive the low voltage power tools. Furthermore, the medium voltage power tools may couple and operate with the first multi-voltage battery packs and the third multi-voltage battery packs. In other words, the first multi-voltage battery packs and the third multi-voltage battery packs may provide a medium operating voltage to drive the medium voltage power tools.

Furthermore, the high voltage power tools may couple and operate with the second multi-voltage battery packs and the third multi-voltage battery packs. In other words, the second multi-voltage battery packs and the third multi-voltage battery packs may provide a high operating voltage to drive the high voltage power tools.

Figure 26:
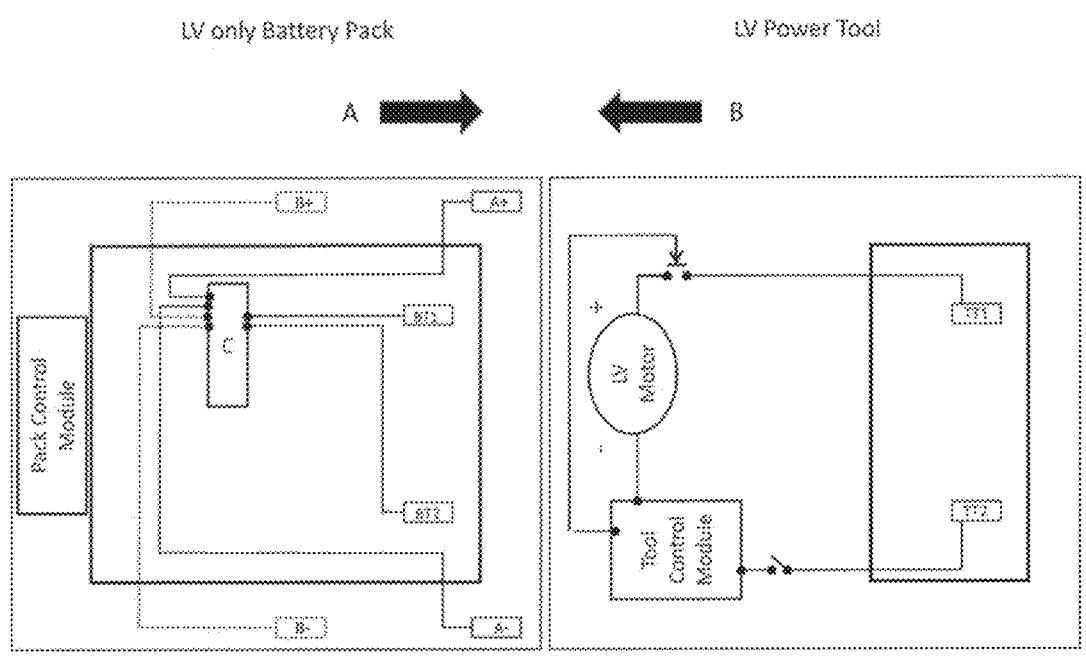
FIG. 26 is an electromechanical schematic of an exemplary embodiment of a first battery pack and a first power tool of the power tool system of FIG. 25.
Figure 27:
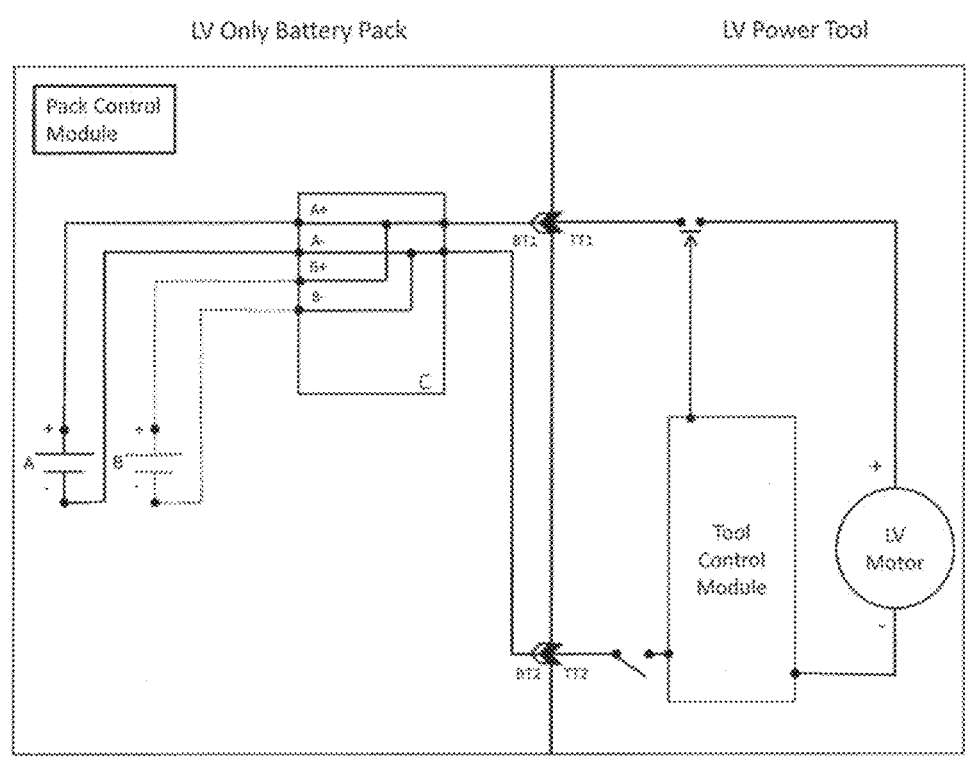
FIG. 27 is another electromechanical schematic of the battery pack and the power tool of FIG. 26.

FIGS. 26 and 27 illustrate an exemplary low voltage (LV) only battery pack and a low voltage (LV) power tool. FIG. 26 illustrates the LV only battery pack and the LV power tool prior to coupling (also referred to as mating or being engaged). As is common with battery packs, the battery pack includes a housing—typically composed of plastic and an electromechanical interface for coupling/mating/engaging with a power tool to provide power to the power tool. To couple or mate or engage the battery pack and power tool the battery pack is moved in the direction of arrow A and/or the power tool is moved in the direction of arrow B.

In an exemplary embodiment, the LV only battery pack includes a set of battery cells. In a first exemplary embodiment, the set of battery cells includes a first string of battery cells (A). The string A may include a single battery cell. The battery cell includes a positive terminal or node (A+) and a negative terminal or node (A−). Alternatively, the string of battery cells A may include a plurality of battery cells (A1, A2 ... AN) coupled in series. In this embodiment, the string of battery cells includes a positive terminal or node (A+) and a negative terminal or node (A−). Alternatively, the set of battery cells may include two or more strings of battery calls (A, B, C, etc.) wherein the B string of battery cells (and any additional strings of battery cells), as with the A string of battery cells, may include a single battery cell or a plurality of battery cells. Each string, regardless of the number of cells in the string, presents the low voltage across the positive terminal and the negative terminal of the string of battery cells.

Each battery cell has a nominal or operating voltage and a capacity. In one exemplary embodiment, each battery cell has an operating voltage of 4 volts (V) and a capacity of 3 ampere-hours (Ahr). As such, a string of battery cells connected in series will have a voltage potential between the positive node and the negative node of the number of cells in the string times the operating voltage of the cell. As such, in an exemplary battery pack, a string of cells having five cells, wherein each cell has an operating voltage of 4 V, will have a 20 V potential between the positive node and the negative node.

The LV only battery pack also includes a set of battery pack terminals BT. The battery pack terminals are part of the electromechanical interface. The battery pack terminals are coupled to the battery pack string(s) of battery cells to provide a current path to provide power to an electric motor of a coupled power tool. In an exemplary embodiment, the battery pack terminals are female tulip type terminals that are recessed in the battery pack housing but accessible from outside the battery pack housing by way of a slot or opening in the housing. In this embodiment, the LV only battery pack includes two battery pack terminals BT1, BT2. The battery pack terminals BT1, BT2 are positioned in the battery pack relative to the battery pack interface to couple with corresponding terminals of a power tool, discussed in more detail below. The battery pack terminals BT are coupled to a connection circuit C. The positive and negative node of each string of battery cells is also coupled to the connection circuit C. More specifically, as illustrated in FIGS. 25 and 26, the A+ node and the A− node are coupled to the connection circuit C. In an embodiment including a second string of battery cells B, the B+ node and the B− node would be coupled to the connection circuit C.

As illustrated in FIG. 26, the connection circuit C includes internal circuitry to connect the A+ terminal to the BT1 battery pack terminal and the A− terminal to the BT2 battery pack terminal. As such, the potential across the BT1 battery pack terminal and the BT2 battery terminal will be the same as the potential across the set of battery cells. If there are multiple strings of battery cells in the set of battery cells, the connection circuit C will include circuitry to couple the strings of battery cells in parallel. In other words, the positive terminals of each string of battery cells (A+ and B+) and the negative terminals of each string of battery cells (A− and B−) will be coupled to the battery terminals BT1, BT2, respectively. In such an instance, the voltage across the battery pack terminals BT1, BT2 will remain the same but the capacity of the battery pack will increase by the sum of the capacity of the A string of battery cells and the B string of battery cells.

FIGS. 26 and 27 also illustrate an exemplary LV power tool. The LV power tools includes a motor designed and configured to operate at the low voltage, for example, 20 V. The LV power tool also includes a tool control module coupled to the motor and at least a pair of switches. A first switch may be a tool trigger switch operated by a user to start and stop the power tool and a second switch may be an internal switch to pulse width modulate the power supplied from the battery pack and/or to shut down the tool under certain circumstances, such as undervoltage, overheating, etc. The LV power tool also includes a set of tool terminals TT. The tool terminals are part of the electromechanical interface. The tool terminals are coupled to the tool motor to provide a current path to provide power from the battery pack to the motor. In an exemplary embodiment, the tool terminals are male blade type terminals that extend from the tool housing and are designed and configured to mate with the battery pack terminals. The tool terminals TT1, TT2 are positioned on the power tool to mate with the battery pack terminals BT1, BT2. When the battery pack and the power tool fully couple/mate/engage, the battery pack terminals BT1, BT2 couple/mate/engage with the power tool terminals TT1, TT2, respectively. Referring to FIG. 26, if the power tool were to slide in the direction of arrow B (to the left) such that the outer rectangle of the power tool (representing the power tool interface) were to be on top of (coincidental with) the outer rectangle of the battery pack (representing the battery pack interface) the tool terminal TT1 would sit on top of the battery pack terminal BT1 and the tool terminal TT2 would sit on top of the battery pack terminal BT2. This is intended to represent that the positioning of the tool terminals in the power tool and the positioning of the battery pack terminals in the battery pack is such that when the battery pack and the power tool mate the terminals engage. FIG. 27 also illustrates the fact.

Figure 28:
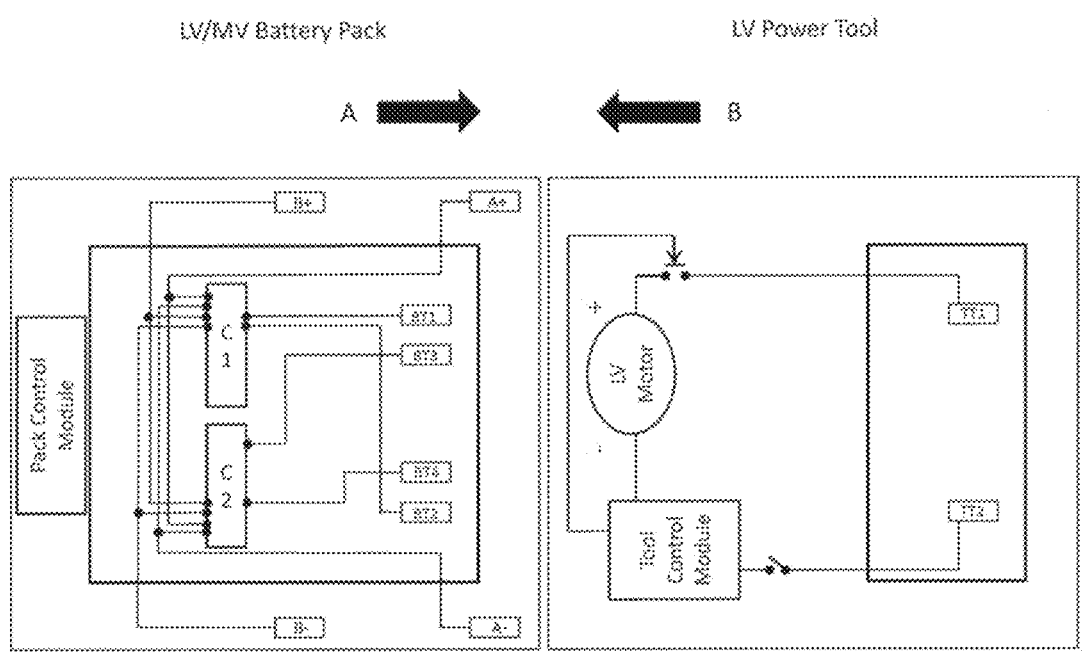
FIG. 28 is an electromechanical schematic of an exemplary embodiment of a second battery pack and the first power tool of the power tool system of FIG. 25.
Figure 29:
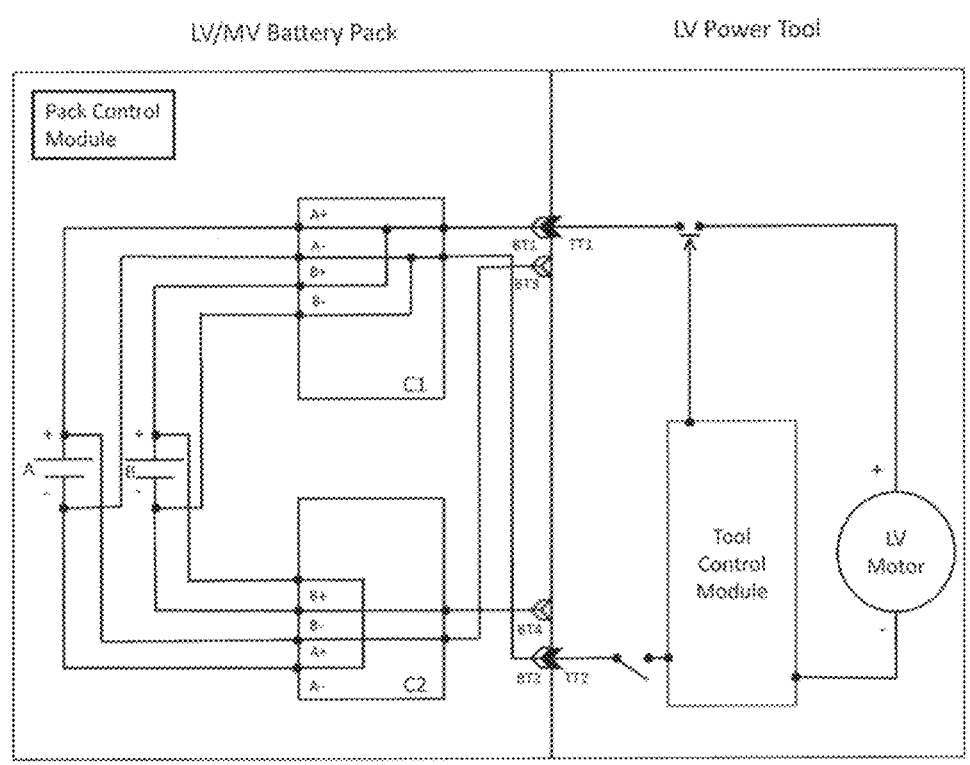
FIG. 29 is another electromechanical schematic of the battery pack and the power tool of FIG. 28.
Figure 30:
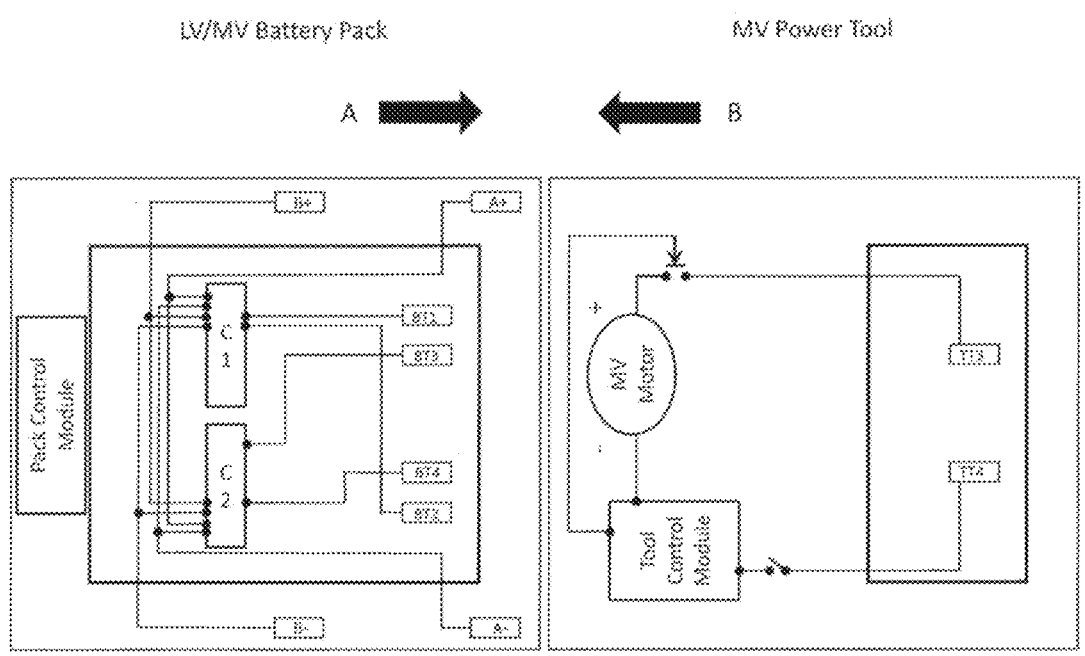
FIG. 30 is an electromechanical schematic of an exemplary embodiment of the second battery pack and a second power tool of the power tool system of FIG. 25.
Figure 31:
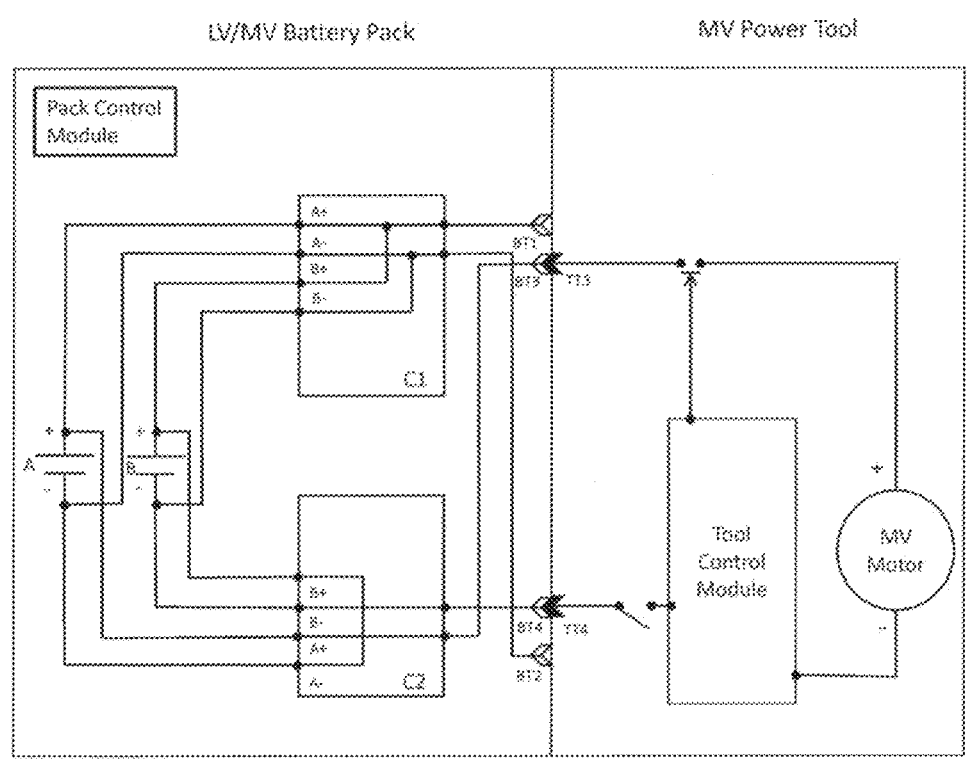
FIG. 31 is another electromechanical schematic of the battery pack and the power tool of FIG. 30.

FIGS. 28-31 illustrate a first multi-voltage battery pack of this exemplary power tool system. FIGS. 28 and 29 also illustrate the LV power tool as illustrated and described above with respect to FIGS. 26 and 27. FIGS. 30 and 31 also illustrate a medium voltage (MV) power tool.

The first multi-voltage battery pack is capable of delivering the low operating voltage and the medium operating voltage. This battery pack may be referred to as an LV/MV battery pack. The LV/MV battery pack includes a set of battery cells. The set of battery cells includes a first string of battery cells A and a second string of battery cells B. Each string of battery cells may include one or more battery cells. In this exemplary embodiment, each string of battery cells is capable of presenting the low voltage across the positive and negative terminals. Each string of battery cells includes a positive node A+, B+ and a negative node A−, B−. The LV/MV battery pack includes a set of battery pack terminals BT. The LV/MV battery pack set of battery pack terminals BT includes a first subset of battery pack terminals BT1, BT2 that are utilized for providing a low operating voltage to a low voltage power tool and for charging purposes— described in more detail below—and a second subset of battery pack terminals BT3, BT4 that are utilized for providing the medium operating voltage to a medium voltage power tool. As illustrated in FIGS. 28-31, the LV/MV battery pack also includes a first connection circuit C1 and a second connection circuit C2. The first subset of battery pack terminals BT1, BT2 is coupled to the first connection circuit C1 and the second subset of battery pack terminals BT3, BT4 is coupled to the second connection circuit C2. As also illustrated in FIGS. 28-31, the positive terminal of each string of battery cells A+, B+ is coupled to both the first connection circuit C1 and the second connection circuit C2. Furthermore, the negative terminal of each string of battery cells A−, B− is coupled to the first connection circuit C1 and the second connection circuit C2. As illustrated in FIG. 31, in this configuration, the first connection circuit C1 connects the first string of battery cells A and the second string of battery cells B in parallel and the second connection circuit C2 connects the first string of battery cells A and the second string of battery cells B in series. As such, the voltage across the battery pack terminal BT1 and battery pack terminals BT2 is the voltage of the A string of battery cells, which in this exemplary embodiment is 20 volts and capable of providing the capacity of the A string of battery cells plus the B string of battery cells, which in this exemplary embodiment is 6 Ahr and the voltage across the battery pack terminal BT3 and the battery pack terminal BT4 is the voltage of the A string of battery cells plus the voltage of the B string of battery cells, which in this exemplary embodiment is 40 volts.

As illustrated in FIGS. 28 and 29, when the LV power tool couples/mates/engages with the LV/MV battery pack the LV power tool terminals TT1, TT2 will mate with the LV/MV battery pack battery terminals BT1, BT2 to provide the low operating voltage from the LV/MV battery pack to the LV power tool.

As illustrated in FIGS. 30 and 31, similar to the LV power tool, the exemplary MV power tool includes a motor designed and configured to operate at the medium voltage, for example 40 V. The MV power tool also includes a tool control module coupled to the motor and at least a pair of switches. A first switch may be a tool trigger switch operated by a user to start and stop the power tool and a second switch may be an internal switch to pulse width modulate the power supplied from the battery pack and/or to shut down the tool under certain circumstances, such as undervoltage, overheating, etc. The MV power tool also includes a set of tool terminals TT. The tool terminals are part of the electromechanical interface. The tool terminals are coupled to the tool motor to provide a current path to provide power from the battery pack to the motor. In an exemplary embodiment, the tool terminals are male blade type terminals that extend from the tool housing and are designed and configured to mate with the battery pack terminals. The tool terminals TT3, TT4 are positioned on the power tool to mate with the battery pack terminals BT3, BT4. When the battery pack and the power tool fully couple/mate/engage, the battery pack terminals BT3, BT4 couple/mate/engage with the power tool terminals TT3, TT4, respectively. Referring to FIG. 6, if the MV power tool were to slide in the direction of arrow B (to the left) such that the outer rectangle of the power tool (representing the power tool interface) were to be on top of (coincidental with) the outer rectangle of the LV/MV battery pack (representing the battery pack interface) the tool terminal TT3 would sit on top of the battery pack terminal BT3 and the tool terminal TT4 would sit on top of the battery pack terminal BT4. This is intended to represent that the positioning of the tool terminals in the power tool and the positioning of the battery pack terminals in the battery pack is such that when the battery pack and the power tool mate the terminals engage. FIG. 31 also illustrates the fact.

As illustrated in FIGS. 30 and 31, when the MV power tool couples/mates/engages with the LV/MV battery pack the MV power tool terminals TT3, TT4 will mate with the LV/MV battery pack battery terminals BT3, BT4 to provide the medium operating voltage from the LV/MV battery pack to the MV power tool.

Figure 32:
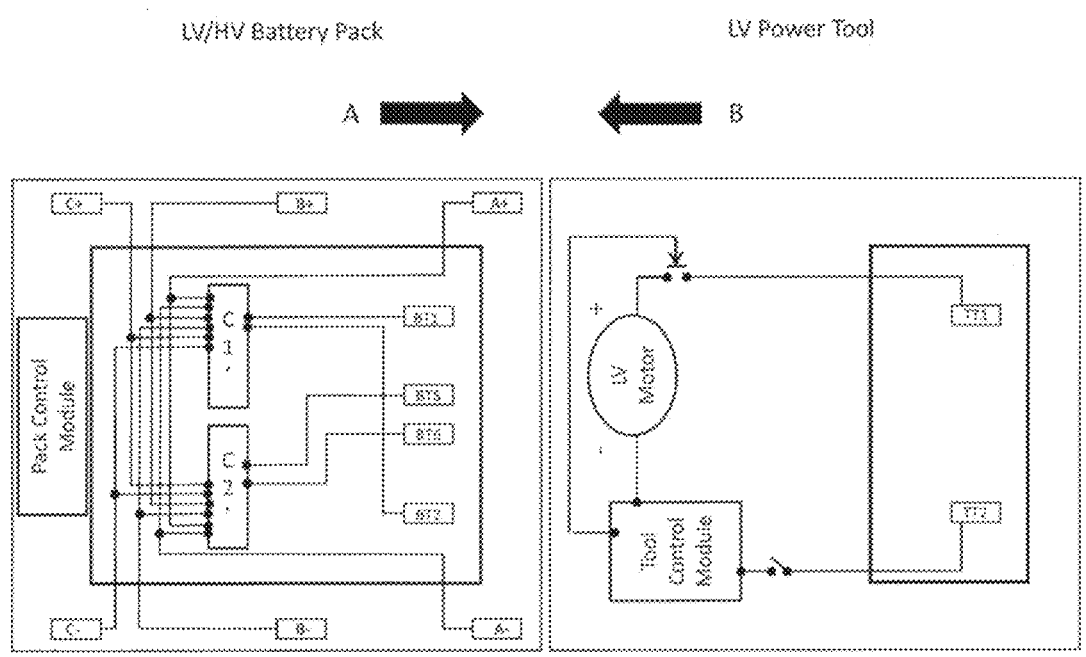
FIG. 32 is an electromechanical schematic of an exemplary embodiment of a third battery pack and the first power tool of the power tool system of FIG. 25.
Figure 33:
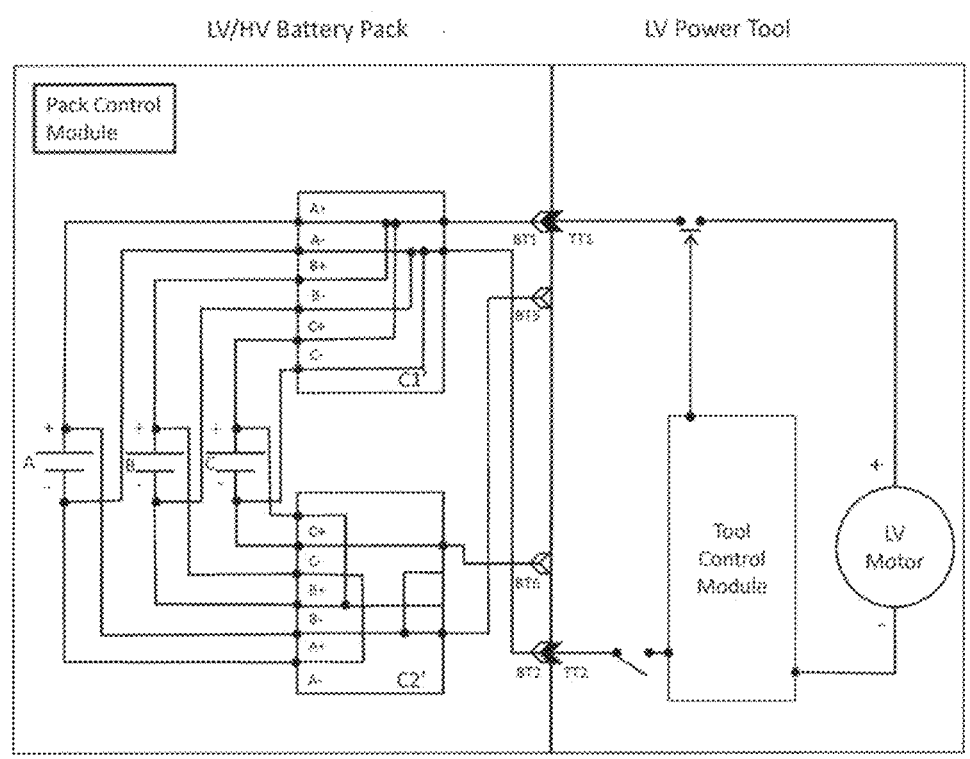
FIG. 33 is another electromechanical schematic of the battery pack and power tool of FIG. 32.

FIGS. 32-35 illustrate a second multi-voltage battery pack of this exemplary power tool system. FIGS. 32 and 33 also illustrate the LV power tool as illustrated and described above with respect to FIGS. 26 and 27 and FIGS. 34 and 35 also illustrate a high voltage (HV) power tool.

The second multi-voltage battery pack is capable of delivering the low operating voltage and the high operating voltage. This battery pack may be referred to as an LV/HV battery pack. The LV/HV battery pack includes a set of battery cells. The set of battery cells includes a first string of battery cells A, a second string of battery cells B, and a third string of battery cells C. Each string of battery cells may include one or more battery cells. In this exemplary embodiment, each string of battery cells is capable of presenting the low voltage across the positive and negative terminals. Each string of battery cells includes a positive node A+, B+, C+ and a negative node A−, B−, C−. The LV/HV battery pack includes a set of battery pack terminals BT. The LV/HV battery pack set of battery pack terminals BT includes a first subset of battery pack terminals BT1, BT2 that are utilized for providing a low operating voltage to a low voltage power tool and for charging purposes—described in more detail below—and a second subset of battery pack terminals BT5, BT6 that are utilized for providing a high operating voltage to a high voltage power tool. As illustrated in FIGS. 32-35, the LV/HV battery pack also includes a first connection circuit C1' and a second connection circuit C2'. The first subset of battery pack terminals BT1, BT2 is coupled to the first connection circuit C1' and the second subset of battery pack terminals BT5, BT6 is coupled to the second connection circuit C2'. As also illustrated in FIGS. 32-35, the positive terminal of each string of battery cells A+, B+, C+ is coupled to both the first connection circuit C1' and the second connection circuit C2'. Furthermore, the negative terminal of each string of battery cells A−, B−, C− is coupled to the first connection circuit C1' and the second connection circuit C2'. As illustrated in FIG. 33, in this configuration, the first connection circuit C1' connects the first string of battery cells A, the second string of battery cells B, and the third string of battery cells C in parallel and the second connection circuit C2' connects the first string of battery cells A, the second string of battery cells B, and the third string of battery cells C in series. As such, the voltage across the battery pack terminal BT1 and battery pack terminals BT2 is the voltage of the A string of battery cells, which in this exemplary embodiment is 20 volts and capable of providing the capacity of the A string of battery cells plus the B string of battery cells plus the C string of battery cells, which in this exemplary embodiment is 9 Ahr and the voltage across the battery pack terminal BT5 and the battery pack terminal BT6 is the voltage of the A string of battery cells plus the voltage of the B string of battery cells plus the voltage of the C string of cells, which in this exemplary embodiment is 60 volts.

As illustrated in FIGS. 32 and 33 when the LV power tool couples/mates/engages with the LV/HV battery pack the LV power tool terminals TT1, TT2 will mate with the LV/HV battery pack battery terminals BT1, BT2 to provide the low operating voltage from the LV/HV battery pack to the LV power tool.

Figure 34:
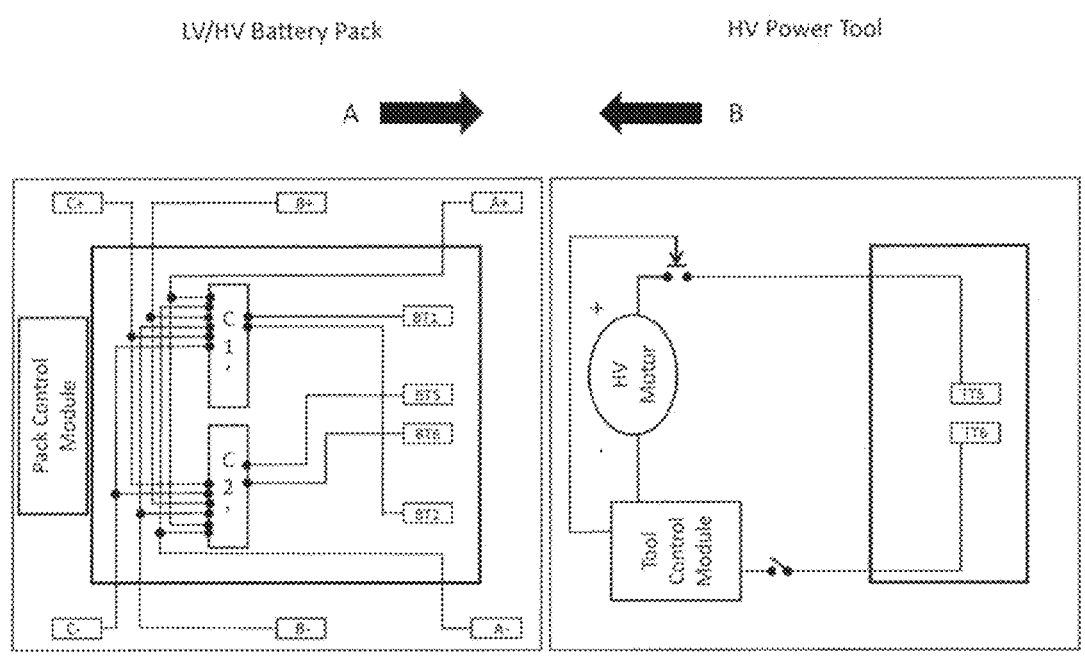
FIG. 34 is an electromechanical schematic of an exemplary embodiment of the third battery pack and a third power tool of the power tool system of FIG. 25.
Figure 35:
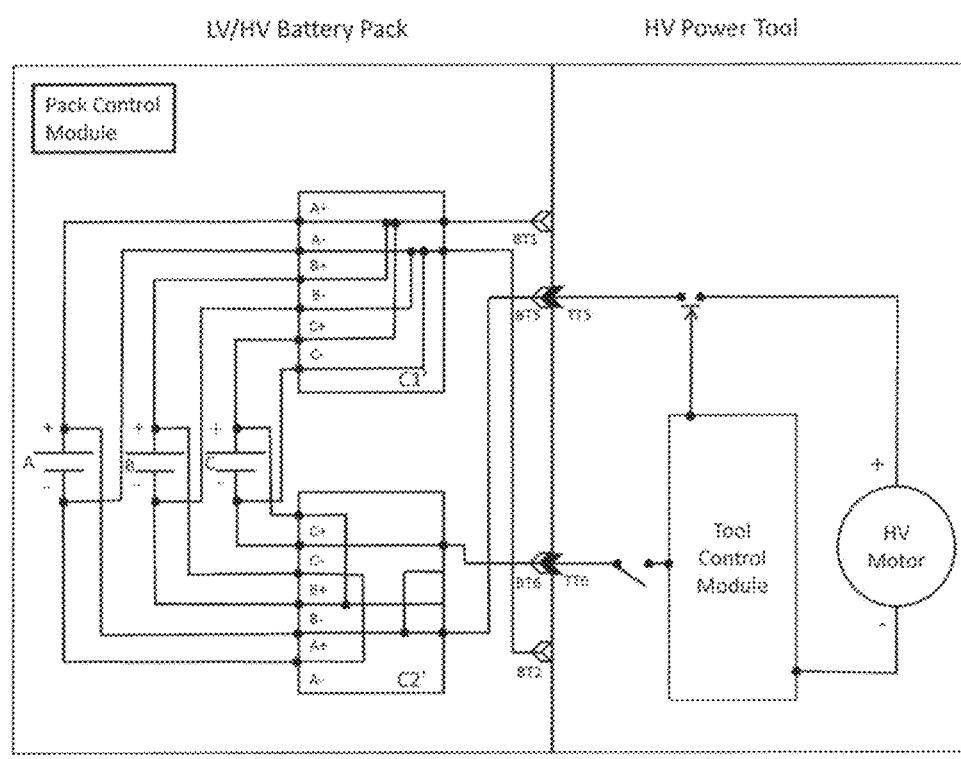
FIG. 35 is another electromechanical schematic of the battery pack and the power tool of FIG. 34.

As illustrated in FIGS. 34 and 35, similar to the LV and MV power tools, the exemplary HV power tool includes a motor designed and configured to operate at the high voltage, for example 60 V. The HV power tool also includes a tool control module coupled to the motor and at least a pair of switches. A first switch may be a tool trigger switch operated by a user to start and stop the power tool and a second switch may be an internal switch to pulse width modulate the power supplied from the battery pack and/or to shut down the tool under certain circumstances, such as undervoltage, overheating, etc. The HV power tool also includes a set of tool terminals TT. The tool terminals are part of the electromechanical interface. The tool terminals are coupled to the tool motor to provide a current path to provide power from the battery pack to the motor. In an exemplary embodiment, the tool terminals are male blade type terminals that extend from the tool housing and are designed and configured to mate with the battery pack terminals. The tool terminals TT5, TT6 are positioned on the power tool to mate with the battery pack terminals BT5, BT6. When the battery pack and the power tool fully couple/mate/engage, the battery pack terminals BT5, BT6 couple/mate/engage with the power tool terminals TT5, TT6, respectively. Referring to FIG. 34, if the HV power tool were to slide in the direction of arrow B (to the left) such that the outer rectangle of the power tool (representing the power tool interface) were to be on top of (coincidental with) the outer rectangle of the LV/HV battery pack (representing the battery pack interface) the tool terminal TT5 would sit on top of the battery pack terminal BT5 and the tool terminal TT6 would sit on top of the battery pack terminal BT6. This is intended to represent that the positioning of the tool terminals in the power tool and the positioning of the battery pack terminals in the battery pack is such that when the battery pack and the power tool mate the terminals engage. FIG. 35 also illustrates the fact.

As illustrated in FIGS. 34 and 35, when the HV power tool couples/mates/engages with the LV/HV battery pack the HV power tool terminals TT5, TT6 will mate with the LV/HV battery pack battery terminals BT5, BT6 to provide the high operating voltage from the LV/HV battery pack to the HV power tool.

Figure 36:
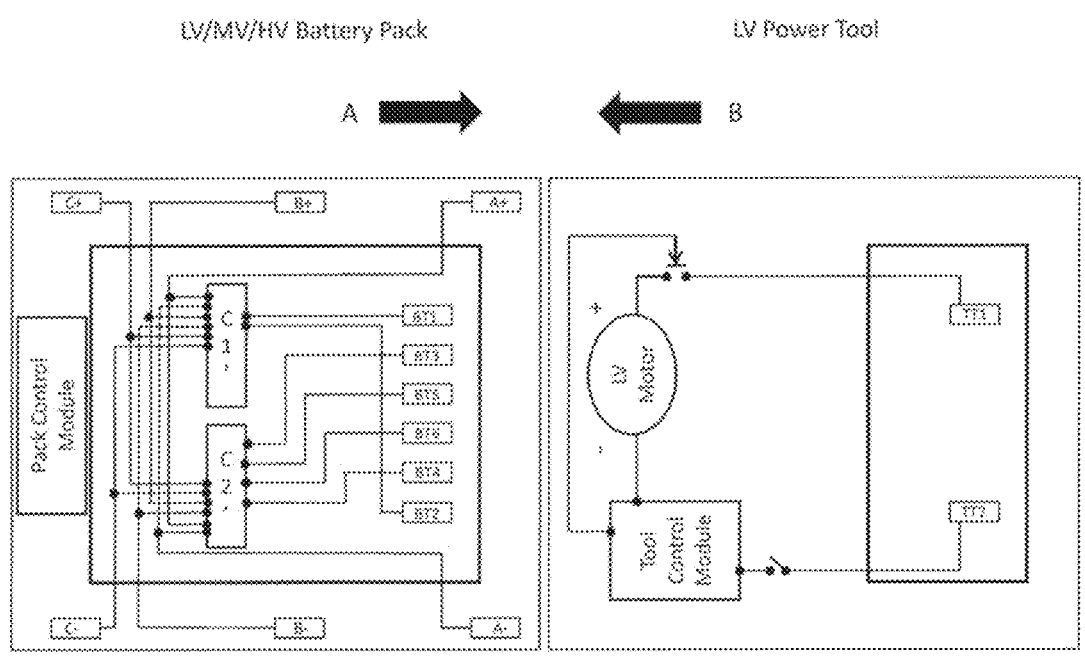
FIG. 36 is an electromechanical schematic of an exemplary embodiment of a fourth battery pack and the first power tool of the power tool system of FIG. 25.
Figure 37:
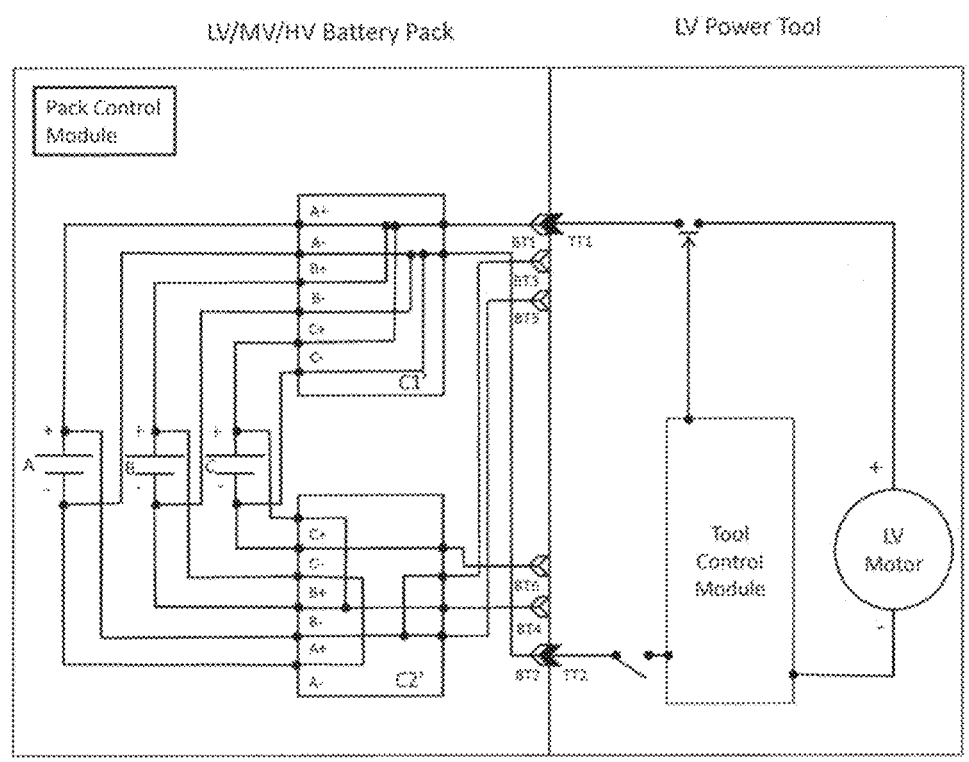
FIG. 37 is another electromechanical schematic of the battery pack and the power tool of FIG. 36.
Figure 38:
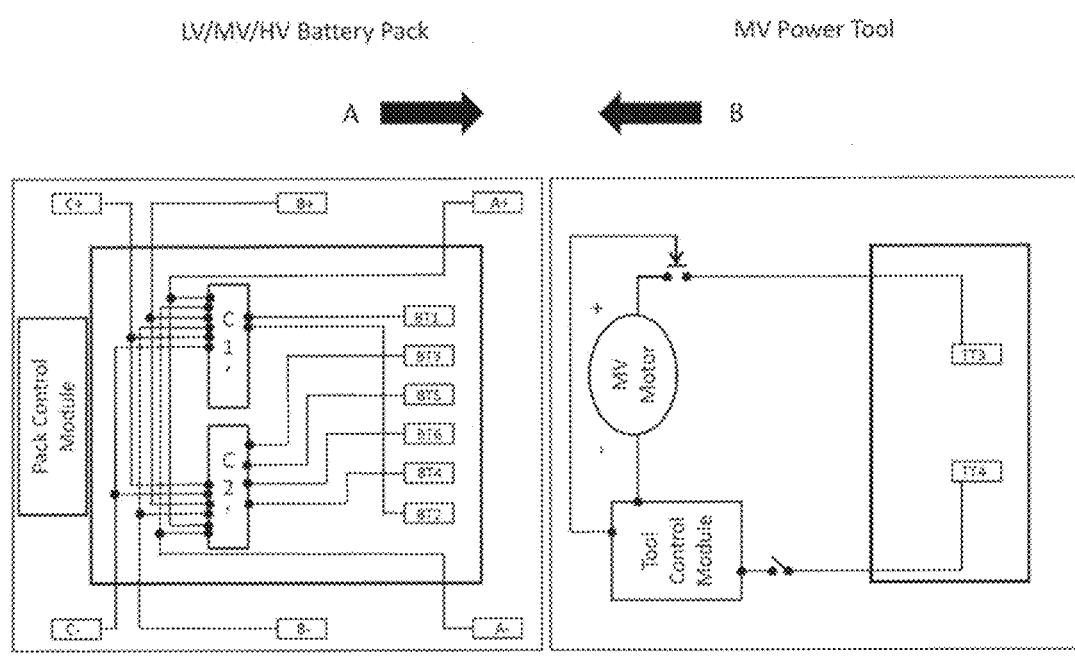
FIG. 38 is an electromechanical schematic of an exemplary embodiment of the fourth battery pack and the second power tool of the power tool system of FIG. 25.
Figure 39:
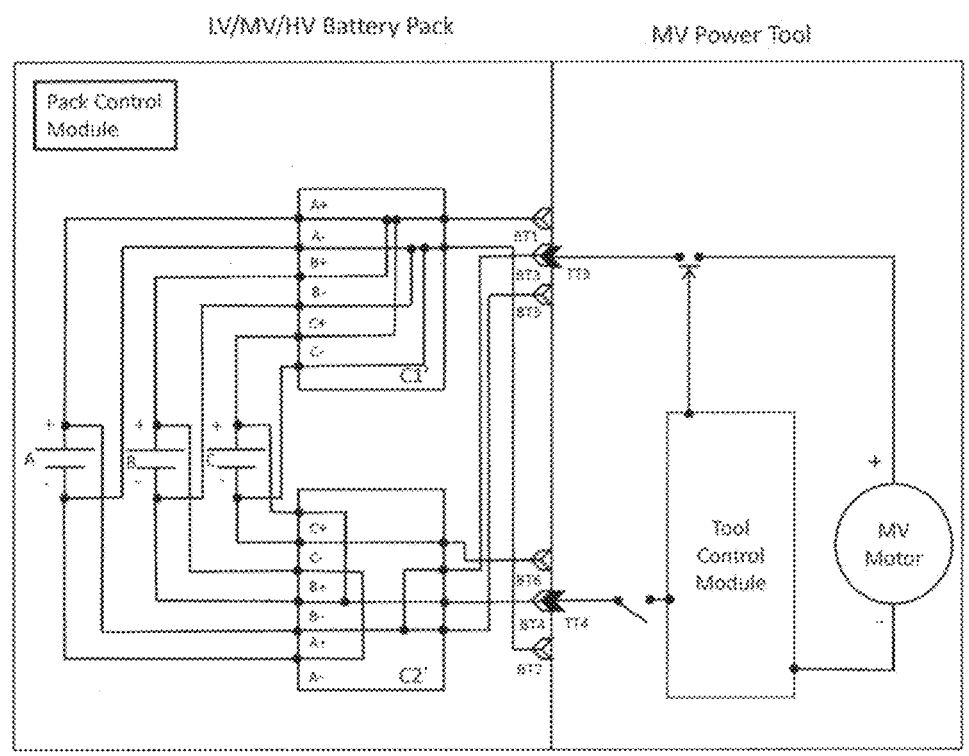
FIG. 39 is another electromechanical schematic of the battery pack and power tool of FIG. 38.
Figure 40:
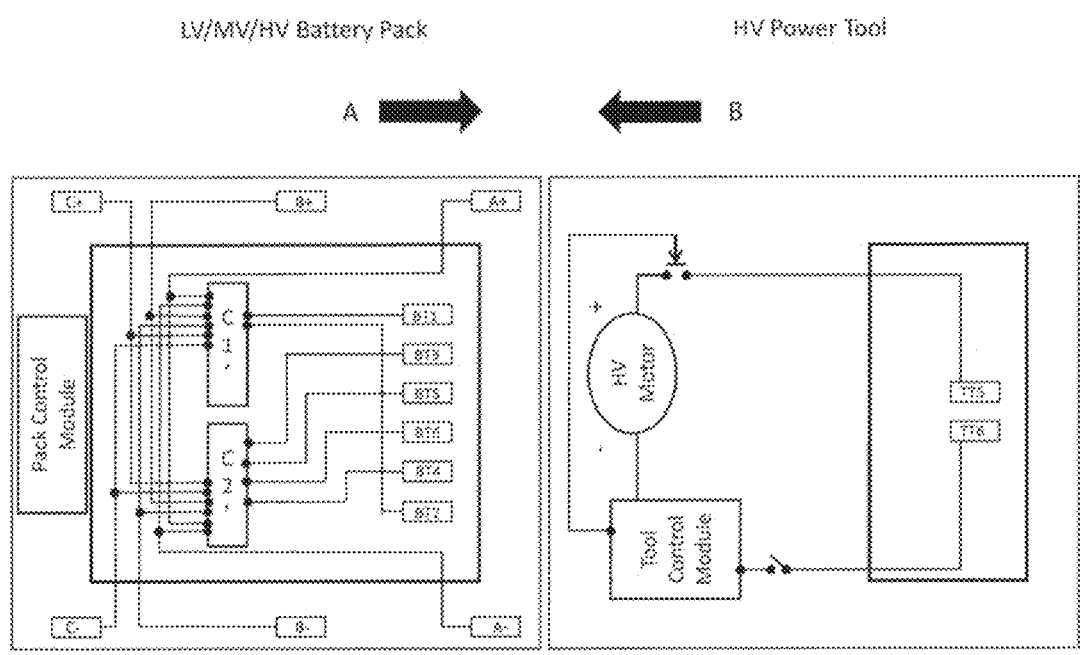
FIG. 40 is an electromechanical schematic of an exemplary embodiment of the fourth battery pack and the third power tool of the power tool system of FIG. 25.
Figure 41:
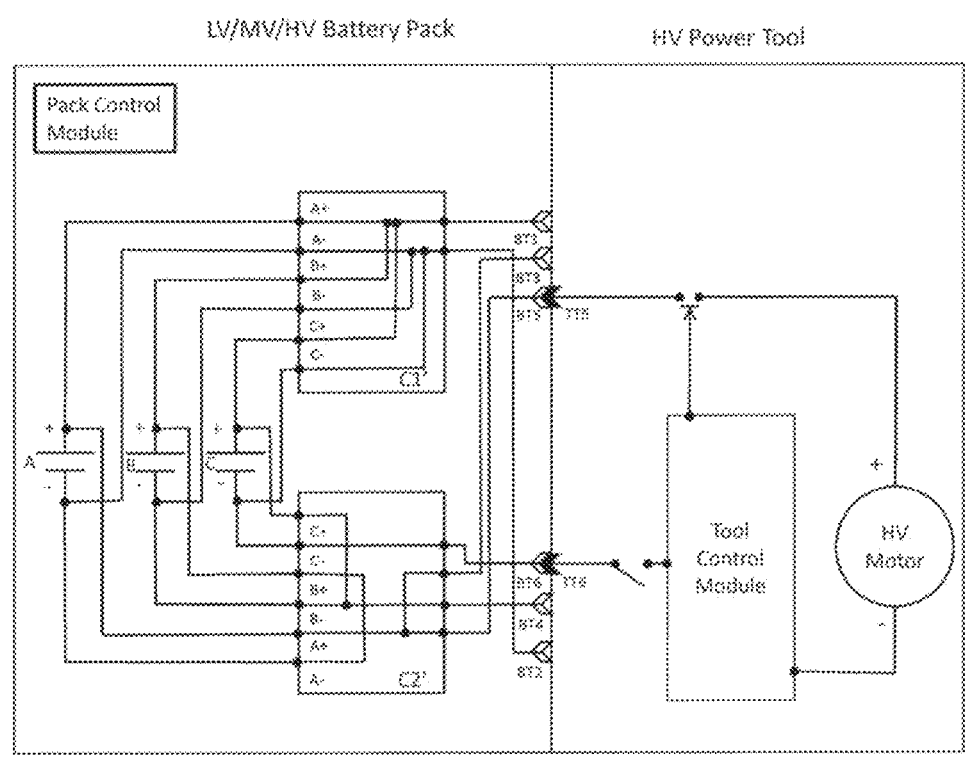
FIG. 41 is another electromechanical schematic of the battery pack and power tool of FIG. 40.

FIGS. 36-41 illustrate a third multi-voltage battery pack of this exemplary power tool system. FIGS. 36 and 37 also illustrate the LV power tool as illustrated and described above with respect to FIGS. 26 and 27. FIGS. 38 and 39 illustrate the MV power tool as illustrated and described above with respect to FIGS. 30 and 31. FIGS. 40 and 41 also illustrate the HV power tool as illustrated and described above with respect to FIGS. 34 and 35.

The third multi-voltage battery pack is capable of delivering the low operating voltage, the medium operating voltage, and the high operating voltage. This battery pack may be referred to as an LV/MV/HV battery pack. Similar to the LV/MV and LV/HV battery packs described above, the LV/MV/HV battery pack includes a set of battery cells. The set of battery cells includes a first string of battery cells A, a second string of battery cells B, and a third string of battery cells C. Each string of battery cells may include one or more battery cells. In this exemplary embodiment, each string of battery cells is capable of presenting the low voltage across the positive and negative terminals. Each string of battery cells includes a positive node A+, B+, C+ and a negative node A−, B−, C−. The LV/MV/HV battery pack includes a set of battery pack terminals BT. The LV/MV/HV battery pack set of battery pack terminals BT includes a first subset of battery pack terminals BT1, BT2 that are utilized for providing a low operating voltage to a low voltage power tool and for charging purposes—described in more detail below—and a second subset of battery pack terminals BT3, BT4 that are utilized for providing a medium operating voltage to a medium voltage power tool and a third subset of battery terminals BT5, BT6 that are utilized for providing a high operating voltage to a high voltage power tool. As illustrated in FIGS. 36-41, the LV/MV/HV battery pack also includes a first connection circuit C1' and a second connection circuit C2'. The first subset of battery pack terminals BT1, BT2 is coupled to the first connection circuit C1' and the second and third subsets of battery pack terminals BT3, BT4, BT5, BT6 are coupled to the second connection circuit C2'. As also illustrated in FIGS. 36-41, the positive terminal of each string of battery cells A+, B+, C+ is coupled to both the first connection circuit C1' and the second connection circuit C2'. Furthermore, the negative terminal of each string of battery cells A−, B−, C− is coupled to the first connection circuit C1' and the second connection circuit C2'. As illustrated in FIG. 37, in this configuration, the first connection circuit C1' connects the first string of battery cells A, the second string of battery cells B, and the third string of battery cells C in parallel and the second connection circuit C2' connects the first string of battery cells A, the second string of battery cells B, and the third string of battery cells C in series. As such, the voltage across the battery pack terminal BT1 and battery pack terminals BT2 is the voltage of A string of battery cells, which in this exemplary embodiment is 20 volts and capable of providing the capacity of the A string of battery cells plus the B string of battery cells plus the C string of battery cells, which in this exemplary embodiment is 9 Ahr and the voltage across the battery pack terminal BT3 and the battery pack terminal BT4 is the voltage of the A string of battery cells plus the voltage of the B string of battery cells, which in this exemplary embodiment is 40 volts; and the voltage across the battery pack terminal BT5 and the battery pack terminal BT6 is the voltage of the A string of battery cells plus the voltage of the B string of battery cells plus the voltage of the C string of battery cells, which in this exemplary embodiment is 60 volts.

As illustrated in FIGS. 36 and 37, when the LV power tool couples/mates/engages with the LV/MV/HV battery pack the LV power tool terminals TT1, TT2 will mate with the LV/MV/HV battery pack battery terminals BT1, BT2 to provide the low operating voltage from the LV/MV/HV battery pack to the LV power tool. And, as illustrated in FIGS. 38 and 39, when the MV power tool couples/mates/engages with the LV/MV/HV battery pack the MV power tool terminals TT3, TT4 will mate with the LV/MV/HV battery pack battery terminals BT3, BT4 to provide the medium operating voltage from the LV/MV/HV battery pack to the MV power tool. And, as illustrated in FIGS. 40 and 41, when the HV power tool couples/mates/engages with the LV/MV/HV battery pack the HV power tool terminals TT5, TT6 will mate with the LV/MV/HV battery pack terminals BT5, BT6 to provide the high operating voltage from the LV/MV/HV battery pack to the HV power tool.

The power tool system also includes a charger to recharge the exemplary battery packs. In an exemplary embodiment, the charger is a low voltage (LV) charger. This means that the charger is designed and configured to charge battery packs configured at a low operating voltage. In this example, the battery charger is designed and configured to operate at 20 volts. As such, the battery charger must be able to couple/mate/engage with the battery packs in a low voltage configuration. In other words, because the battery charger is designed to charge to the low operating voltage, the battery packs must present terminals and strings of cells that are designed to charge up to the low operating voltage. As such, in this exemplary embodiment, all of the battery packs must be designed to present a 20 volt configuration when coupled to the battery charger. It would be problematic to use a low voltage charger to charge a battery pack that was configured to charge to a medium or high voltage.

Figure 42:
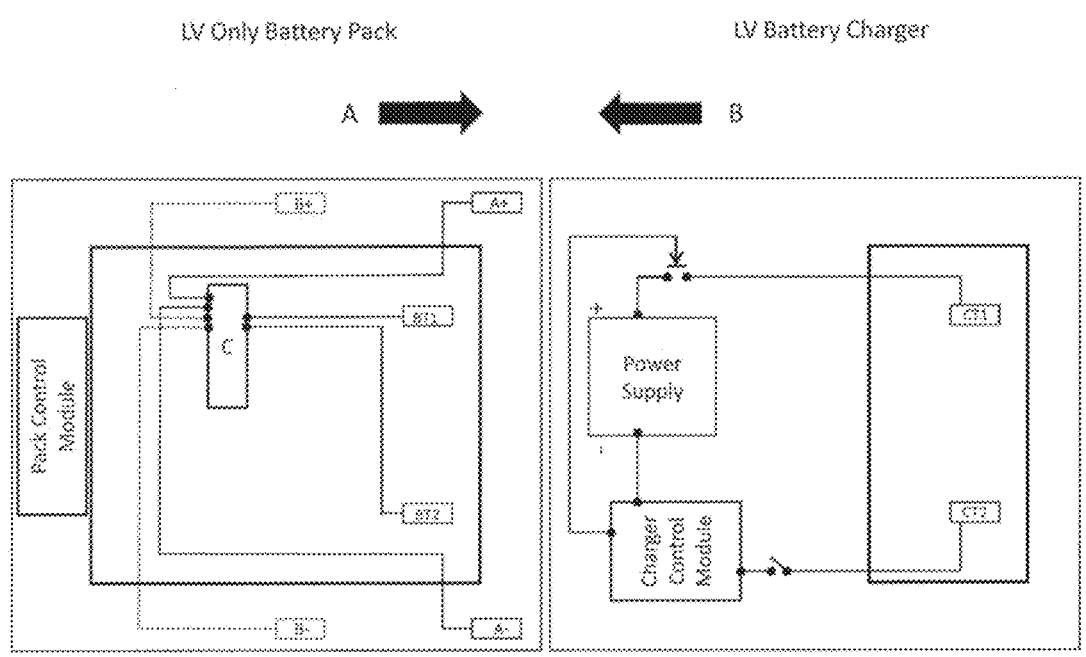
FIG. 42 is an electromechanical schematic of an exemplary embodiment of the first battery pack and a battery charger of the power tool system of FIG. 25.
Figure 43:
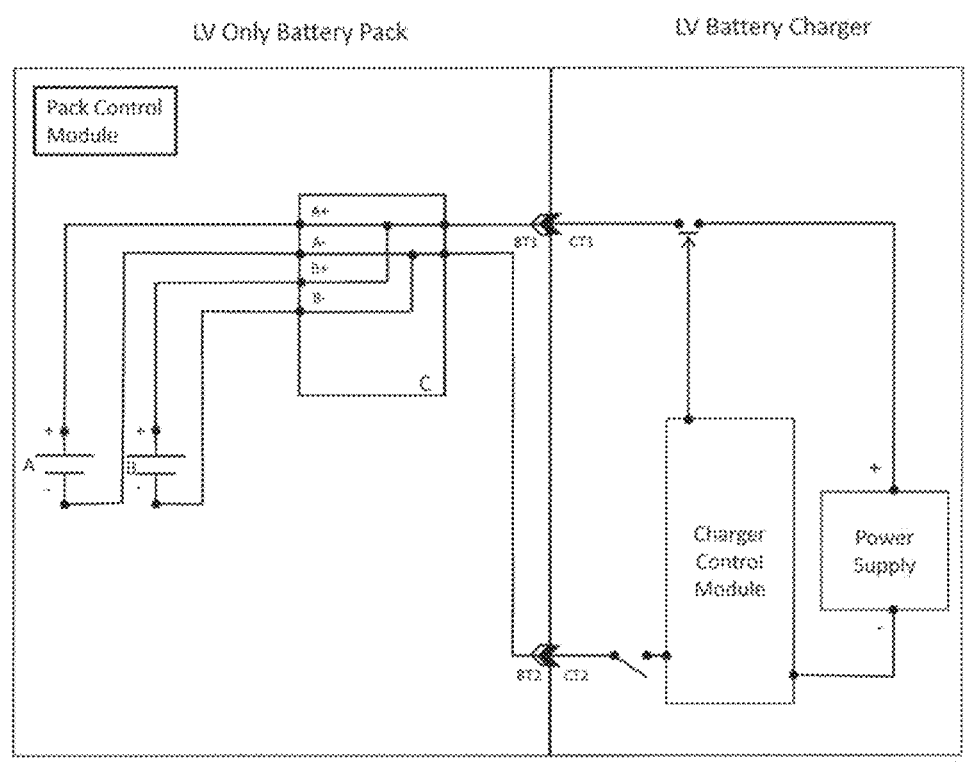
FIG. 43 is another electromechanical schematic of the battery pack and battery charger of FIG. 42.

As illustrated in FIGS. 42 and 43, there is presented the exemplary LV only battery pack and an LV battery charger. As described above, the LV only battery pack includes a set of battery cells. The set of battery cells may include one or more strings of battery cells wherein each string of battery cells presents a low voltage across the positive and negative terminals of the string. If there is more than one string of battery cells, than the plurality of strings of battery cells will be coupled in parallel by the connection circuit C. As such, the one or more strings of battery cells will be configured in a low voltage configuration of coupling/mating/engaging with the battery charger. As described above, the connection circuit C includes a terminal coupled to each of the battery pack terminals BT1, BT2.

FIGS. 42 and 43 also illustrate an exemplary LV battery charger. The LV battery charger includes a power supply designed and configured to operate at the low voltage, for example, 20 V. The LV battery charger also includes a charger control module coupled to the power supply. The charger control module may include a variety of components necessary to control the power supply and the charging of the battery pack. The charger control module may include a microprocessor and/or microcontroller as is well known in the art.

The battery charger also includes at least a pair of switches. A first switch may be a power switch operated by a user to start and stop the battery charger and a second switch may be an internal switch to pulse width modulate the power supplied from the battery charger and/or to shut down the charger under certain circumstances, such as overvoltage, overheating, etc. The LV battery charger also includes a set of charger terminals CT. The charger terminals are part of the electromechanical interface. The charger terminals are coupled to the charger power supply to provide a current path to provide power from the power supply/charger to the battery pack. In an exemplary embodiment, the charger terminals are male blade type terminals that extend from the charger housing and are designed and configured to mate with the battery pack terminals. (The charger interface is generally the same as the power tool interface, as they both are designed and configured to mate with the battery packs.) The charger terminals CT1, CT2 are positioned on the battery charger to mate with the battery pack terminals BT1, BT2. When the battery pack and the battery charger fully couple/mate/engage, the battery pack terminals BT1, BT2 couple/mate/engage with the battery charger terminals CT1, CT2, respectively. Referring to FIG. 18, if the battery charger were to slide in the direction of arrow B (to the left) such that the outer rectangle of the battery charger (representing the battery charger interface) were to be on top of (coincidental with) the outer rectangle of the battery pack (representing the battery pack interface) the battery charger terminal CT1 would sit on top of the battery pack terminal BT1 and the battery charger terminal CT2 would sit on top of the battery pack terminal BT2. This is intended to represent that the positioning of the battery charger terminals in the battery charger and the positioning of the battery pack terminals in the battery pack is such that when the battery pack and the battery charger mate the terminals engage. FIG. 43 also illustrates the fact. When the LV only battery pack is coupled/mated/engage with the battery charger, the battery charger may charge the battery pack in a variety of charging schemes, as is well known in the art.

Figure 44:
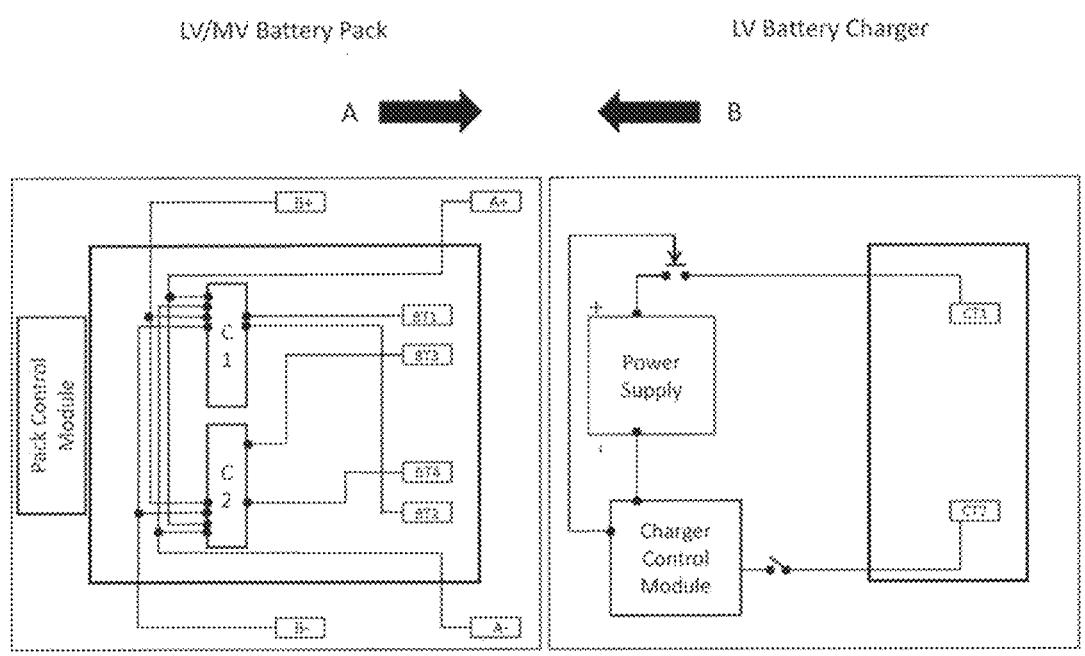
FIG. 44 is an electromechanical schematic of an exemplary embodiment of the second battery pack and the battery charger of the power tool system of FIG. 25.
Figure 45:
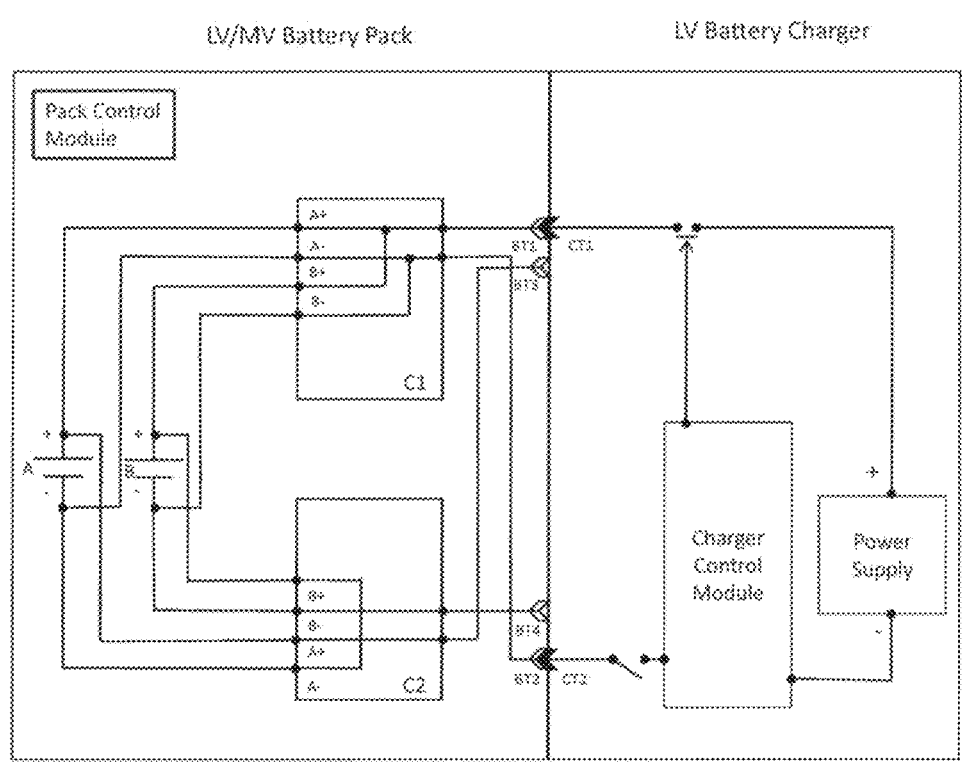
FIG. 45 is another electromechanical schematic of the battery pack and battery charger of FIG. 44.

FIGS. 44 and 45 illustrate the exemplary LV/MV battery pack described above and the LV battery charger described above. As described above, the LV/MV battery pack includes a set of battery cells. The set of battery cells includes two strings of battery cells wherein each string of battery cells presents a low voltage across the positive and negative terminals of the string. (In an alternate exemplary embodiment, each string may include substrings to increase the capacity of the string. In this embodiment, the substrings would be coupled in parallel.) The two strings of battery cells are coupled in parallel by the connection circuit C1. As such, the two strings of battery cells will be configured in a low voltage configuration for coupling/mating/engaging with the battery charger. As described above, the connection circuit C1 includes a terminal coupled to each of the battery pack terminals BT1, BT2.

The charger terminals CT1, CT2 are positioned on the battery charger to mate with the LV/MV battery pack terminals BT1, BT2, in the same manner as the charger terminals CT1, CT2 mate with the LV only battery pack terminals BT1, BT2. When the LV/MV battery pack and the battery charger fully couple/mate/engage, the LV/MV battery pack terminals BT1, BT2 couple/mate/engage with the battery charger terminals CT1, CT2, respectively. Referring to FIG. 44, if the battery charger were to slide in the direction of arrow B (to the left) such that the outer rectangle of the battery charger (representing the battery charger interface) were to be on top of (coincidental with) the outer rectangle of the battery pack (representing the battery pack interface) the battery charger terminal CT1 would sit on top of the LV/MV battery pack terminal BT1 and the battery charger terminal CT2 would sit on top of the LV/MV battery pack terminal BT2. This is intended to represent that the positioning of the battery charger terminals in the battery charger and the positioning of the battery pack terminals in the battery pack is such that when the battery pack and the battery charger mate the terminals engage. FIG. 45 also illustrates the fact. When the LV/MV battery pack is coupled/mated/engage with the battery charger, the battery charger may charge the battery pack in a variety of charging schemes, as is well known in the art.

Figure 47:
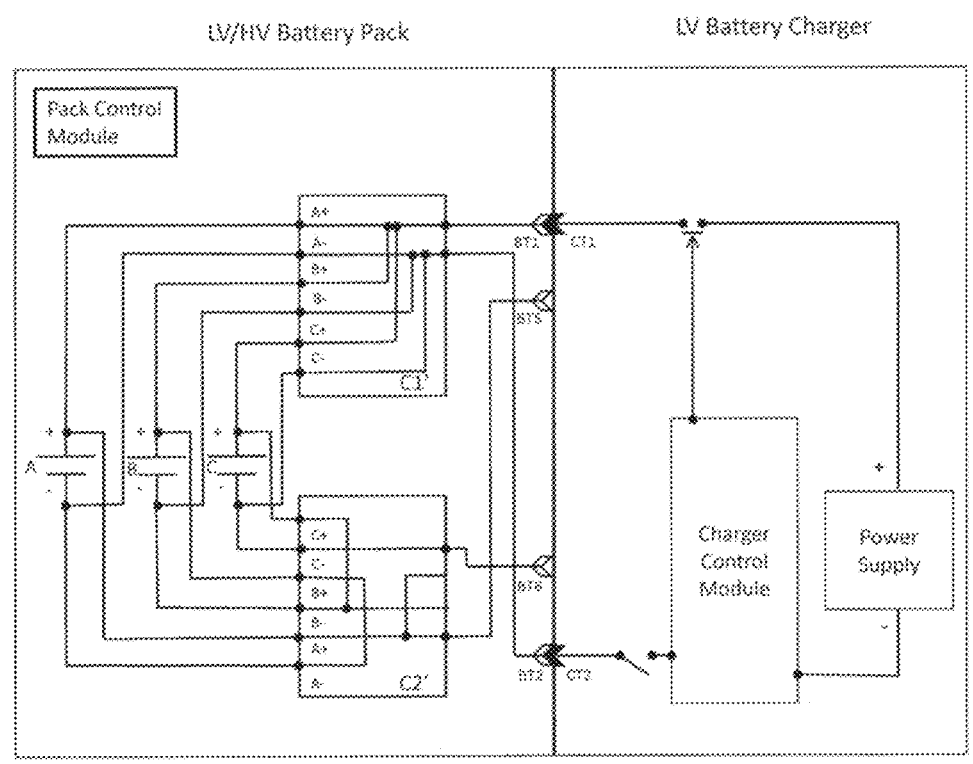
FIG. 47 is another electromechanical schematic of the battery pack and battery charger of FIG. 46.

FIGS. 45 and 47 illustrate the exemplary LV/HV battery pack described above and the LV battery charger described above. As described above, the LV/HV battery pack includes a set of battery cells. The set of battery cells includes three strings of battery cells wherein each string of battery cells presents a low voltage across the positive and negative terminals of the string. (In an alternate exemplary embodiment, each string may include substrings to increase the capacity of the string. In this embodiment, the substrings would be coupled in parallel.) The three strings of battery cells are coupled in parallel by the connection circuit C1'. As such, the three strings of battery cells will be configured in a low voltage configuration for coupling/mating/engaging with the battery charger. As described above, the connection circuit C1' includes a terminal coupled to each of the battery pack terminals BT1, BT2.

Figure 46:
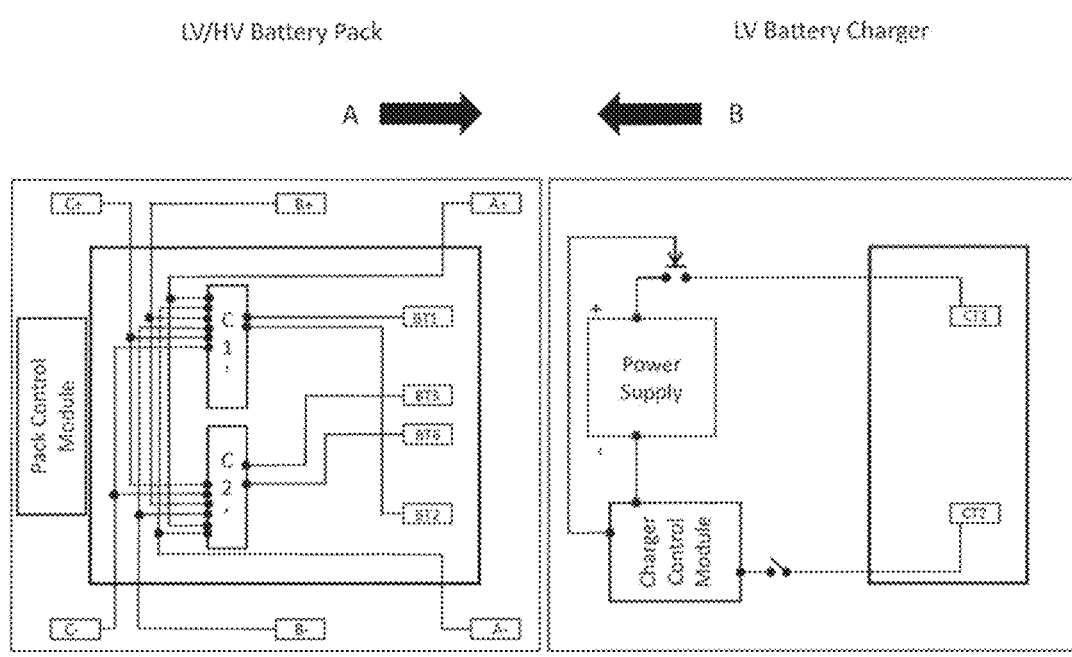
FIG. 46 is an electromechanical schematic of an exemplary embodiment of the third battery pack and the battery charger of the power tool system of FIG. 24.

The charger terminals CT1, CT2 are positioned on the battery charger to mate with the LV/HV battery pack terminals BT1, BT2, in the same manner as the charger terminals CT1, CT2 mate with the LV only battery pack terminals BT1, BT2 and the LV/MV battery pack terminals BT1, BT2. When the LV/HV battery pack and the battery charger fully couple/mate/engage, the LV/HV battery pack terminals BT1, BT2 couple/mate/engage with the battery charger terminals CT1, CT2, respectively. Referring to FIG. 46, if the battery charger were to slide in the direction of arrow B (to the left) such that the outer rectangle of the battery charger (representing the battery charger interface) were to be on top of (coincidental with) the outer rectangle of the battery pack (representing the battery pack interface) the battery charger terminal CT1 would sit on top of the LV/HV battery pack terminal BT1 and the battery charger terminal CT2 would sit on top of the LV/HV battery pack terminal BT2. This is intended to represent that the positioning of the battery charger terminals in the battery charger and the positioning of the battery pack terminals in the battery pack is such that when the battery pack and the battery charger mate the terminals engage. FIG. 47 also illustrates the fact. When the LV/HV battery pack is coupled/mated/engage with the battery charger, the battery charger may charge the battery pack in a variety of charging schemes, as is well known in the art.

Figure 48:
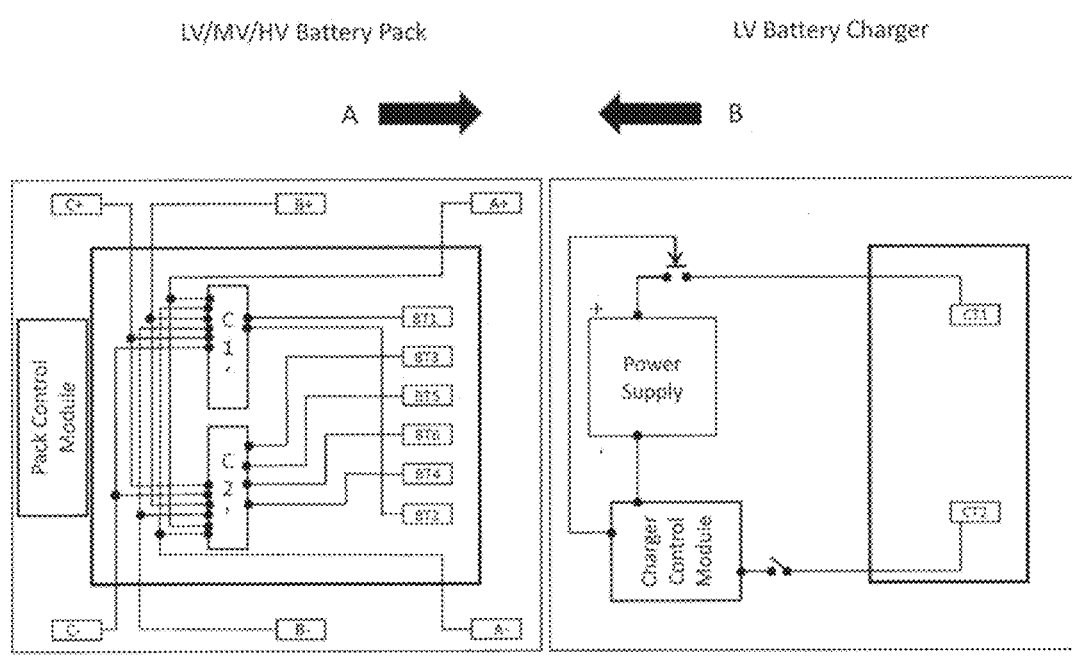
FIG. 48 is an electromechanical schematic of an exemplary embodiment of the fourth battery pack and the battery charger of the power tool system of FIG. 25.
Figure 49:
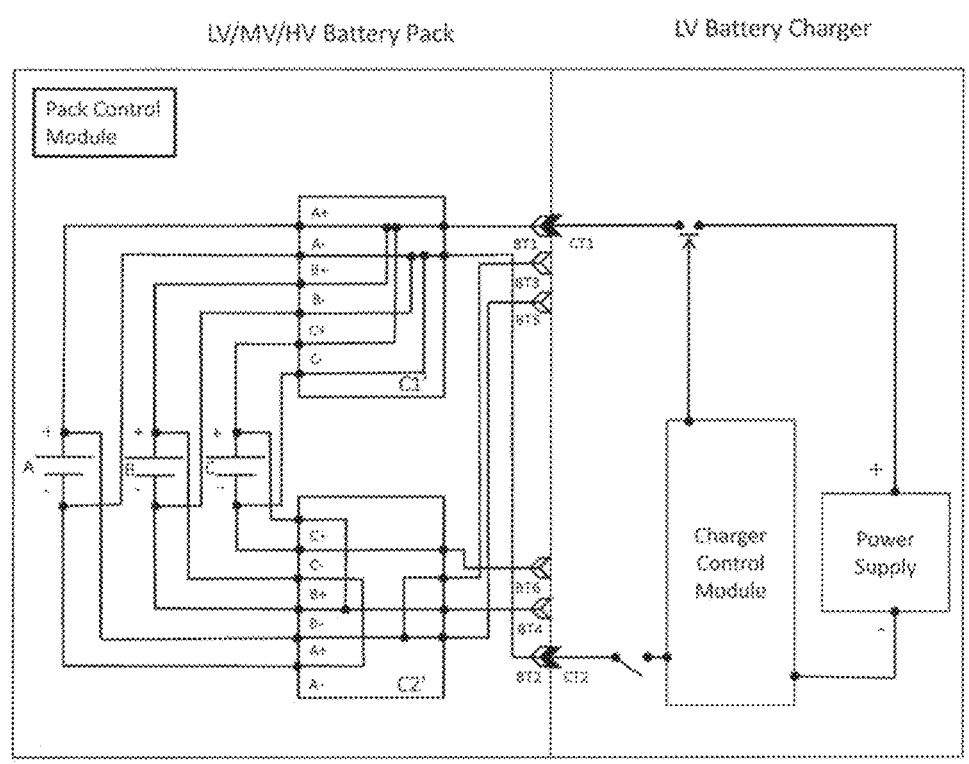
FIG. 49 is another electromechanical schematic of the battery pack and battery charger of FIG. 48.

FIGS. 48 and 49 illustrate the exemplary LV/MV/HV battery pack described above and the LV battery charger described above. As described above, the LV/MV/HV battery pack includes a set of battery cells. The set of battery cells includes three strings of battery cells wherein each string of battery cells presents a low voltage across the positive and negative terminals of the string. (In an alternate exemplary embodiment, each string may include substrings to increase the capacity of the string. In this embodiment, the substrings would be coupled in parallel.) The three strings of battery cells are coupled in parallel by the connection circuit C1'. As such, the three strings of battery cells will be configured in a low voltage configuration for coupling/mating/engaging with the battery charger. As described above, the connection circuit C1' includes a terminal coupled to each of the battery pack terminals BT1, BT2.

The charger terminals CT1, CT2 are positioned on the battery charger to mate with the LV/MV/HV battery pack terminals BT1, BT2, in the same manner as the charger terminals CT1, CT2 mate with the LV only battery pack terminals BT1, BT2 and the LV/MV battery pack terminals BT1, BT2. When the LV/MV/HV battery pack and the battery charger fully couple/mate/engage, the LV/MV/HV battery pack terminals BT1, BT2 couple/mate/engage with the battery charger terminals CT1, CT2, respectively. Referring to FIG. 48, if the battery charger were to slide in the direction of arrow B (to the left) such that the outer rectangle of the battery charger (representing the battery charger interface) were to be on top of (coincidental with) the outer rectangle of the battery pack (representing the battery pack interface) the battery charger terminal CT1 would sit on top of the LV/MV/HV battery pack terminal BT1 and the battery charger terminal CT2 would sit on top of the LV/MV/HV battery pack terminal BT2. This is intended to represent that the positioning of the battery charger terminals in the battery charger and the positioning of the battery pack terminals in the battery pack is such that when the battery pack and the battery charger mate the terminals engage. FIG. 49 also illustrates the fact. When the LV/MV/HV battery pack is coupled/mated/engage with the battery charger, the battery charger may charge the battery pack in a variety of charging.

Example embodiments have been provided so that this disclosure will be thorough, and to fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Terms of degree such as "generally," "substantially," "approximately," and "about" may be used herein when describing the relative positions, sizes, dimensions, or values of various elements, components, regions, layers and/or sections. These terms mean that such relative positions, sizes, dimensions, or values are within the defined range or comparison (e.g., equal or close to equal) with sufficient precision as would be understood by one of ordinary skill in the art in the context of the various elements, components, regions, layers and/or sections being described.

Implementations of the various techniques described herein may be implemented utilizing analog and/or mixed analog and digital circuitry. This would include op amps, resistors, transistors and/or reactive components to perform the control functions. These analog functions could be intermixed with any of the digital implementations embodied previously.

Numerous modifications may be made to the exemplary implementations described above. These and other implementations are within the scope of this application.

The invention claimed is:

1. A power tool system, comprising:
a first battery pack comprising a first plurality of battery cells providing a first operating voltage;
a second battery pack comprising a second plurality of battery cells capable of providing the first operating voltage and a second operating voltage;
a first power tool comprising a set of power terminals configured to mechanically and electrically couple with the first battery pack and operate at the first operating voltage and to mechanically couple with the second battery pack such that the second battery pack provides the first operating voltage to the first power tool; and
a second power tool comprising a set of power terminals configured to mechanically and electrically couple with the second battery pack such that the second battery pack provides the second operating voltage to the second power tool,
wherein the first battery pack comprises a set of power terminals aligned in a row and the second battery pack comprises a set of power terminals comprising a first subset of power terminals aligned in a first row and a second subset of power terminals aligned in a second row, wherein the first row is parallel to and generally in a plane with the second row, the plane being in a mating direction of the second.

2. A power tool system, comprising:
a first battery pack comprising a first plurality of battery cells providing a first operating voltage;
a second battery pack comprising a second plurality of battery cells capable of providing the first operating voltage and a second operating voltage;
a first power tool comprising a set of power terminals configured to mechanically and electrically couple with the first battery pack and operate at the first operating voltage and to mechanically couple with the second battery pack such that the second battery pack provides the first operating voltage to the first power tool; and
a second power tool comprising a set of power terminals configured to mechanically and electrically couple with the second battery pack such that the second battery pack provides the second operating voltage to the second power tool,
wherein the first battery pack comprises a set of power terminals aligned in a row and the second battery pack comprises a set of power terminals comprising a first subset of power terminals aligned in a first row and a second subset of power terminals aligned in a second row, wherein the first row is parallel to the second row,
wherein the first power tool comprises a set of power terminals aligned in a row and the second power tool comprises a set of power terminals comprising a first subset of power terminals aligned in a first row and a second subset of power terminals aligned in a second row
wherein upon mating the first power tool with the first battery pack the row of power terminals of the first power tool mates with corresponding power terminals of the row of power terminals of the first battery pack, and
wherein upon mating the first power tool with the second battery pack the row of power terminals of the first power tool mates with corresponding power terminals of the first of power terminals of the second battery pack and
wherein upon mating the second power tool with the second battery pack the first row of power terminals of the second power tool mates with corresponding power terminals of the first row of power terminals of the second battery pack and the second row of power terminals of the second power tool mates with corresponding power terminals of the second row of power terminals of second battery pack.

3. The power tool system, as recited in claim 1, wherein the first subset of power terminals in the second battery pack and the second subset of power terminal in the second battery pack are offset in a first direction.

4. The power tool system, as recited in claim 1, wherein the first subset and the second subset of battery pack power terminals of the second battery pack is coupled to one of the sets of battery cells.

5. A battery pack, comprising:
a first set of battery cells, the first set of battery cells including at least two battery cells connected in series, the first set of battery cells having a positive node and a negative node;
a second set of battery cells, the second set of battery cells including at least two battery cells different than the at least two battery cells of the first set of battery cells, the second set of battery cells having a positive node and a negative;

a first set of power terminals, the first set of power terminals including a positive power terminal and a negative power terminal, the positive power terminal coupled to the positive node of the first set of battery cells and the negative power terminal coupled to the negative node of the first set of battery cells;

a second set of power terminals, the second set of power terminals including a positive power terminal and a negative power terminal, the positive power terminal coupled to the positive node of the second set of battery cells and the negative power terminal coupled to the negative node of the second set of battery cells;

wherein the first set of power terminals are aligned in a first row and the second set of power terminals are aligned in a second row parallel to the first row.

6. The battery pack, as recited in claim 5, wherein the power terminals of the first set of power terminals are aligned with the power terminals of the second set of power terminals such that each of the power terminals of the first set of power terminals is aligned with one of the power terminals of the second set of power terminals to form a column.

7. The battery pack, as recited in claim 5, wherein the first row and the second row are offset in a first direction.

\* \* \* \* \*